(12) United States Patent
Hayashi et al.

(10) Patent No.: US 10,447,172 B2
(45) Date of Patent: Oct. 15, 2019

(54) POWER REGENERATIVE CONVERTER AND MOTOR CONTROL DEVICE

(71) Applicant: Mitsubishi Electric Corporation, Chiyoda-ku (JP)

(72) Inventors: Yoshitomo Hayashi, Tokyo (JP); Yoji Tsutsumishita, Tokyo (JP); Masaya Harakawa, Tokyo (JP); Yuji Nojiri, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 15/573,360

(22) PCT Filed: Jul. 21, 2016

(86) PCT No.: PCT/JP2016/071436
§ 371 (c)(1),
(2) Date: Nov. 10, 2017

(87) PCT Pub. No.: WO2017/033634
PCT Pub. Date: Mar. 2, 2017

(65) Prior Publication Data
US 2018/0198396 A1    Jul. 12, 2018

(30) Foreign Application Priority Data

Aug. 26, 2015 (WO) .................. PCT/JP2015/074107

(51) Int. Cl.
*H02M 7/21* (2006.01)
*H02M 7/217* (2006.01)
(Continued)

(52) U.S. Cl.
CPC ............ *H02M 7/217* (2013.01); *H02K 47/04* (2013.01); *H02M 5/4585* (2013.01);
(Continued)

(58) Field of Classification Search
CPC .... H02M 7/217; H02M 5/4585; H02M 7/219; H02M 2001/0022; H02M 2001/327
See application file for complete search history.

(56) References Cited

U.S. PATENT DOCUMENTS

2009/0079373 A1    3/2009 Nagase et al.
2010/0052598 A1*   3/2010 Hayashi ............... H02M 7/797
                                                  318/759
(Continued)

FOREIGN PATENT DOCUMENTS

JP    60-121918 A    6/1985
JP    60-207474 A    10/1985
(Continued)

OTHER PUBLICATIONS

International Search Report dated Oct. 6, 2015 in PCT/JP2015/074107, filed on Aug. 26, 2015.
(Continued)

*Primary Examiner* — Fred E Finch, III
*Assistant Examiner* — Rafael O. De León Domenech
(74) *Attorney, Agent, or Firm* — Oblon, McClelland, Maier & Neustadt, L.L.P.

(57) ABSTRACT

A power regenerative converter, includes: a power module configured to include rectifiers and regenerative switches; a smoothing capacitor connected to direct-current power supply terminals, and that accumulates direct-current power during an alternating-current to direct-current conversion; a bus current detector that detects a bus current flowing between either of the direct-current power supply terminals and the smoothing capacitor; a power supply phase detector that detects a phase of an input power supply; a base drive signal generator that generates base drive signals that perform ON/OFF control of the regenerative switching elements based on a power supply phase detected by the power supply phase detection unit; a regeneration controller that performs a start and stop process of a power regenerative operation based on a detection result of the bus current detector and the base drive signals; and an overload detector that detects overload of a power regenerative converter based on the detection result of the bus current detector.

10 Claims, 52 Drawing Sheets

(51) Int. Cl.
| | |
|---|---|
| *H02M 7/219* | (2006.01) |
| *H02M 5/458* | (2006.01) |
| *H02P 27/06* | (2006.01) |
| *H02K 47/04* | (2006.01) |
| *H02P 9/10* | (2006.01) |
| *H02P 11/06* | (2006.01) |
| *H02P 29/024* | (2016.01) |
| *H02P 29/032* | (2016.01) |
| *H02M 1/00* | (2006.01) |
| *H02M 1/32* | (2007.01) |

(52) U.S. Cl.
CPC ............ *H02M 7/219* (2013.01); *H02P 9/107* (2013.01); *H02P 11/06* (2013.01); *H02P 27/06* (2013.01); *H02P 29/027* (2013.01); *H02P 29/032* (2016.02); *H02M 2001/0022* (2013.01); *H02M 2001/327* (2013.01); *H02P 2201/03* (2013.01)

(56) References Cited

U.S. PATENT DOCUMENTS

| | | | |
|---|---|---|---|
| 2013/0187589 A1 | 7/2013 | Okita et al. | |
| 2013/0207590 A1* | 8/2013 | Yanagihara | H02P 23/00 318/807 |
| 2014/0268954 A1* | 9/2014 | Wei | H02M 7/217 363/89 |
| 2015/0303839 A1 | 10/2015 | Ueno et al. | |

FOREIGN PATENT DOCUMENTS

| | | |
|---|---|---|
| JP | 09-023572 A | 1/1997 |
| JP | 10-239360 A | 9/1998 |
| JP | 2004-64879 A | 2/2004 |
| JP | 2009-180427 A | 6/2004 |
| JP | 2009-081930 A | 4/2009 |
| JP | 2011-160537 A | 8/2011 |
| JP | 5084973 B1 | 9/2012 |
| JP | 2013-143878 A | 7/2013 |
| JP | 2013-153607 A | 8/2013 |
| JP | 2014/118942 A1 | 8/2014 |
| JP | 2804311 A1 | 11/2014 |

OTHER PUBLICATIONS

Decision to Grant a Patent dated May 10, 2017 in Japanese application No. 2017-506442 (with English translation).
Office Action dated Sep. 26, 2017 in Taiwanese application No. 105127018 (with English translation).
International Search Report dated Sep. 27, 2016 in PCT/JP2016/071436, filed on Jul. 21, 2016.

* cited by examiner

FIG.8
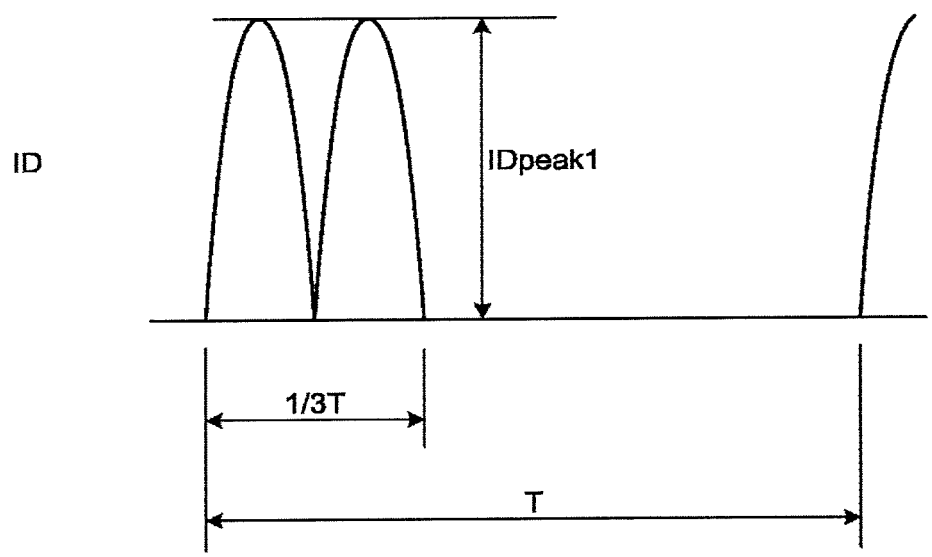
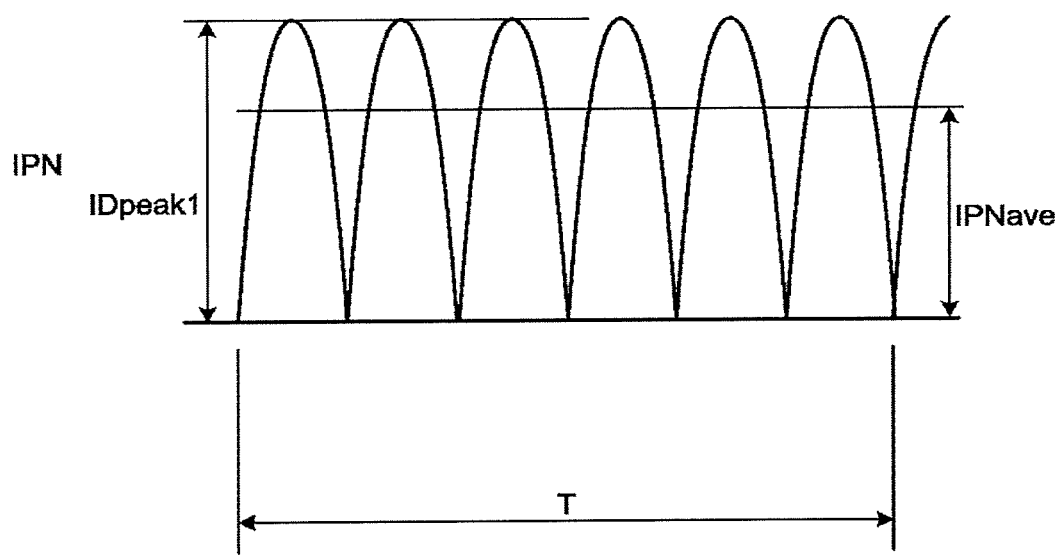

POWER REGENERATIVE CONVERTER AND MOTOR CONTROL DEVICE

FIELD

The present invention relates to a power regenerative converter used in industrial machines such as machine tools, manufacturing machines, and robots, and a motor control device including the power regenerative converter.

BACKGROUND

Generally, a motor consumes electric power during acceleration and operates as a generator during deceleration since it is necessary to reduce an induced electromotive force generated during rotation of the motor. For the sake of convenience in the following description, an acceleration operation of a motor will be referred to as "motor power running" or simply "power running", and a deceleration operation thereof will be referred to as "motor regeneration" or simply "regeneration".

In industrial machines such as machine tools, manufacturing machines, and robots, a motor is mounted on a drive shaft (hereinafter this configuration is referred to as "shaft configuration"), and the drive shaft is driven by the motor. As contrasted with a motor applied to such an industrial machine, a motor control device for controlling the motor is configured to include a rectifier device and a motor drive device. The rectifier device converts an alternating-current voltage applied from an alternating-current power supply as an input power supply into a direct-current voltage. The motor drive device converts the direct-current voltage converted by the rectifier device into an alternating-current voltage and applies the alternating-current voltage to a motor as an object to be controlled to perform variable speed control of the motor.

The rectifier device is generally configured to include a power module and a smoothing capacitor. The power module includes a bridge rectifier circuit constituted by a rectifier element such as a diode. The smoothing capacitor smooths output of the power module. The alternating-current voltage from the input power supply is applied to an alternating-current input terminal of the power module, and is subjected to alternating-current to direct-current conversion by the power module, and a direct-current voltage obtained by the alternating-current to direct-current conversion is smoothed by the smoothing capacitor. Therefore, the rectifier device includes a direct-current terminal for applying the smoothed direct-current voltage to the motor drive device.

During motor power running, an input voltage is converted to a direct-current voltage through alternating-current to direct-current conversion by the rectifier device and the direct-current voltage is applied to the motor drive device via the smoothing capacitor. Then, the direct-current voltage from the smoothing capacitor is subjected to direct-current to alternating-current conversion by the motor drive device, an alternating-current voltage obtained by the conversion is applied to the motor, and thereby the motor is driven.

During motor regeneration, induced electromotive force generated by the motor (hereinafter referred to as "regenerative power") is subjected to alternating-current to direct-current conversion by the motor drive device, and a direct-current voltage obtained by the conversion is applied to the smoothing capacitor. Therefore, in a case where the regenerative power of the motor is large, an inter-terminal voltage of the smoothing capacitor increases, and when the inter-terminal voltage exceeds an allowable voltage of the smoothing capacitor or an allowable voltage of the power module, the smoothing capacitor or the power module may be damaged.

Examples of a method for recovering the regenerative power generated during motor regeneration as described above include a resistance regeneration method in which regenerative power is consumed as heat by a resistor, a capacitor regeneration method in which regenerative power is stored in a capacitor, and a power regeneration method in which regenerative power is returned to an input power supply. In recent years, there is a trend of energy saving in industrial machines such as those described above, and an increasing number of rectifier devices, to which the power regeneration method is applied, are adopted.

The rectifier device to which the power regeneration method is applied is a rectifier device to which a power module capable of performing mutual conversion of power, that is, alternating-current to direct-current conversion and direct-current to alternating-current conversion, by a plurality of rectifier elements and a plurality of switching elements is applied as a power module. That is, the rectifier device to which the power regeneration method is applied can operate, during motor power running, as an alternating-current to direct-current conversion device to supply power necessary for driving the motor to the motor drive device via the smoothing capacitor, and can operate, during motor regeneration, as a direct-current to alternating-current conversion device to return regenerative power of the motor to the input power supply via the smoothing capacitor.

Examples of a control method of a rectifier device to which the power regeneration method is applied include a PWM regenerative converter method using PWM control and a 120-degree conduction regeneration method. The PWM regenerative converter method can make a current from the input power supply a sinusoidal wave. However, since a PWM operation is performed regardless of whether during motor power running or motor regeneration, there occur an increase in heat generated in the power module due to switching losses, and a following increase in size of a cooling mechanism, which results in a disadvantage that a casing itself increases in size. In addition, switching noise increases with the PWM operation, which necessitates addition of an input filter or the like to suppress the switching noise, and thereby cost increases, in general.

On the other hand, in the rectifier device to which the power regeneration method of the 120-degree conduction regeneration method is applied, a phase (hereinafter appropriately referred to as "voltage phase") of a voltage applied from the input power supply (hereinafter appropriately referred to as "power supply voltage") is detected and power is regenerated to the input power supply only in a section of 120 degrees of the power supply voltage. In the 120-degree conduction regeneration method, switching operations of switching elements are required only at the start and the end of the 120-degree section, and the switching losses can be greatly reduced as compared with the PWM converter method. In addition, since the number of switching operations is small, switching noises are reduced as well, and the rectifier device can be configured at lower cost than in the PWM converter method. While the switching operation is always necessary in the PWM converter method, in the 120-degree conduction regeneration method, a power regenerative operation by the switching operation is stopped and an alternating-current to direct-current conversion is performed in a rectifier bridge circuit of the power module during motor power running, and thereby it is possible to reduce the switching losses of the switching elements. For this reason, in industrial machines such as those described above, the rectifier devices to which the power regeneration method of the 120-degree conduction regeneration method is applied are adopted in many cases. For the sake of convenience in the following description, the rectifier device to which the power regeneration method is applied is referred to as "power regenerative converter".

In industrial machines such as those described above, when a shaft configuration includes a plurality of motors, a plurality of motor drive devices is required. On the other hand, one power regenerative converter is usually provided in order to save a space for a control panel on which a motor control device is disposed and to reduce cost thereof. That is, in a general configuration, only one power regenerative converter is provided for a plurality of motor drive devices.

Output power of the power regenerative converter is determined by power supplied to a motor by a motor drive device to be connected thereto, that is, output of the motor. Therefore, when the output of the motor driven by the motor drive device is large, power supplied by the power regenerative converter increases, and a large current flows through a power module mounted inside the power regenerative converter.

Regarding allowable output power of the power regenerative converter, there are allowable continuous rated output capacity and allowable maximum output capacity. The allowable continuous rated output capacity represents power which the power regenerative converter can continuously supply to the motor drive device, and the allowable maximum output capacity represents the maximum power which the power regenerative converter can supply.

In the motor control device to which the power regenerative converter is applied, when the motor performs an operation in which the allowable output power is exceeded and a state where allowable supply output power of the power regenerative converter is exceeded is continued, life degradation of the power regenerative converter occurs, and there may be damage thereof in some cases.

Therefore, in motor control devices used for industrial machines, a power regenerative converter is selected based on the continuous rated output of each of the motors and the maximum output of each of the motors. Specifically, a total of the continuous rated output and a total of the maximum output of each of the motors are calculated, and a power regenerative converter is selected of which the totals will be within the allowable continuous rated output capacity and within the allowable maximum output capacity, respectively.

When the selection of the power regenerative converter is performed as described above, it is possible to prevent the power regenerative converter from being brought into an overload condition, and to prevent life degradation and damage of the power regenerative converter. On the other hand, with such a selection method, even in a case where the total of the continuous rated output of each of the motors is within the allowable continuous rated output capacity, when the total of the maximum output of each of the motors exceeds the allowable maximum output capacity, a power regenerative converter with large capacity is selected. In addition, even in a case where the total of the maximum output of each of the motors is within the allowable maximum output capacity, when the total of the continuous rated output of each of the motors exceeds the allowable continuous rated output capacity, a power regenerative converter with large capacity needs to be selected similarly, which increases the size of a control panel, and may lead to an increase in the cost of the motor control device.

Generally, a protection device such as a breaker, an electric wire used as a power line for connecting an input power supply and a power regenerative converter, and ancillary devices such as a transformer disposed on the input power supply side to secure power supply capacity, are selected based on the capacity of the selected power regenerative converter and are determined by the allowable continuous rated output capacity of the power regenerative converter. When a power regenerative converter with large capacity is selected, a breaker or a transformer with large capacity is selected and a power line with a large wire diameter is used accordingly, which leads not only to an increase in the cost of the motor control device but also to an increase in the cost of the industrial machine as a whole.

In the selection of the power regenerative converter described above, values preset by a manufacturer which provides the motor control device are generally used as the continuous rated output of the motor and the maximum output of the motor. Consequently, there is a high possibility that a power regenerative converter having an excessive margin is set. For example, in a case of a machine tool including a plurality of servo motors and a spindle motor, there are few cases where the maximum output operations of all motors overlap. In a machine tool, servo motors operate with continuous rated output in few cases, and therefore, it is expected that capacity of the power regenerative converter will be larger in comparison with an actual operation of each of motors in many cases.

However, when each of the motors performs an unexpected operation and the sum of the rated continuous output of all motors or the sum of the maximum output of all the motors exceed the allowable output power capacity of the power regenerative converter (hereinafter referred to as "overload condition"), the power regenerative converter may suffer adverse effects. Therefore, the above-described selection method of the power regenerative converter is adopted in order to prevent problems from occurring even when there is an unexpected operation, which hinders cost reduction of industrial machines.

Regarding such problems, Patent Literature 1 below discloses a technique in which an alternating current flowing through an input side of a rectifier device is monitored, and when the alternating current is outside a range of a predetermined determination value, alternating-current power supplied by a motor drive device is controlled so that a motor operates in accordance with a torque command which is further limited than a torque command defined by a motor operation command.

CITATION LIST

Patent Literature

Patent Literature 1: Japanese Patent Application Laid-Open No. 2013-153607

SUMMARY

Technical Problem

There is a description that the technique described in Patent Literature 1 above prevents power supplied by the rectifier device from exceeding capacity of the rectifier device, and eliminates necessity to select a rectifier device having capacity larger than necessary.

However, the technique described in Patent Literature 1 necessitates detection of the alternating current input to the rectifier device. Therefore, when the input power supply is a three-phase alternating-current power supply, it is necessary to detect at least two alternating currents, and two or more current detectors are required.

As it can be understood from the present invention which will be described later, a desired function can be achieved without having two or more current detectors in a rectifier device with a power regeneration function. That is, in a motor control device having the power regeneration function, two or more current detectors are required in the conventional art, which results in a problem of an increase in the cost.

In a power regenerative converter, an alternating-current to direct-current conversion operation, which is a power conversion operation during motor regeneration, is added to a direct-current to alternating-current conversion operation, which is a power conversion operation during motor power running. Therefore, there is another problem that when overload protection is performed in the power regenerative converter, an increase in the number of the current detectors not only means the increase in the number thereof but also directly connects to complication of overload protection control.

The present invention has been made in view of the above, and it is an object of the present invention to provide a power regenerative converter and a motor control device which can achieve overload protection simply and at low cost.

Solution to Problem

In order to solve the above-mentioned problems and achieve the object, a power regenerative converter according to the present invention includes a power module and a smoothing capacitor. The power module has direct-current power supply terminals, a plurality of rectifier elements, and a plurality of regenerative switching elements. The smoothing capacitor is connected to the direct-current power supply terminals and accumulates direct-current power during an alternating-current to direct-current conversion operation. In addition, the power regenerative converter includes a bus current detection unit which detects a bus current flowing between either of the direct-current power supply terminals of the power module and the smoothing capacitor. The power regenerative converter further includes a power supply phase detection unit, a base drive signal generation unit, a regeneration control unit, and an overload detection unit. The power supply phase detection unit detects phases of an input power supply. The base drive signal generation unit generates base drive signals which perform ON/OFF control of regenerative switching elements based on the power supply phases detected by the power supply phase detection unit. The regeneration control unit performs a start process and a stop process of a power regenerative operation based on a detection result of the bus current detection unit and the base drive signals. The overload detection unit detects whether the power regenerative converter is in an instantaneous overload condition based on the detection result of the bus current detection unit.

Advantageous Effects of Invention

According to the present invention, overload protection of the power regenerative converter can be achieved simply and at low cost.

BRIEF DESCRIPTION OF DRAWINGS

FIG. 8 is a set of waveform diagrams illustrating a rectified current and a bus current flowing per cycle of a power supply during motor power running.

DESCRIPTION OF EMBODIMENTS

Hereinafter, a motor control device according to embodiments of the present invention will be described with reference to the accompanying drawings. It should be noted that the present invention is not limited by the following embodiments.

First Embodiment

Figure 1:
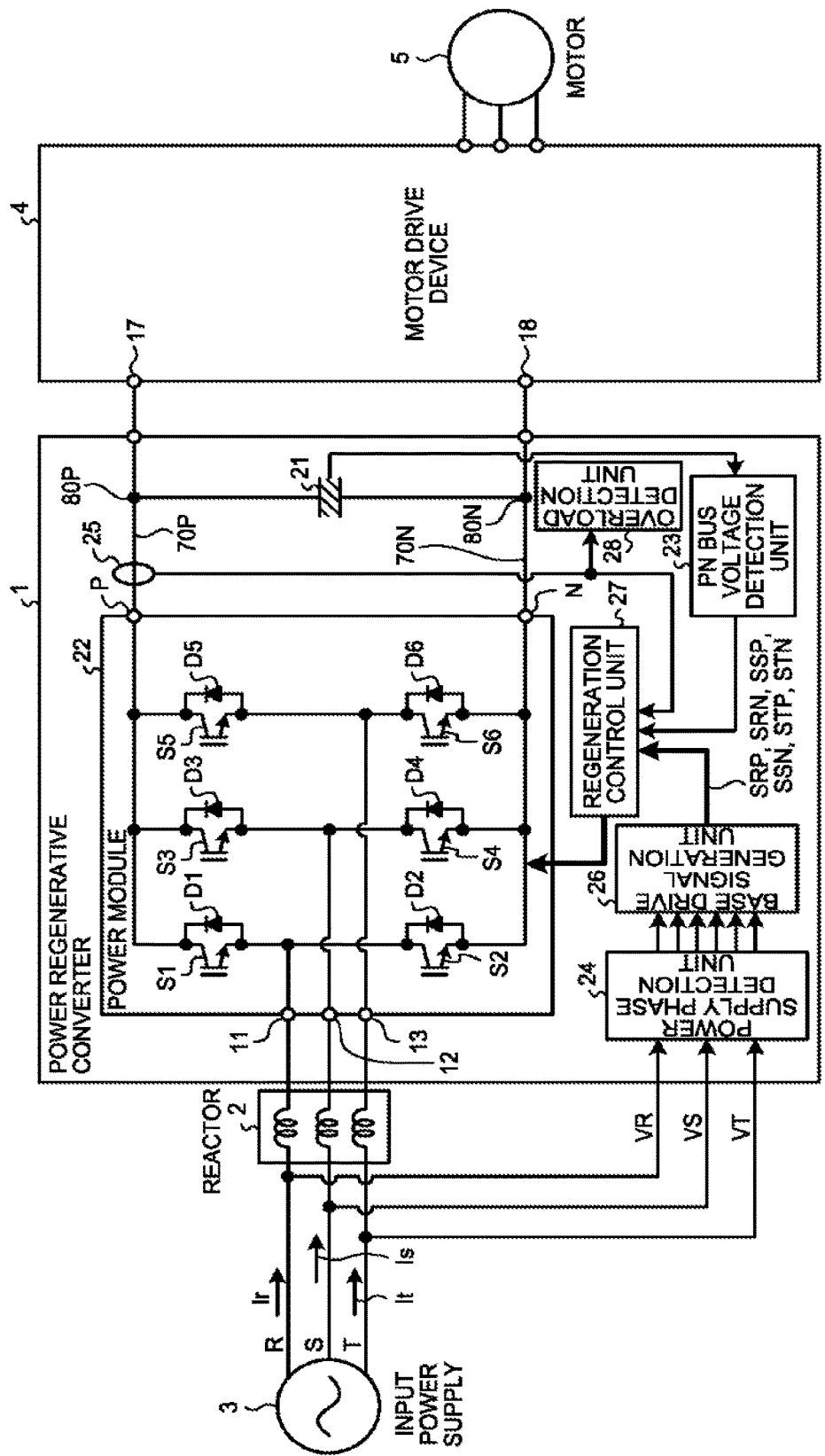
FIG. 1 is a block diagram illustrating a configuration of a motor control device according to a first embodiment.

First, a configuration of a motor control device according to a first embodiment will be described. FIG. 1 is a block diagram illustrating the configuration of the motor control device according to the first embodiment. As illustrated in FIG. 1, the motor control device according to the first embodiment is configured to include a motor drive device 4 and a power regenerative converter 1. The motor drive device 4 performs variable speed control of a motor 5. The power regenerative converter 1 is disposed between an input power supply 3 as a three-phase alternating-current power supply which generates alternating-current voltages of three phases (an R phase, an S phase, and a T phase) and the motor drive device 4, can supply direct-current power to the motor drive device 4, and can return regenerative power generated during motor deceleration to the input power supply 3. The motor drive device 4 receives the direct-current power supplied from the power regenerative converter 1 and performs variable speed control of the motor 5.

The power regenerative converter 1 is configured to include a smoothing capacitor 21, a power module 22, a PN bus voltage detection unit 23, a power supply phase detection unit 24, a bus current detection unit 25, a base drive signal generation unit 26, a regeneration control unit 27, and an overload detection unit 28. The power module 22 includes bridge-connected six power elements which are obtained by respectively connecting rectifier elements (D1 to D6) and regenerative switching elements (S1 to S6) in parallel. The PN bus voltage detection unit 23 detects an inter-terminal voltage of the smoothing capacitor 21. The power supply phase detection unit 24 detects power supply phases of the input power supply 3. The bus current detection unit 25 detects a bus current flowing among a P terminal of the power module 22, the smoothing capacitor 21, and an N terminal of the power module 22. The base drive signal generation unit 26 generates ON control signals or OFF control signals (hereinafter referred to as "base drive signals") for respective regenerative switching elements of the power module 22 based on the power supply phases detected by the power supply phase detection unit 24. The regeneration control unit 27 controls whether to output, to a drive circuit (not illustrated) of the regenerative switching elements, an output signal of the base drive signal generation unit 26 transmitted from the base drive signal generation unit 26, in other words, whether to block the output signal of the base drive signal generation unit 26, based on an output signal of the bus current detection unit 25 and an output signal of the PN bus voltage detection unit 23. The overload detection unit 28 detects overload of the power regenerative converter based on the output signal of the bus current detection unit 25, and outputs an overload detection signal to the motor drive device 4 or a host control device which outputs a motor operation command to the motor drive device 4.

The power module 22 includes alternating-current power supply terminals 11, 12, and 13, as well as the P terminal and the N terminal which are direct-current power supply terminals. The alternating-current power supply terminals 11, 12, and 13 are connected to an R power supply terminal, an S power supply terminal, and a T power supply terminal of the input power supply 3 via a reactor 2, respectively. The P terminal of the power module 22 is connected to a high potential side of the smoothing capacitor 21 and is also connected to a direct-current power supply terminal 17 of the motor drive device 4. The N terminal of the power module 22 is connected to a low potential side of the smoothing capacitor 21 and is also connected to a direct-current power supply terminal 18 of the motor drive device 4.

The PN bus voltage detection unit 23 detects a voltage across the smoothing capacitor 21 as a bus voltage between a P bus line 70P and an N bus line 70N. In the case of the configuration of FIG. 1, the voltage across the smoothing capacitor 21 is substantially equal to a voltage (hereinafter appropriately referred to as "bus voltage") VPN between the P terminal and the N terminal of the power module 22. That is, the PN bus voltage detection unit 23 detects the voltage across the smoothing capacitor 21, thereby detecting a voltage between the PN bus lines for electrically connecting the power module 22 and the motor drive device 4.

The bus current detection unit 25 is disposed between an electrical connection point 80P of the smoothing capacitor 21 in the P bus line 70P and the P terminal of the power module 22, and detects a current (hereinafter appropriately referred to as "bus current") IPN flowing among the P terminal of the power module 22, the smoothing capacitor 21, and the N terminal of the power module 22. The bus current detection unit 25 may be disposed between an electrical connection point 80N of the smoothing capacitor 21 in the N bus line 70N and the N terminal of the power module 22.

Next, an internal configuration of the power module 22 will be described. As described above, the power elements constituting the power module 22 are constituted by pluralities of rectifier elements (D1 to D6) and regenerative switching elements (S1 to S6). Three pairs of regenerative switching elements S1 and S2, regenerative switching elements S3 and S4, and regenerative switching elements S5 and S6 with each pair connected in series, are connected in parallel between the P terminal and the N terminal of the power module 22. Collector terminals of the regenerative switching elements S1, S3, and S5 constituting upper arms are connected to the P terminal, and emitter terminals of the regenerative switching elements S2, S4, and S6 constituting lower arms are connected to the N terminal. An emitter terminal of the regenerative switching element S1 and a collector terminal of the regenerative switching element S2 are connected to the alternating-current power supply terminal 11. Similarly, an emitter terminal of the regenerative switching element S3 and a collector terminal of the regenerative switching element S4 are connected to the alternating-current power supply terminal 12, and an emitter terminal of the regenerative switching element S5 and a collector terminal of the regenerative switching element S6 are connected to the alternating-current power supply terminal 13.

The rectifier elements D1 to D6 are connected in parallel to these regenerative switching elements S1 to S6, respectively. An anode terminal of each rectifier element is connected to the emitter terminal of each regenerative switching element and a cathode terminal of each rectifier element is connected to the collector terminal of each regenerative switching element. According to FIG. 1, since the alternating-current power supply terminals 11, 12, and 13 of the power module 22 are electrically connected to the R-phase power supply terminal, the S-phase power supply terminal, and the T-phase power supply terminal of the input power supply 3 via the reactor 2, respectively, the rectifier element D1 and the regenerative switching element S1 constitute an R-phase P-side power element, the rectifier element D2 and the regenerative switching element S2 constitute an R-phase N-side power element, the rectifier element D3 and the regenerative switching element S3 constitute an S-phase P-side power element, the rectifier element D4 and the regenerative switching element S4 constitute an S-phase N-side power element, the rectifier element D5 and the regenerative switching element S5 constitute a T-phase P-side power element, and the rectifier element D6 and the regenerative switching element S6 constitute a T-phase N-side power element. In FIG. 1, the case where the input power supply 3 is a three-phase alternating-current power supply is illustrated, but a single-phase power supply may be used. In a case of the single-phase power supply, the power module 22 can be constituted by four power elements.

The power supply phase detection unit 24 captures each of power supply voltages (hereinafter appropriately described as "R-phase voltage VR", "S-phase voltage VS", and "T-phase voltage VT") of the input power supply 3, and detects a power supply phase of the input power supply 3. Instead of the power supply voltages of the input power supply 3, the voltages between the reactor 2 and the alternating-current power supply terminals 11, 12, and 13 of the power module 22 may be captured.

The power supply phase detection unit 24 outputs the detected power supply phases to the base drive signal generation unit 26 as output signals. The base drive signal generation unit 26 generates base drive signals for driving the regenerative switching elements (S1 to S6) based on the power supply phase and uses the base drive signals as output signals to the regeneration control unit 27. In the case of the configuration of FIG. 1, there are six types of base drive signals, and the six types of base drive signals are distinguished by denoting the base drive signal of the R-phase P-side regenerative switching element S1 by SRP, the base drive signal of the R-phase N-side regenerative switching element S2 by SRN, the base drive signal of the S-phase P-side regenerative switching element S3 by SSP, the base drive signal of the S-phase N-side regenerative switching element S4 by SSN, the base drive signal of the T-phase P-side regenerative switching element S5 by STP, and the base drive signal of the T-phase N-side regenerative switching element S6 by STN.

The bus current IPN detected by the bus current detection unit 25, the bus voltage VPN detected by the PN bus voltage detection unit 23, and the base drive signals (SRP, SRN, SSP, SSN, STP, and STN, hereinafter also described as "SRP to STN") which are output signals of the base drive signal generation unit 26 are input to the regeneration control unit 27. Based on the bus current IPN and the bus voltage VPN, the regeneration control unit 27 determines whether to output or block the base drive signals SRP to STN transmitted from the base drive signal generation unit 26, and when it is determined to output the base drive signals SRP to STN, the regeneration control unit 27 outputs the base drive signals SRP to STN to the drive circuit of which illustration is omitted. The more detailed operation of the regeneration control unit 27 will be described later by referring to a regeneration control unit 27A described in a sixth embodiment and a regeneration control unit 27B described in a seventh embodiment instead of the regeneration control unit 27.

Figure 2:
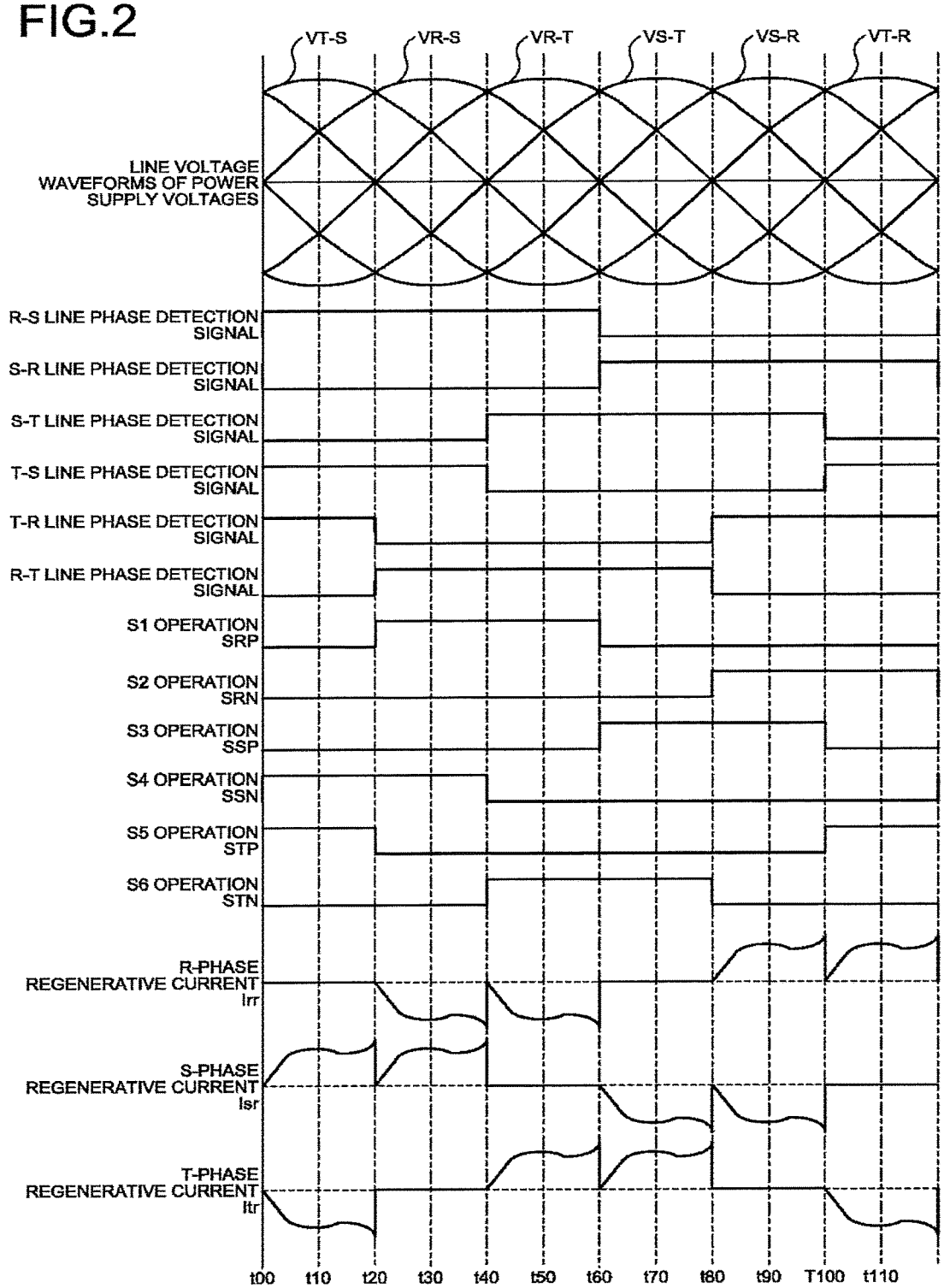
FIG. 2 is a time chart illustrating operations of a power supply phase detection unit and a base drive signal generation unit.

Next, operations of the power supply phase detection unit 24 and the base drive signal generation unit 26 will be described with reference to FIG. 2. FIG. 2 is a time chart illustrating operations of the power supply phase detection unit 24 and the base drive signal generation unit 26. FIG. 2 illustrates, from an upper side thereof, changes with time of line voltage waveforms (VR-S, VS-T, VT-R, VS-R, VT-S, and VR-T) of the power supply voltages, power supply phase detection signals, the base drive signals (SRP, SRN, SSP, SSN, STP, and STN) for driving the respective regenerative switching elements, and regenerative currents (Irr, Isr, and Itr) flowing through the R phase, the T phase and the S phase. The regenerative current is a current flowing via a regenerative switching element during a regenerative operation.

First, the operation of the power supply phase detection unit 24 will be described. The above-described R-phase voltage VR, S-phase voltage VS, and T-phase voltage VT are input to the power supply phase detection unit 24. Based on the R-phase voltage VR, the S-phase voltage VS, and the T-phase voltage VT, the power supply phase detection unit 24 detects an R-S line voltage VR-S, an S-T line voltage VS-T, a T-R line voltage VT-R, an S-R Line voltage VS-R, a T-S line voltage VT-S, and an R-T line voltage VR-T to extract a zero crossing point of each line voltage and the extracted zero crossing point is treated as a power supply phase detection signal. The power supply phase detection signal extracted by the power supply phase detection unit 24 is output to the base drive signal generation unit 26. While the R-S line voltage VR-S is a voltage difference detected between the R and S phases employing the S phase as reference, the S-R line voltage VS-R is a voltage difference detected between the S and R phases employing the R phase as reference. A voltage phase of the R-S line voltage VR-S and that of the S-R line voltage VS-R are 180 degrees out of phase. The same applies to definitions of and relationships between other line voltages. While the S-T line voltage VS-T is a voltage difference detected between the S and T phases employing the T phase as reference, the T-S line voltage VT-S is a voltage difference detected between the T and S phases employing the S phase as reference. A voltage phase of the S-T line voltage VS-T and that of the T-S line voltage VT-S are 180 degrees out of phase. While the T-R line voltage VT-R is a voltage difference detected between the T and R phases employing the R phase as reference, the R-T line voltage VR-T is a voltage difference detected between the R and T phases employing the T phase as reference. A voltage phase of the T-R line voltage VT-R and that of the R-T line voltage VR-T are 180 degrees out of phase.

Specific examples of the power supply phase detection signal are as illustrated in FIG. 2. FIG. 2 illustrates as the power supply phase detection signal, from the upper side thereof, an R-S line phase detection signal, an S-R line phase detection signal, an S-T line phase detection signal, a T-S line phase detection signal, a T-R line phase detection signal, and an R-T line phase detection signal. For example, regarding the R-S line phase detection signal, a power supply phase detection signal is generated which is associated with each line voltage such that the phase detection signal is H in a section (phase section) where a difference between the R-S line voltage VR-S and the S-R line voltage VS-R is positive, and that the phase detection signal is L in a section (phase section) where the difference is negative. Since each line voltage waveform of the three-phase alternating-current power supply is substantially a sine wave and the left and right waveforms viewed from the maximum value are symmetric, the potential of each line voltage waveform is maximum at the center of the phase section where the phase detection signal is H, and the potential of each line voltage waveform is minimum at the center of the phase section where the phase detection signal is L. Therefore, it is possible to calculate a phase indicating the maximum potential and a phase indicating the minimum potential from each phase detection signal.

Next, the operation of the base drive signal generation unit 26 will be described. As described above, the base drive signal generation unit 26 has a function of generating the base drive signals for the regenerative switching elements S1 to S6 of the power module 22 based on the power supply phase detection signals which are outputs of the power supply phase detection unit 24. Based on input phase detection signals, the base drive signal generation unit 26 generates base drive signals indicated below (see FIG. 2).

<When the R-S Line Voltage VR-S has the Maximum Potential>

The base drive signals SRP and SSN are set to H and the R-phase P-side regenerative switching element S1 and the S-phase N-side regenerative switching element S4 are controlled to be ON.

<When the S-T Line Voltage VS-T has the Maximum Potential>

The base drive signals SSP and STN are set to H, and the S-phase P-side regenerative switching element S3 and the T-phase N-side regenerative switching element S6 are controlled to be ON.

<When the T-R Line Voltage VT-R has the Maximum Potential>

The base drive signals STP and SRN are set to H, and the T-phase P-side regenerative switching element S5 and the R-phase N-side regenerative switching element S2 are controlled to be ON.

<When the S-R Line Voltage VS-R has the Maximum Potential>

The base drive signals SSP and SRN are set to H and the S-phase P-side regenerative switching element S3 and the R-phase N-side regenerative switching element S2 are controlled to be ON.

<When the T-S Line Voltage VT-S has the Maximum Potential>

The base drive signals STP and SSN are set to H and the T-phase P-side regenerative switching element S5 and the S-phase N-side regenerative switching element S4 are controlled to be ON.

<When the R-T Line Voltage VR-T has the Maximum Potential>

The base drive signals SRP and STN are set to H and the R-phase P-side regenerative switching element S1 and the T-phase N-side regenerative switching element S6 are controlled to be ON.

Next, currents flowing when the regenerative switching elements S1 to S6 constituting the power module 22 each of which performs an ON operation or an OFF operation (hereinafter collectively referred to as "switching operation") based on the base drive signals will be described with reference to FIG. 2. FIG. 1 illustrates an R-phase current Ir, an S-phase current Is, and a T-phase current It respectively indicated by arrows directed toward the power regenerative converter 1 from the input power supply 3. The currents flowing in directions indicated by the arrows are treated as currents in a positive direction, and the waveforms thereof are expressed accordingly.

As described above, when the regenerative switching elements S1 to S6 perform the switching operation, the R-phase regenerative current Irr, the S-phase regenerative current Isr, and the T-phase regenerative current Itr flow as illustrated in a lower portion of FIG. 2.

In FIG. 2, since the R-S line voltage VR-S has the maximum potential from time t20 to t40, as described above, the regenerative switching elements S1 and S4 are driven to be turned ON and the other regenerative switching elements are driven to be turned OFF. As a result, the smoothing capacitor 21 and R and S of the input power supply 3 are connected through source impedance in the reactor 2, so that currents flowing via the regenerative switching elements S1 and S4 driven to be turned ON flow through the R phase and the S phase, respectively. Likewise, since the R-T line voltage VR-T has the maximum potential from time t40 to t60, the regenerative switching elements S1 and S6 are driven to be turned ON and the other regenerative switching elements are driven to be turned OFF. As a result, the smoothing capacitor 21 and R and T of the input power supply 3 are connected through the source impedance in the reactor 2, so that regenerative currents flowing via the regenerative switching elements S1 and S6 driven to be turned ON flow through the R phase and the T phase.

Even when the switching operation as described above is performed, the regenerative current does not flow when there is no relationship of "an inter-terminal voltage of the smoothing capacitor 21>a voltage of the input power supply 3" between the inter-terminal voltage of the smoothing capacitor 21 and the voltage of the input power supply 3. The regenerative current flows by utilizing a difference in voltages between the smoothing capacitor 21 and the input power supply 3, while being subjected to current limitation by impedance of the reactor 2.

Figure 3:
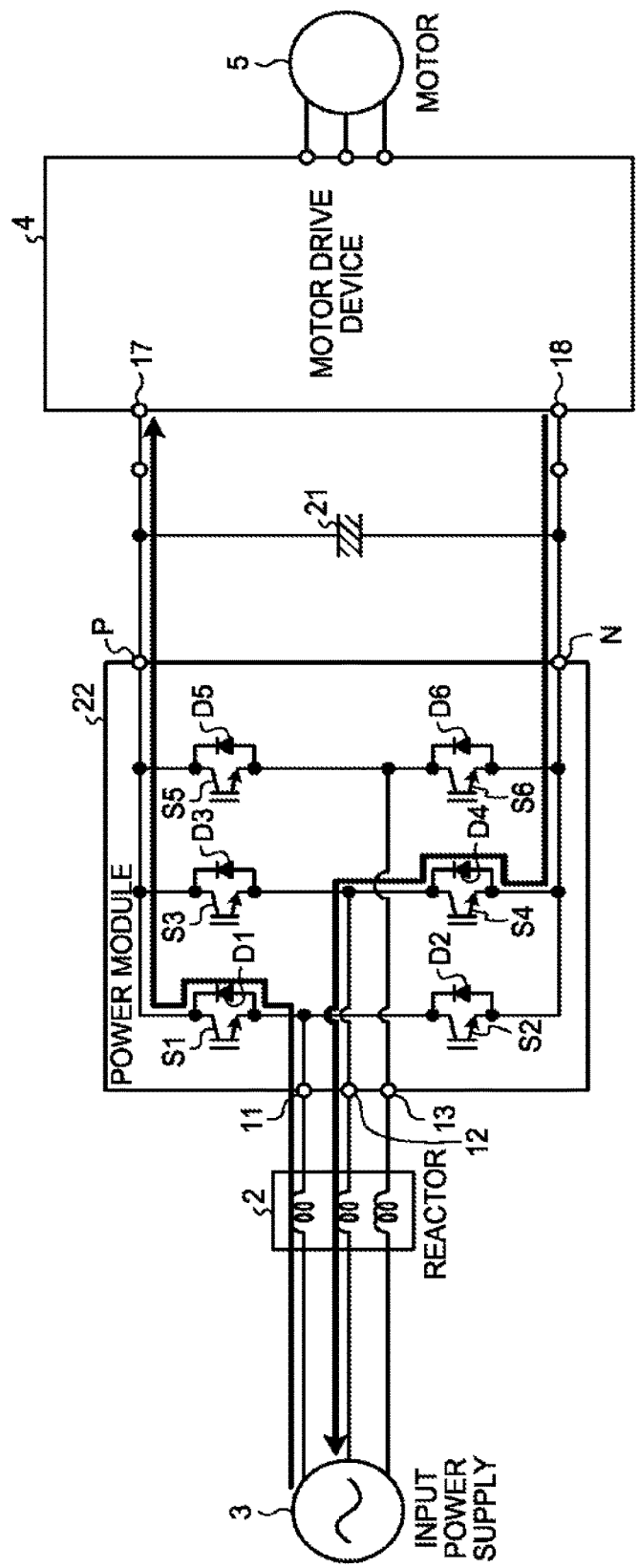
FIG. 3 is a circuit diagram explaining an operation during motor power running.

Next, a power running operation will be described. FIG. 3 is a circuit diagram explaining an operation during motor power running. During motor power running, the motor drive device 4 supplies alternating-current power to the motor 5 by using the direct-current power supply of the smoothing capacitor 21 of the power regenerative converter 1 to perform variable speed control. At that time, a voltage of the smoothing capacitor 21 decreases. When "the voltage of the input power supply 3>the inter-terminal voltage of the smoothing capacitor 21" is satisfied, direct-current power is supplied from the input power supply 3 to the smoothing capacitor 21 via the reactor 2 and the power module 22. At that time, currents respectively flow through the rectifier elements D1 to D6 constituting the power module 22 of the power regenerative converter 1.

Figure 4:
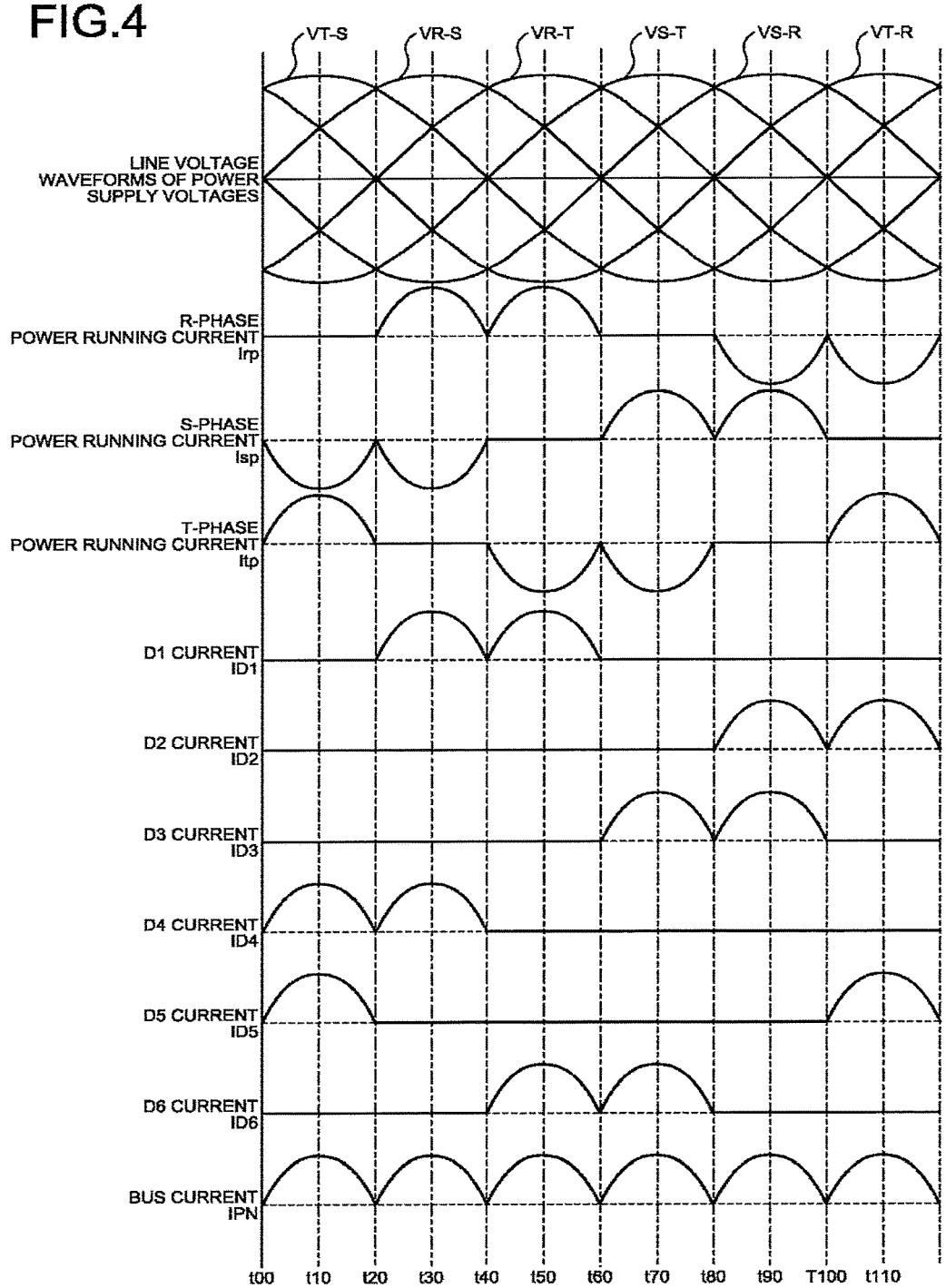
FIG. 4 is a timing chart illustrating waveforms during motor power running.

FIG. 4 is a time chart illustrating waveforms during motor power running. FIG. 4 illustrates, from an upper side thereof, changes with time of the line voltage waveforms (VR-S, VS-T, VT-R, VS-R, VT-S, and VR-T) of the power supply voltages, power running currents (Irp, Isp, and Itp) flowing through the R phase, the T phase, and the S phase, rectified currents (ID1, ID2, ID3, ID4, ID5, and ID6) flowing through the rectifier elements D1 to D6, respectively, and the bus current IPN. According to FIG. 4, the following operations are performed during motor power running.

<When the R-S Line Voltage VR-S has the Maximum Potential>

The rectifier elements D1 and D4 conduct and the rectified currents ID1 and ID4 flow, so that the R-phase power running current Irp in the positive direction and the S-phase power running current Isp in a negative direction flow.

<When the S-T Line Voltage VS-T has the Maximum Potential>

The rectifier elements D3 and D6 conduct and the rectified currents ID3 and ID6 flow, so that the S-phase power running current Isp in the positive direction and the T-phase power running current Itp in the negative direction flow.

<When the T-R Line Voltage VT-R has the Maximum Potential>

The rectifier elements D2 and D5 conduct and the rectified currents ID2 and ID5 flow, so that the T-phase power running current Itp in the positive direction and the R-phase power running current Irp in the negative direction flow.

<When the S-R Line Voltage VS-R has the Maximum Potential>

The rectifier elements D2 and D3 conduct, the rectified currents ID2 and ID3 flow, so that the S-phase power running current Isp in the positive direction and the R-phase power running current Irp in the negative direction flow.

<When the T-S Line Voltage VT-S has the Maximum Potential>

The rectifier elements D4 and D5 conduct and the rectified currents ID4 and ID5 flow, so that the T-phase power running current Itp in the positive direction and the S-phase power running current Isp in the negative direction flow.

<When the R-T Line Voltage VR-T has the Maximum Potential>

The rectifier elements D1 and D6 conduct and the rectified currents ID1 and ID6 flow, so that the R-phase power running current Irp in the positive direction and the T-phase power running current Itp in the negative direction flow.

The rectifier elements D1 to D6 in the power module 22 conduct only for a period equivalent to ⅓ of the power supply cycle of the input power supply 3 to cause the rectified currents to flow. In addition, since the line voltages which have the maximum potential are switched every half of the period, that is, a period equivalent to ⅙ of the power supply cycle of the input power supply 3, the conducting rectifier elements are also switched. For example, it can be seen from time t20 to t60 that the rectifier elements D1 and D4 conduct and the rectified currents flow from time t20 to t40, and the rectifier elements D1 and D6 conduct and the rectified currents flow from time t40 to t60. On the other hand, regarding the bus current IPN flowing between the P terminal of the power module 22 and the smoothing capacitor 21, it can be seen that a current which is the sum of currents flowing through the rectifier elements D1, D3, and D5 (or D2, D4, and D6) flows.

Figure 5:
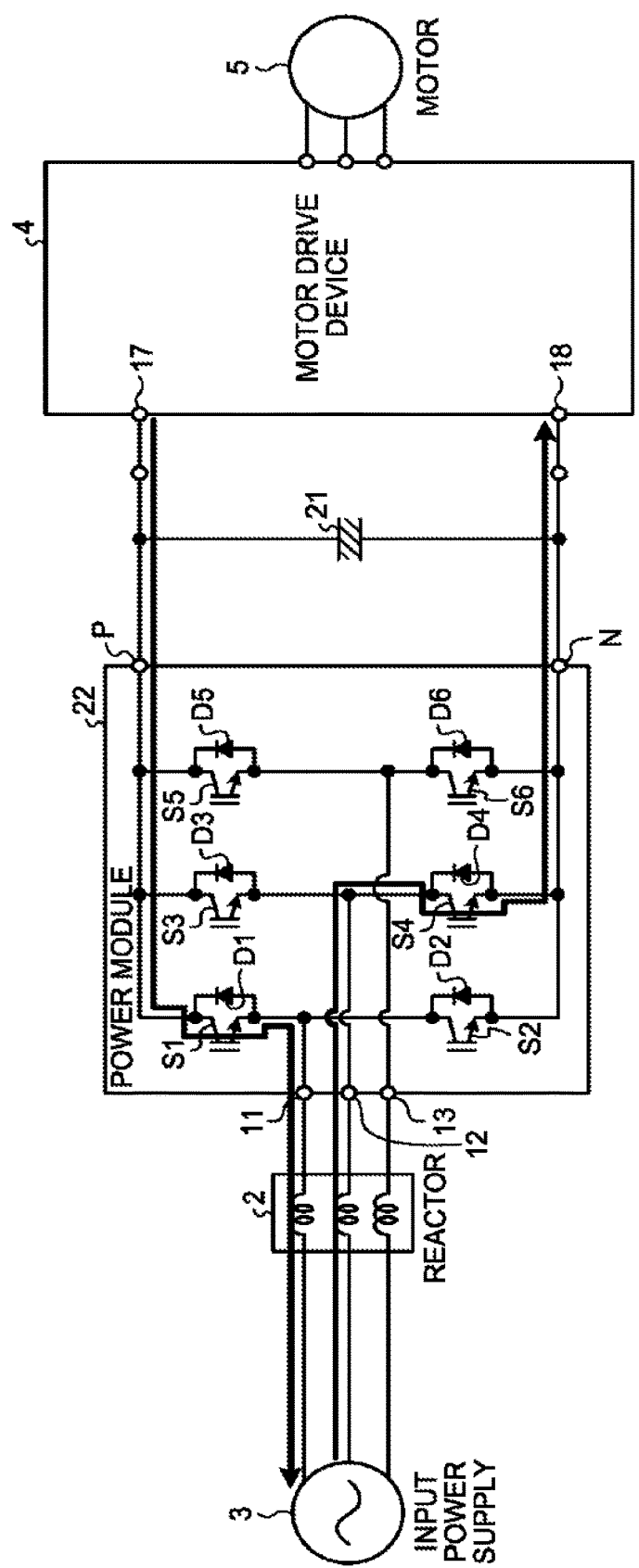
FIG. 5 is a circuit diagram explaining an operation during motor regeneration.

Next, a power regenerative operation during motor regeneration will be described. FIG. 5 is a circuit diagram explaining an operation during motor regeneration, in detail, an operation when the power regenerative converter 1 performs the power regenerative operation by the switching operation during motor regeneration.

During motor regeneration, the motor drive device 4 performs an alternating-current to direct-current conversion operation to supply motor regenerative power to the smoothing capacitor 21. By this operation, the inter-terminal voltage of the smoothing capacitor 21 increases. In a case where the power regenerative operation is started by the switching operation of the regenerative switching elements S1 to S6 of the power module 22 when the inter-terminal voltage of the smoothing capacitor 21 increases to be larger than the power supply voltage of the input power supply 3 and the voltage difference between the inter-terminal voltage of the smoothing capacitor 21 and the power supply voltage of the input power supply 3 increases to be equal to or larger than a predetermined value, the direct-current power of the smoothing capacitor 21 is subjected to direct-current to alternating-current conversion, and regenerative power obtained by the conversion is supplied to the input power supply 3 via the reactor 2. At that time, currents flow through the regenerative switching elements (in the example of FIG. 5, the regenerative switching elements S1 and S4).

Figure 6:
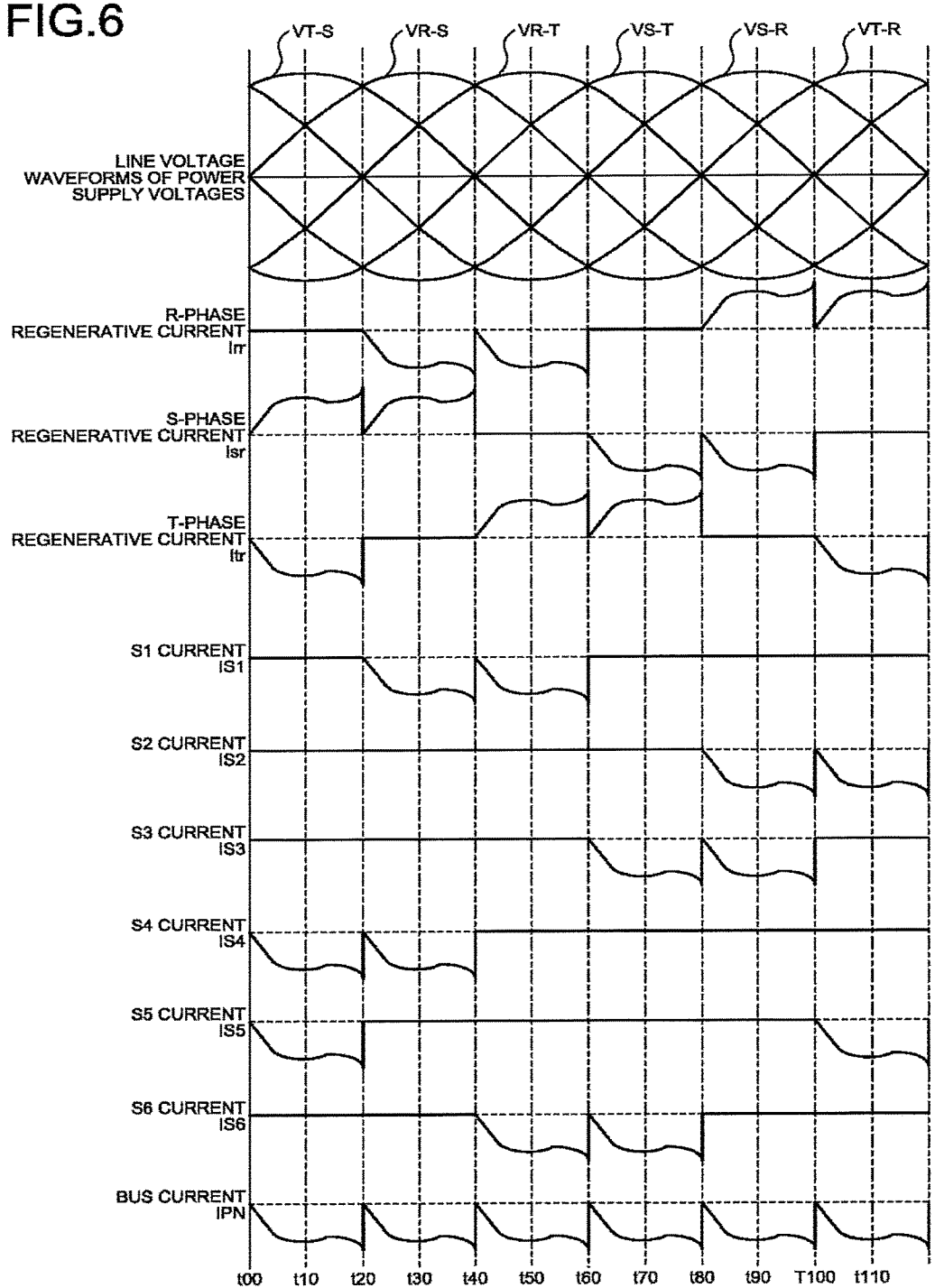
FIG. 6 is a time chart illustrating waveforms during motor regeneration.

FIG. 6 is a time chart illustrating waveforms when the power regenerative operation is performed during motor regeneration. FIG. 6 illustrates, from an upper side thereof, changes with time of the line voltage waveforms (VR-S, VS-T, VT-R, VS-R, VT-S, and VR-T) of the power supply voltages, the regenerative currents (Irr, Isr, and Itr) flowing through the R phase, the T phase, and the S phase, regenerative currents (IS1, IS2, IS3, IS4, IS5, and IS6) flowing through the regenerative switching elements S1 to S6, respectively, and the bus current IPN. According to FIG. 6, the following operations are performed during motor regeneration.

<When the R-S Line Voltage VR-S has the Maximum Potential>

The regenerative switching elements S1 and S4 conduct and the regenerative currents IS1 and IS4 flow, so that the R-phase regenerative current Irr in the negative direction and the S-phase regenerative current Isr in the positive direction flow.

<When the S-T Line Voltage VS-T has the Maximum Potential>

The regenerative switching elements S3 and S6 conduct and the regenerative currents IS3 and IS6 flow, so that the S-phase regenerative current Isr in the negative direction and the T-phase regenerative current Itr in the positive direction flow.

<When the T-R Line Voltage VT-R has the Maximum Potential>

The regenerative switching elements S2 and S5 conduct and the regenerative currents IS2 and IS5 flow, so that the T-phase regenerative current Itr in the negative direction and the R-phase regenerative current Irr in the positive direction flow.

<When the S-R Line Voltage VS-R has the Maximum Potential>

The regenerative switching elements S2 and S3 conduct and the regenerative currents IS2 and IS3 flow, so that the S-phase regenerative current Isr in the negative direction and the R-phase regenerative current Irr in the positive direction flow.

<When the T-S Line Voltage VT-S has the Maximum Potential>

The regenerative switching elements S4 and S5 conduct and the regenerative currents IS4 and IS5 flow, so that the T-phase regenerative current Itr in the negative direction and the S-phase regenerative current Isr in the positive direction flow.

<When the R-T Line Voltage VR-T has the Maximum Potential>

The regenerative switching elements S1 and S6 conduct and the regenerative currents IS1 and IS6 flow, so that the R-phase regenerative current Irr in the negative direction and the T-phase regenerative current Itr in the positive direction flow.

The regenerative switching elements S1 to S6 in the power module 22 conduct only for a period equivalent to ⅓ of the power supply cycle of the input power supply 3 to cause the regenerative currents to flow. In addition, since the line voltages which have the maximum potential are switched every half of the period, that is, a period equivalent to ⅙ of the power supply cycle of the input power supply 3, the conducting regenerative switching elements are also switched. For example, it can be seen from time t20 to t60 that the regenerative switching elements S1 and S4 conduct and the regenerative currents flow from time t20 to t40, and the regenerative switching elements S1 and S6 conduct and the regenerative currents flow from time t40 to t60. On the other hand, regarding the bus current IPN flowing between the P terminal of the power module 22 and the smoothing capacitor 21, it can be seen that a current which is the sum of currents flowing through the regenerative switching elements S1, S3, and S5 (or S2, S4, and S6) flows.

Figure 7:
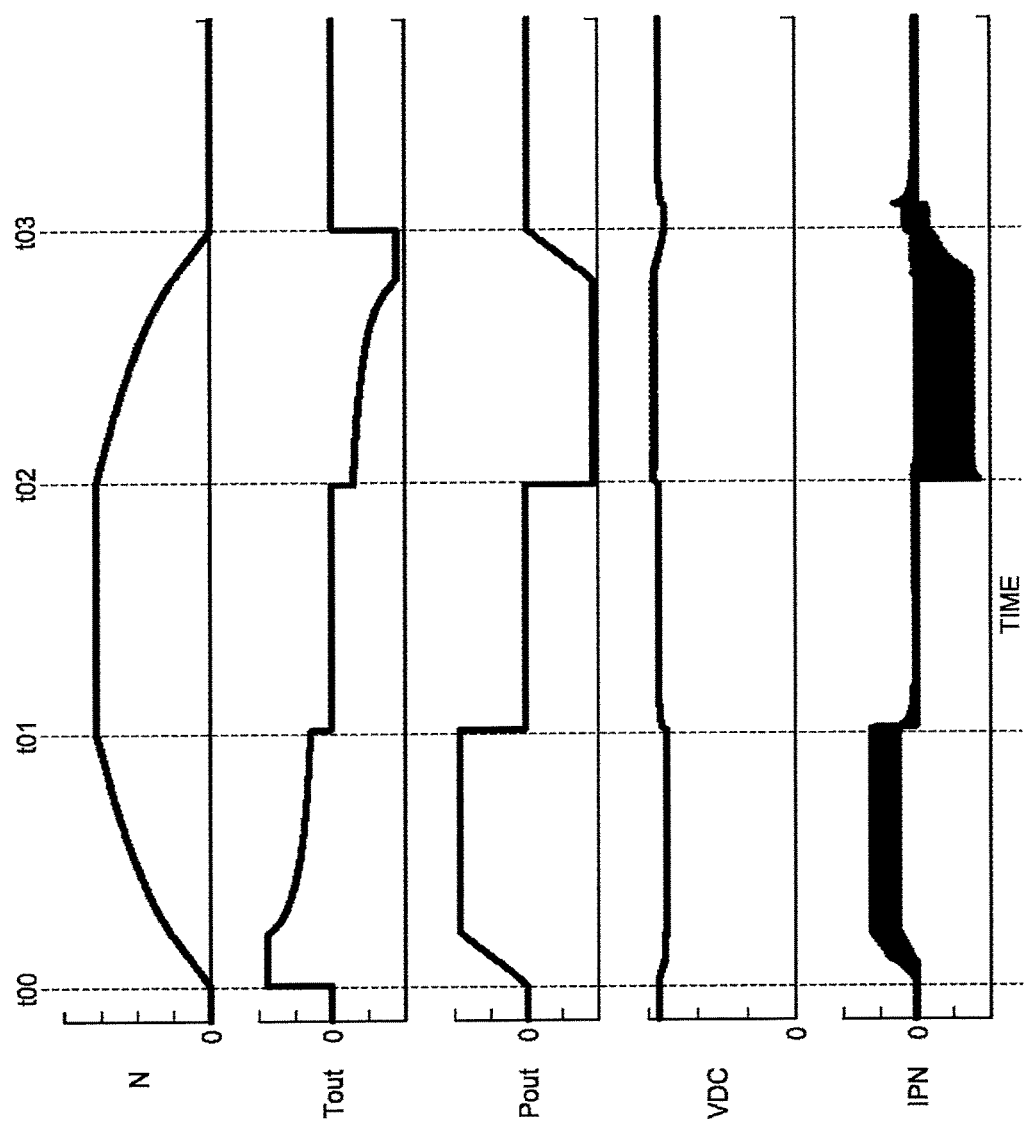
FIG. 7 is a set of waveform diagrams illustrating a behavior during a motor operation.

Next, power supplied by the power regenerative converter 1 during motor power running or motor regeneration will be described. FIG. 7 is a set of waveform diagrams illustrating a behavior during a motor operation, in which each horizontal axis represents time, and FIG. 7 illustrates, from an upper side thereof, a motor speed N, motor torque Tout, motor output Pout, the inter-terminal voltage of the smoothing capacitor 21 (hereinafter referred to as "capacitor voltage") VDC and the bus current IPN.

First, a section from t00 to t01 in FIG. 7 will be described. This section is a motor power running section. Time t00 is a time when the motor starts accelerating, and time t01 is a time when the motor speed N reaches a target speed. The motor speed N and the motor output Pout are increased by the motor torque Tout. As the motor output Pout increases, the bus current IPN increases. When the motor torque Tout decreases, the motor output Pout becomes constant and a peak value of the bus current IPN also becomes constant.

A section from t01 to t02 in FIG. 7 will be described. In this section, the motor speed N is a constant speed. Unlike the section from time t00 to t01, the motor output Pout is a low value, and consequently, illustrated is the bus current IPN which hardly flows.

A section from t02 to t03 in FIG. 7 will be described. This section is a motor regeneration section. Time t02 is a time when the motor starts decelerating, and time t03 is a time when the motor stops. When the motor starts decelerating, the regenerative power of the motor flows into the smoothing capacitor 21, and the inter-terminal voltage VDC increases. When the inter-terminal voltage VDC exceeds a predetermined value, the power regenerative converter 1 starts a power regenerative operation. A regenerative current flows through the bus current IPN due to the power regenerative operation of the power regenerative converter 1, and the capacitor voltage VDC decreases. At time t02, the motor output Pout during motor deceleration, that is, an absolute value of the regenerative power of the motor is large and a large regenerative current flows, but as the motor speed N decreases, the absolute value of the motor output Pout decreases and the regenerative current decreases, as well.

It can be seen from FIG. 7 that the bus current IPN is determined by the motor output Pout. That is, a proportional relationship is established between the motor output Pout and the bus current IPN. There are relationships described with reference to FIGS. 4 and 6 between the bus current IPN and the R-phase current Ir, the S-phase current Is, and the T-phase current It, and the relationship between the motor output Pout and the bus current IPN can be treated similarly to relationships between the motor output Pout and the R-phase current Ir, the S-phase current Is, and the T-phase current It.

Next, the power supplied by the power regenerative converter 1 during motor power running or motor regeneration is calculated. When the output of the motor 5, the motor torque, the motor speed, and the circumference ratio are denoted by Pout [W], Tout [N·m], N [r/min], and π, respectively, the motor output Pout can be expressed by the following formula.

$$Pout = Tout \times N/60 \times 2 \times \pi \quad (1)$$

When power which the power regenerative converter 1 needs to supply for the motor output Pout is expressed as required supply power Pin [w], and a ratio of the output power to the input power, that is, a value of the output power/input power ratio is denoted by η, the required supply power Pin can be expressed by the following formula.

$$Pin = Pout/\eta \quad (2)$$

When an average value of the bus current IPN is expressed by an average bus current IPNave, the average bus current IPNave [A] can be expressed by the following formula using the capacitor voltage VDC [V].

$$IPNave = Pin/VDC \quad (3)$$

From the formulas (2) and (3), the following formula can be derived.

$$IPNave = Pout/(\eta \times VDC) \quad (4)$$

As described above, it is possible to calculate the average bus current IPNave from the motor output Pout. The average bus current of the formula (4) represents the average value of the bus current IPN flowing during motor power running and motor regeneration in FIG. 7. The formula (4) indicates that as the motor output Pout increases, the R-phase current Ir, the S-phase current Is, the T-phase current It, and the bus current IPN increase, and a value of a current flowing through each power element constituting the power module 22 also increases.

FIG. 8 illustrates waveforms of the rectified current ID and the bus current IPN flowing per cycle of the power supply during motor power running. The rectified current ID is illustrated in an upper portion of the figure, and the bus current IPN is illustrated in a lower portion thereof. Similarly to FIG. 4, the rectified current ID has a waveform which indicates that a current flows through each rectifier element only for a period equivalent to T/3 with respect to one cycle T of the power supply. Here, in the waveform in the lower portion, when the current waveform is regarded as a sine half wave and a peak current value of each of the bus current IPN and the rectified current ID is denoted by IDpeak1, the following formula can be derived.

$$IDpeak1 = IPNave \times \pi/2 \quad (5)$$

From the formulas (4) and (5), the following formula can be derived.

$$IDpeak1 = \pi \times Pout/(2 \times \pi \times VDC) \quad (6)$$

Figure 9:
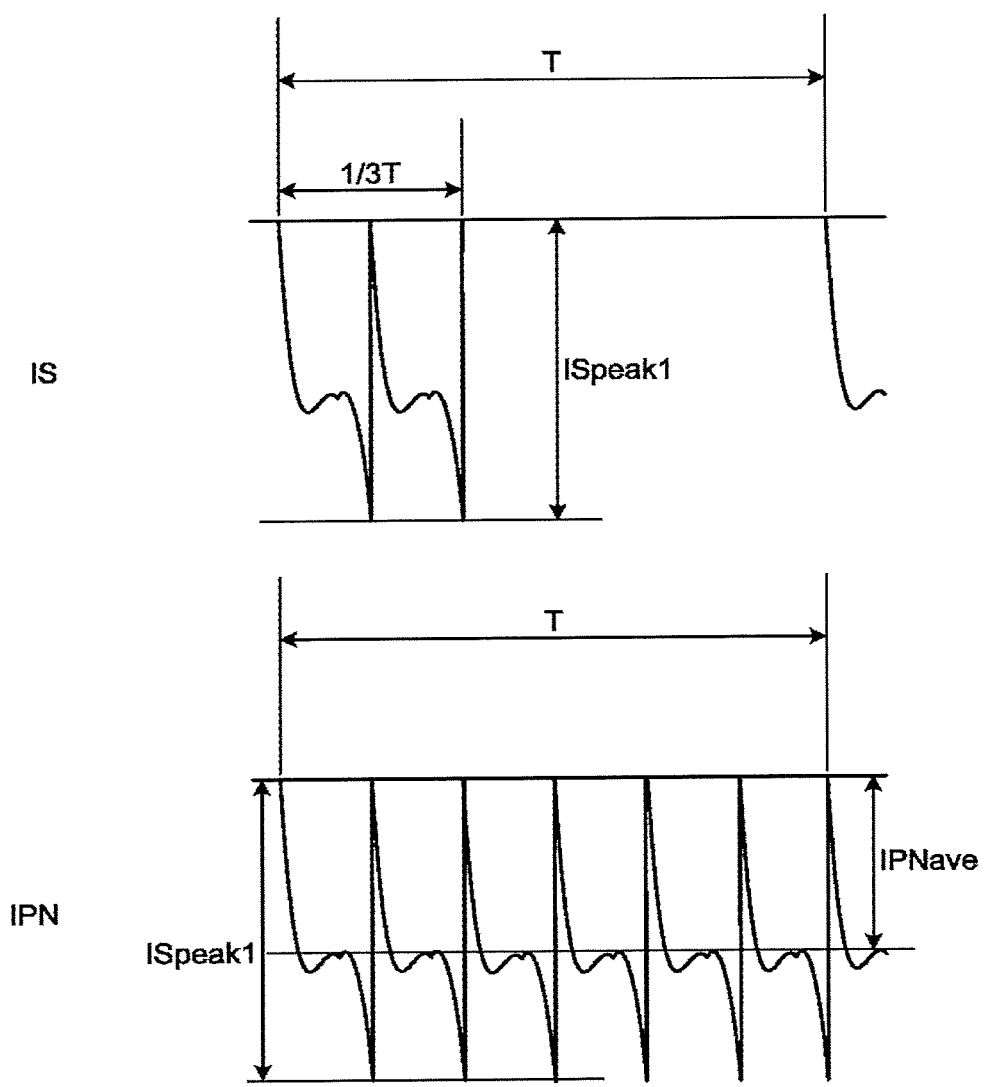
FIG. 9 is a set of waveform diagrams illustrating a regenerative current and the bus current flowing per cycle of the power supply during motor regeneration.

FIG. 9 illustrates waveforms of the regenerative current IS and the bus current IPN flowing per cycle of the power supply during motor regeneration. The regenerative current IS is illustrated in an upper portion of the figure, and the bus current IPN is illustrated in a lower portion thereof. Similarly to FIG. 6, the regenerative current IS has a waveform which indicates that a current flows through each regenerative switching element only for a period equivalent to T/3 with respect to one cycle T of the power supply. Here, although the actual current waveform flowing during motor regeneration changes due to an influence of the source impedance of the input power supply, when a ratio of a regenerative current peak value ISpeak1 employing the average bus current IPNave as reference as illustrated in FIG. 9 is denoted by α (α is a real number of 1 or more), the following formula can be used for expression thereof.

$$ISpeak1 = \alpha \times IPNave \quad (7)$$

From the formulas (4) and (7), the following formula can be derived.

$$ISpeak1 = \alpha \times Pout/(\eta \times VDC) \quad (8)$$

According to the formulas (6) and (8), when the motor output Pout increases during motor power running or motor regeneration, the power running current peak value IDpeak1 or the regenerative current peak value ISpeak1 also increases. At that time, a current flowing through each element constituting the power module 22 also increases. As can be seen from FIGS. 4 and 6, the current peak value of the bus current IPN and the peak value of the current flowing through each element have the same value, and as the motor output Pout increases, the peak value of each current also increases.

Capacity of the power regenerative converter 1 is determined by the allowable continuous rated output capacity and the allowable maximum output capacity as described above, and both the allowable continuous rated output capacity and the allowable maximum output capacity are determined by characteristics of the power module 22.

Figure 10:
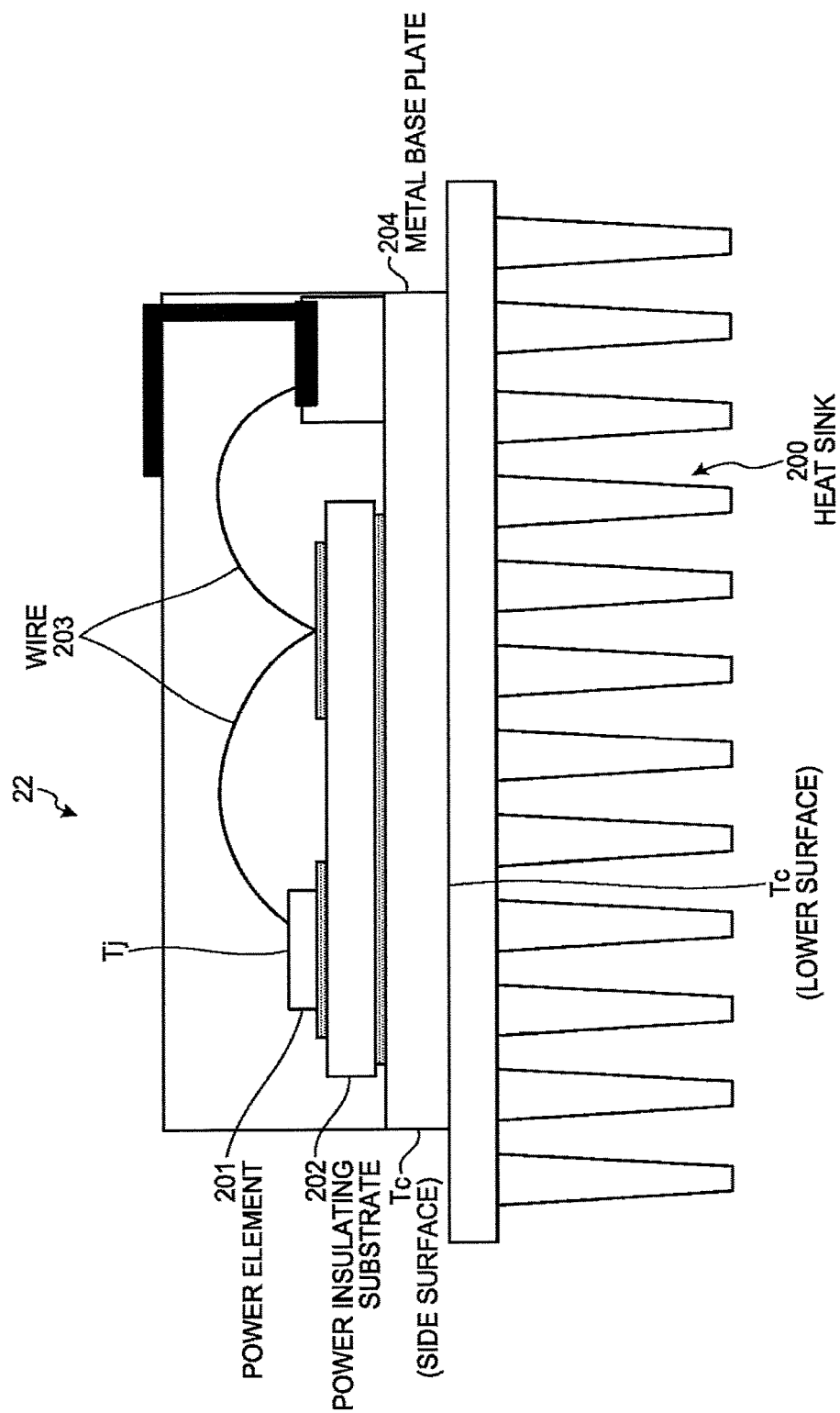
FIG. 10 is a cross-sectional view illustrating a configuration example of a power conversion device using a power module.

FIG. 10 illustrates a configuration example of a power conversion device using a power module. The power module is constituted by various materials having different coefficients of thermal expansion. Regarding the example illustrated in FIG. 10, the power module 22 is constituted by a metal base plate 204 for dissipating heat, a power insulating substrate 202 having a circuit pattern, a wire 203, and a power element 201. The power insulating substrate 202 is soldered or metal bonded on the metal base plate 204, and the power element 201 is soldered to the power insulating substrate 202. In order to connect another circuit pattern of the power insulating substrate 202 and the power element 201, the power element 201 and the wire 203 are bonded by soldering. A power conversion device such as a power regenerative converter or a motor drive device uses a heat sink in order to cool a power module which generates heat, in general. The metal base plate 204 is contacted and connected to a heat sink 200 via thermal grease for heat dissipation (not illustrated). A temperature of each portion of the power module 22 is generally treated by defining a temperature at a junction of the power element 201 and the wire 203 as a junction temperature Tj, and a temperature at a side or lower surface of the metal base plate 204 as a case temperature Tc.

The temperature of each portion of the power module can be calculated by (power loss generated in the power element)×(thermal resistance of each portion)+(ambient temperature). The thermal resistance is a value indicating a difficulty of transmitting a temperature, and means an amount of temperature rise per heat generation amount in unit time. It means that the smaller the thermal resistance, the better the heat dissipation, and the unit is "° C./W". When (power loss generated in the power element), (thermal resistance of each portion), and (ambient temperature) are replaced by (current), (electric resistance), and (bias voltage), respectively, the above heat calculation can be replaced by Ohm's law of electric circuits.

Therefore, heat conduction of the power conversion device using the power module constituted by the power elements as described above can be replaced with an electric circuit model, and it is common to calculate the temperature rise of each portion by using the electric circuit model as a heat conduction model.

Figure 11:
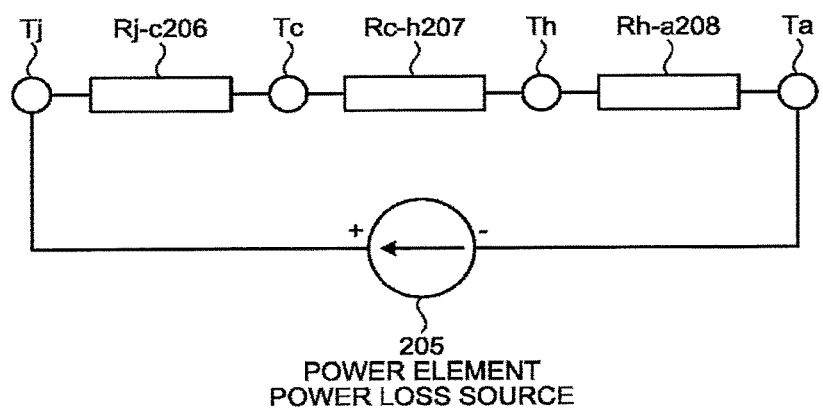
FIG. 11 is a circuit diagram illustrating a heat conduction model of the power conversion device.

FIG. 11 illustrates a heat conduction model of the power conversion device. In the heat conduction model illustrated in FIG. 11, a power loss in a power element as a heat source is regarded as a current source (hereinafter described as "power element power loss source 205"), and case-to-junction thermal resistance Rj-c206, heat sink-to-case thermal resistance Rc-h207, and heat sink-to-ambient temperature thermal resistance Rh-a208 are connected in this order from a positive terminal of the power element power loss source 205, and one end of the heat sink-to-ambient temperature thermal resistance Rh-a208 is connected to a negative terminal of the power element power loss source 205. A temperature at a connection point between the positive terminal of the power element power loss source 205 and the case-to-junction thermal resistance Rj-c206, a temperature at a connection point between the case-to-junction thermal resistance Rj-c206 and the heat sink-to-case thermal resistance Rc-h207, a temperature at a connection point between the heat sink-to-case thermal resistance Rc-h207 and the heat sink-to-ambient temperature thermal resistance Rh-a208, and a temperature at a connection point between the heat sink-to-ambient temperature thermal resistance Rh-a208 and the negative terminal of the power element power loss source 205 can be regarded as a junction temperature Tj, a case temperature Tc, a heat sink temperature Th, and an ambient temperature Ta, respectively. The temperature of each portion can be calculated from a power loss generated in the power element and the thermal resistance value of each portion using Ohm's law in the electric circuit model.

For example, when calculating the junction temperature Tj of the power element by employing the power loss generated in the power element denoted by Pp, the ambient temperature Ta, case-to-junction thermal resistance Rj-c of the power element, heat sink-to-case thermal resistance Rc-h of the power element, and heat sink-to-ambient temperature thermal resistance Rh-a of the power element, the following formula can be derived from FIG. 11.

$$Tj=(Rj\text{-}c+Rc\text{-}h+Rh\text{-}a)\times Pp+Ta \quad (9)$$

The case temperature Tc due to the power loss generated in the power element can also be calculated by the following formula similarly to the formula (9).

$$Tc=(Rc\text{-}h+Rh\text{-}a)\times Pp+Ta \quad (10)$$

When temperature rise values of the junction temperature Tj and the case temperature Tc from the ambient temperature Ta are respectively defined as junction temperature rise $\Delta Tj$ and case temperature rise $\Delta Tc$, $\Delta Tj$ and $\Delta Tc$ can be respectively expressed by the following formulas.

$$\Delta Tj = (Rj-c+Rc-h+Rh-a)\times Pp+Ta-Ta \quad (11)$$
$$= (Rj-c+Rc-h+Rh-a)\times Pp$$

$$\Delta Tc = (Rc-h+Rh-a)\times Pp+Ta-Ta \quad (12)$$
$$= (Rc-h+Rh-a)\times Pp$$

When a temperature difference between the junction temperature Tj and the case temperature Tc is defined as a case-to-junction temperature $\Delta Tj$-c, $\Delta Tj$-c can be expressed by the following formula.

$$\Delta Tj-c = Tj-Tc \quad (13)$$
$$(Rj-c+Rc-h+Rh-a)\times Pp+Ta-$$
$$(Rc-h+Rh-a)\times Pp+Ta$$
$$= Rj-c\times Pp$$
$$= \Delta Tj-\Delta Tc$$

Therefore, the junction temperature rise $\Delta Tj$ can be expressed by the following formula using the case-to-junction temperature $\Delta Tj$-c and the case temperature rise $\Delta Tc$.

$$\Delta Tj=\Delta Tj\text{-}c+\Delta Tc=Rj\text{-}c\times Pp+\Delta Tc \quad (14)$$

Figure 12:
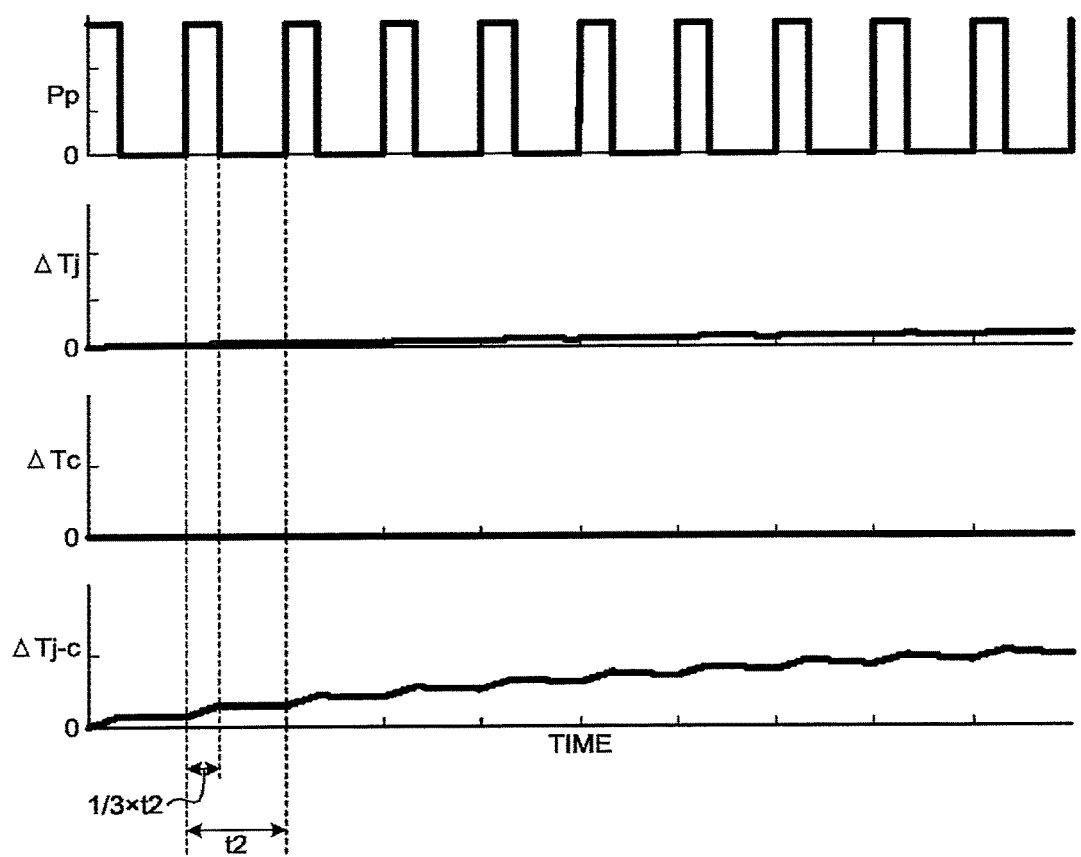
FIG. 12 is a set of waveform diagrams illustrating a short-time temperature rise in the power module.
Figure 13:
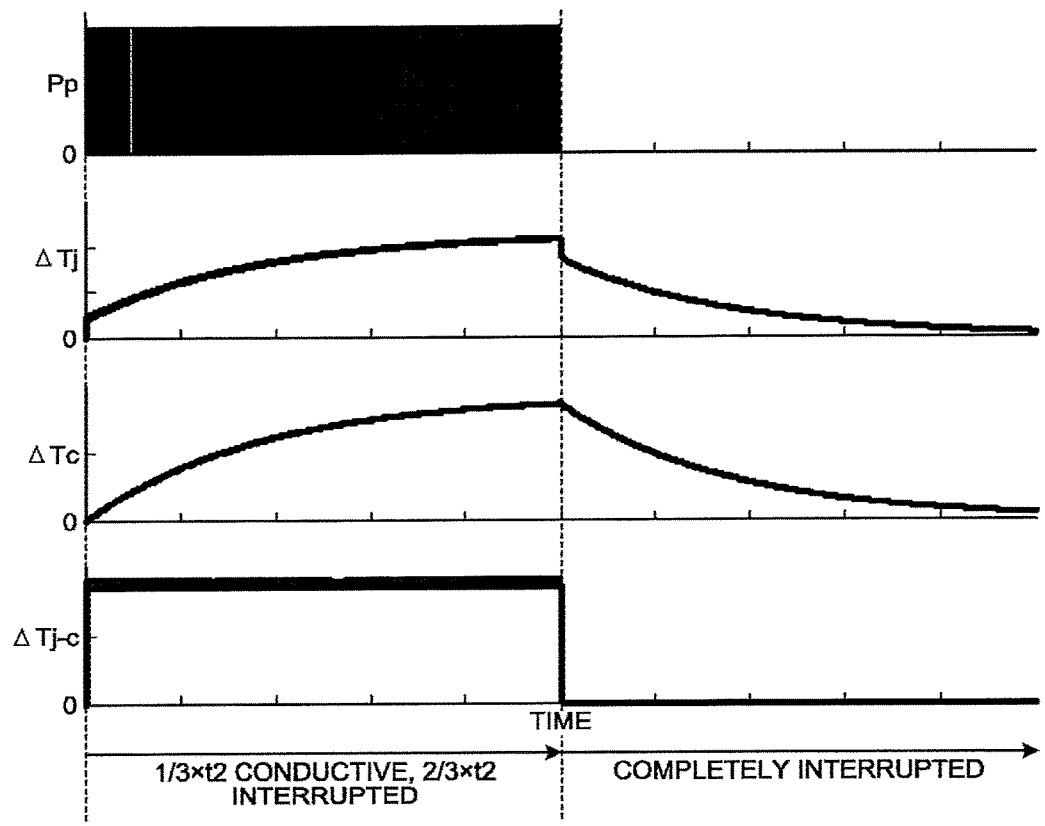
FIG. 13 is a set of waveform diagrams illustrating a long-time temperature rise in the power module.

The temperature rise when the power element 201 of the power module 22 illustrated in FIG. 10 is made conductive to flow a current will be described with reference to FIGS. 12 and 13. FIGS. 12 and 13 are waveform diagrams illustrating temperature rise of the power module. Particularly, FIG. 12 illustrates a state of short-time temperature rise, and FIG. 13 illustrates a state of long-time temperature rise. FIGS. 12 and 13 each illustrate, from an upper side thereof, changes with time of the power loss Pp, the junction temperature rise $\Delta Tj$, the case temperature rise $\Delta Tc$, and the case-to-junction temperature $\Delta Tj$-c.

FIG. 12 illustrates a behavior when an operation was repeated for 10 cycles. In the operation, in a period of a cycle t2, the power element was made conductive to flow a current for ⅓ of the cycle, and the power element was interrupted to interrupt the current for the remaining ⅔ of the cycle. FIG. 13 illustrates a behavior when an operation, in which the power element was made conductive for ⅓ of the cycle and was interrupted for the remaining ⅔ of the cycle, was performed 50,000 cycles, and the conduction of the power element was completely interrupted for remaining 50,000 cycles. In each of FIGS. 12 and 13, the range of the ordinate of the case-to-junction temperature $\Delta Tj$-c is indicated in a range five times larger than those of the junction temperature rise $\Delta Tj$ and the case temperature rise $\Delta Tc$. The following can be seen from FIGS. 12 and 13.

(1) The junction temperature rise $\Delta Tj$ and the case temperature rise $\Delta Tc$ increase in this order.

(2) In the short-time operation, the junction temperature rise $\Delta Tj$ increases with an increase in the case-to-junction temperature rise $\Delta Tj$-c, whereas the case temperature rise $\Delta Tc$ hardly increases (See FIG. 12).

(3) In the long-time operation, the case-to-junction temperature rise $\Delta Tj$-c is saturated, whereas the junction temperature rise $\Delta Tj$ also increases with an increase in the case temperature rise $\Delta Tc$ (See FIG. 13).

In the formulas (9) to (14), the thermal resistance of each portion is assumed to be constant. When the thermal resistance is constant, a waveform proportional to the power loss generated in the powe8, r element has to be exhibited since the temperature rise value is (power loss generated in the power element)×(thermal resistance). However, as can be seen from FIGS. 12 and 13, the waveform is not proportional to the power loss generated in the power element. This is because the thermal resistance value of each portion is not constant and the thermal resistance value changes with supply time of power that causes the power loss (hereinafter this characteristic will be referred to as "transient thermal resistance characteristic").

As described above, the case-to-junction temperature $\Delta Tj$-c is saturated in a short time. This is because the case-to-junction thermal resistance Rj-c is of transient thermal resistance characteristic determined by the characteristics of the power element and the configuration of the power module, and is of characteristic which makes the thermal resistance value constant in a short time. On the other hand, the case temperature rise ΔTc takes a long time to increase. This is because each of the heat sink-to-case thermal resistance Rc-h and the heat sink-to-ambient temperature thermal resistance Rh-a is of transient thermal resistance characteristic determined by cooling performance of the heat sink, and a thermal time constant is long so that it takes a long time to saturate.

In a case where the thermal resistance of each portion can be regarded as constant by a long-time operation, the temperature rise of each portion of the power module can be calculated from any of the formulas (9) to (14). The temperature rise of each portion in a case of a short-time operation is smaller than the value calculated by each of the formulas (9) to (14).

Meanwhile, in a power module used in a power conversion device such as that described above, stress distortion occurs in a junction between different types of metal due to a temperature change depending on a difference in a thermal expansion coefficient as described above, and repetition of the stress leads to fatigue fracture. Therefore, the power module has a fatigue life caused by thermal stress due to a temperature change, that is, a thermal stress life. Generally, the case temperature rise ΔTc and the junction temperature rise ΔTj are used to determine the thermal stress life of the power module.

When a current flows through the power element, the power element generates heat, and the case temperature rise ΔTc and the junction temperature rise ΔTj both increase. As can be seen from FIGS. 12 and 13, in general, in a power conversion device using a power module, the junction temperature rise ΔTj increases in a short time relative to the case temperature rise ΔTc. Therefore, when conduction and interruption of an excessive current are repeatedly performed on the power element in a short time, although a change in the case temperature rise ΔTc is small, only the junction temperature rise/Tj greatly fluctuates. This is because the case-to-junction temperature ΔTj-c increases more greatly. A life in a case where the junction temperature Tj fluctuates greatly in a short time is referred to as power cycle life. Regarding the power cycle life, the number of cycles is generally specified by using the junction temperature rise ΔTj, which is a change in the junction temperature.

As opposed to power cycle life, there is a life called thermal cycle life. The thermal cycle life is a life in a case where the case-to-junction temperature ΔTj-c is substantially constant and saturated in a long-time operation, a temperature difference between the case temperature Tc and the junction temperature Tj is small, and the case temperature Tc rises. Therefore, regarding the thermal cycle life, the number of cycles is generally specified by using ΔTc which is a change in the case temperature. In addition, the thermal cycle life largely depends on cooling performance of a power conversion device which uses the power module.

As described above, the power cycle life indicates a life in a short-time operation as described above, and determines allowable maximum output in the power regenerative converter. Therefore, securement of the power cycle life can be defined by an allowable maximum current value Imax of the power element.

On the other hand, the thermal cycle life indicates a life in a long-time operation as described above, and determines allowable continuous rated output in the power regenerative converter. Therefore, securement of the thermal cycle life can be defined by an allowable maximum case temperature rise ΔTcmax of the power module.

The power regenerative converter 1 to which the above concept is applied is as follows. The allowable continuous rated output capacity of the power regenerative converter 1 is determined by the allowable maximum case temperature rise ΔTcmax of the power module 22, and the allowable maximum output capacity of the power regenerative converter 1 is determined by the allowable maximum current value Imax of the power module 22. Therefore, it is necessary to satisfy a steady operation of the motor so that the allowable continuous rated output capacity is equal to or less than the allowable maximum case temperature rise Tcmax. On the other hand, it is necessary to suppress the maximum output of the motor so that the allowable maximum output capacity is equal to or less than the allowable maximum current value Imax of the power elements of the power module 22.

Next, the principle of temperature rise of the power module 22 will be described. As illustrated in FIGS. 4 and 6, each power element constituting the power module 22 in the power regenerative converter 1 conducts for a period equivalent to ⅓ of the power supply cycle of the input power supply 3 to cause a current to flow. Here, when a current flowing through each rectifier element and a forward voltage of each rectifier element during motor power running are denoted by ID [A] and VF [V], respectively, the loss PD [W] generated in each rectifier element can be expressed by the following formula. In a case of a power regenerative converter with a 120-degree conduction method, the influence of switching losses is negligible compared to that of conduction losses and therefore is neglected.

$$PD = ID \times VF \quad (15)$$

In the power module 22, when the case-to-junction thermal resistance of each rectifier element is denoted by Rd(j-c) [° C./W] and the case temperature is denoted by Tdc [° C.], the junction temperature Tdj [° C.] of each rectifier element can be expressed by the following formula.

$$Tdj = PD \times Rd(j\text{-}c) + Tdc \quad (16)$$

From the formulas (15) and (16), the following formula can be derived.

$$Tdj = ID \times VF \times Rd(j\text{-}c) + Tdc \quad (17)$$

From the formula (17), the case-to-junction temperature ΔTdj-c can be expressed by the following formula.

$$\Delta Tdj\text{-}c = Tdj - Tdc = ID \times VF \times Rd(j\text{-}c) \quad (18)$$

Next, temperature rise of the regenerative switching elements during motor regeneration will be described. When a regenerative current flows due to the switching operation during motor regeneration, a period during which the current flows through each regenerative switching element is only a period equivalent to ⅓ of the power supply cycle of the input power supply 3. When the current flowing through each regenerative switching element and a saturation voltage of each regenerative switching element during motor regeneration are denoted by IS [A] and Vce(sat) [V], respectively, the loss PS [W] generated in each regenerative switching element can be expressed by the following formula. In a case of a power regenerative converter with a 120-degree conduction method, the influence of switching losses is negligible compared to that of conduction losses and therefore is neglected.

$$PS = IS \times Vce(\text{sat}) \quad (19)$$

In the power module 22, when the case-to-junction thermal resistance of each regenerative switching element is denoted by Rs(j–c) [° C./W] and the case temperature is denoted by Tsc [° C.], the junction temperature Tsj [° C.] of each regenerative switching element can be expressed by the following formula.

$$Tsj = PS \times Rs(j\text{-}c) + Tsc \qquad (20)$$

Therefore, the following formula can be derived by substituting the formula (19) into the formula (20).

$$Tsj = IS \times Vce(\text{sat}) \times Rs(j\text{-}c) + Tsc \qquad (21)$$

From the formula (21), the case-to-junction temperature $\Delta Tsj\text{-}c$ [K] can be expressed by the following formula.

$$\Delta TSj\text{-}c = Tsj - Tsc = IS \times Vce(\text{sat}) \times Rs(j\text{-}c) \qquad (22)$$

As described above, when an excessive current flows through the power element constituting the power module 22 in a short time, the junction temperature rise $\Delta Tj$ increases more greatly with respect to the increase in the case temperature rise $\Delta Tc$, and the junction temperature rise $\Delta Tj$ becomes excessive. This is equivalent to that the case-to-junction temperature $\Delta Tj\text{-}c$ becomes excessive. In such a case, life degradation due to the power cycle life is assumed, and the power module 22 may be damaged earlier than assumed.

The forward voltage VF and the case-to-junction thermal resistance Rd(j-c) of each rectifier element, as well as the saturation voltage Vce(sat) and the case-to-junction thermal resistance Rs(j-c) of each regenerative switching element are known in advance from the electrical characteristics and the structure of the power module 22. Therefore, the allowable maximum current of the power module 22 during the power running operation and the regenerative operation can be calculated from the formulas (18) and (22).

Figure 14:
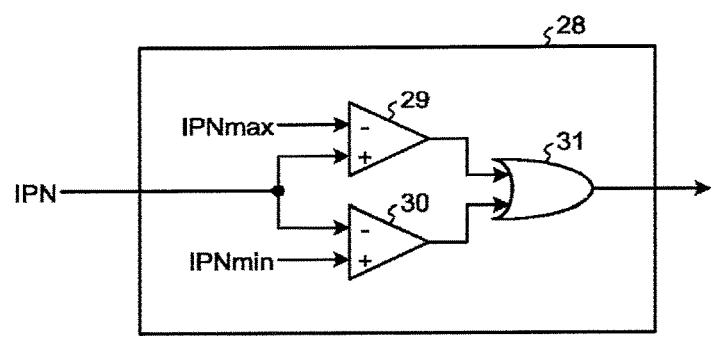
FIG. 14 is a block diagram illustrating a configuration example of an overload detection unit in the first embodiment.

Next, the overload detection unit 28 will be described. The overload detection unit 28 detects whether the power regenerative converter 1 is overloaded based on the bus current IPN which is an output signal of the bus current detection unit 25. FIG. 14 illustrates a configuration example of the overload detection unit 28.

As illustrated in FIG. 14, the overload detection unit 28 is configured to include a comparator 29, a comparator 30, and an OR circuit 31. A bus current upper limit value IPNmax is input to a negative input terminal of the comparator 29, and the bus current IPN is input to a positive input terminal of the comparator 29. A bus current lower limit value IPNmin is input to a positive input terminal of the comparator 30, and the bus current IPN is input to a negative input terminal of the comparator 30. Respective output signals of the comparators 29 and 30 are input to an input terminal of the OR circuit 31, and an output signal of the OR circuit 31 is treated as an output signal of the overload detection unit 28. Here, when the overload detection unit 28 outputs "logic one" or "logic H" (hereinafter simply described as "H"), it is determined that the power regenerative converter 1 is in an overload condition and when the overload detection unit 28 outputs "logic zero" or "logic L" (hereinafter simply described as "L"), it is determined that the power regenerative converter 1 is not in the overload condition.

The bus current upper limit value IPNmax is determined based on the aforementioned formula (18) and is equivalent to the allowable maximum current value during the power running operation. The bus current lower limit value IPNmin is determined based on the aforementioned formula (22) and is equivalent to the negative of the allowable maximum current value during the regenerative operation.

According to the above configuration, when the bus current IPN increases to be equal to or larger than the bus current upper limit value IPNmax, the comparator 29 outputs H, and H is input to the OR circuit 31. As a result, the OR circuit 31 outputs H, and the overload detection unit 28 outputs H. When the bus current IPN decreases to be equal to or less than the bus current lower limit value IPNmin, the comparator 30 outputs H, and H is input to the OR circuit 31. As a result, the OR circuit 31 outputs H, and the overload detection unit 28 outputs H.

As can be seen from FIGS. 4 and 6, by monitoring the bus current IPN, it is possible to monitor the current flowing through each element constituting the power module 22 regardless of whether during motor power running or motor regeneration. The overload detection unit 28 is configured to monitor the bus current IPN, and can determine whether the power regenerative converter 1 is in the overload condition. Regarding the power module 22, an allowable current during power running is denoted by IPNmax and an allowable current during regeneration is denoted by IPNmin. When IPN ≥ IPNmax or IPN ≤ IPNmin is satisfied, the overload detection unit 28 outputs H and it is determined that the overload condition has occurred.

As described above, in the motor control device according to the first embodiment, the current values during motor power running and motor regeneration are monitored by monitoring the bus current IPN, and it is determined whether the power regenerative converter 1 is operating at most at the allowable maximum current value of the power module 22, that is, it is determined whether the power regenerative converter 1 is in an instantaneous overload condition.

In the configuration of the first embodiment, a current detection unit needs to be provided only for detecting the bus current. Therefore, the number of the current detection units can be reduced as compared with the aforementioned conventional art, which is advantageous in terms of cost. Generally, a power regenerative converter is required to monitor an input current input to the power regenerative converter from an input power supply and to include an input current to direct-current conversion unit. However, a configuration for detecting a direct current is employed in the present embodiment, which obviates the necessity of the input current to direct-current conversion unit, and makes it possible to simplify the system. Details of a process of stopping the power regenerative operation will be described later.

The motor control device according to the first embodiment is configured based on the power cycle life of the power module 22 used in the power regenerative converter 1, and is suitable for detection of a case where the motor output Pout is excessive beyond assumptions in an operation. Although IPNmax and IPNmin are respectively determined based on the aforementioned formulas (18) and (22), the determined IPNmax and IPNmin may be multiplied by a positive real number of 1 or less to obtain values smaller than those respectively calculated from the formulas (18) and (22) in order to secure a margin.

As described above, according to the motor control device of the first embodiment, the overload of the power regenerative converter can be detected without complicating the system, and it is possible to achieve a power regenerative converter with high reliability at low cost through reduction of parts by reducing the current detection units and removing an input-current to direct-current conversion unit.

Second Embodiment

Figure 15:
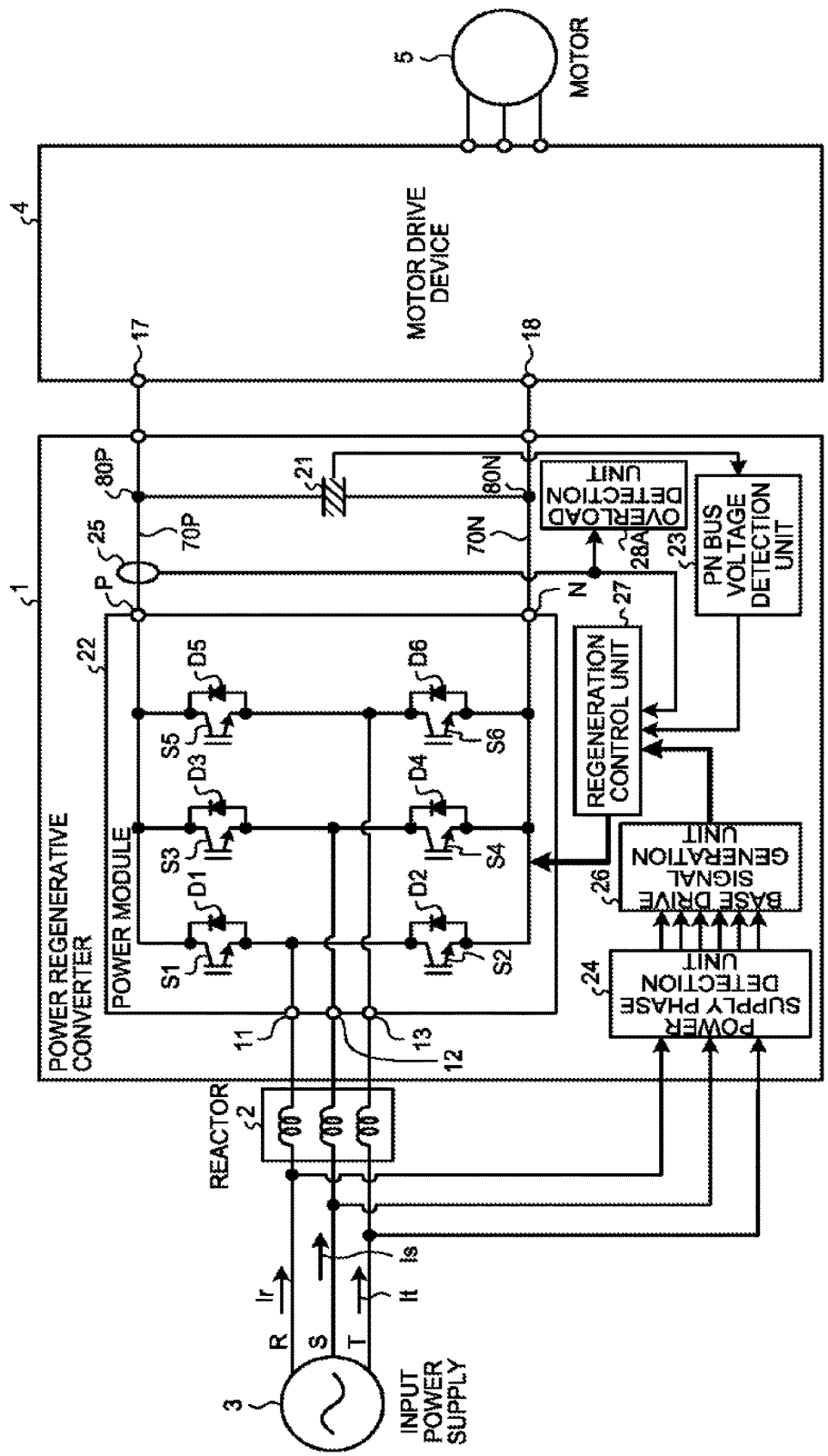
FIG. 15 is a block diagram illustrating a configuration of a motor control device according to a second embodiment.

FIG. 15 is a block diagram illustrating a motor control device including a power regenerative converter according to a second embodiment. In FIG. 15, the same reference signs are given to constituent elements which are the same as or equivalent to the constituent elements according to the first embodiment illustrated in FIG. 1. Here, a description will be given focusing on parts relating to the second embodiment. In FIG. 15, in the power regenerative converter according to the second embodiment, an overload detection unit 28A is provided in place of the overload detection unit 28 in the configuration illustrated in FIG. 1.

The overload detection unit 28A will be described. The overload detection unit 28A has a function of determining a steady-state overload condition and this determination function is constituted based on the thermal cycle life of the power module 22.

Figure 16:
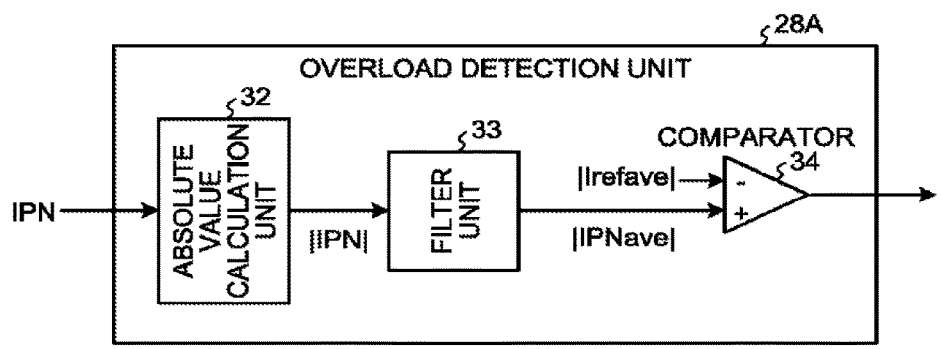
FIG. 16 is a block diagram illustrating a configuration example of an overload detection unit according to the second embodiment.

FIG. 16 is a block diagram illustrating a configuration example of the overload detection unit 28A. As illustrated in FIG. 16, the overload detection unit 28A is configured to include an absolute value calculation unit 32, a filter unit 33, and a comparator 34.

In the overload detection unit 28A, the bus current IPN detected by the bus current detection unit 25 is input to the absolute value calculation unit 32. The absolute value calculation unit 32 calculates a bus current absolute value |IPN|. The calculated bus current absolute value |IPN| is input to the filter unit 33. The filter unit 33 calculates an average bus current absolute value |IPNave|. The calculated average bus current absolute value |IPNave| is input to a positive terminal of the comparator 34. An average threshold current absolute value |Irefave| is input to a negative terminal of the comparator 34, a signal indicating a magnitude relationship between the average bus current absolute value |IPNave| and the average threshold current absolute value |Irefave| is an output signal of the comparator 34, and the output signal of the comparator 34 is an output signal of the overload detection unit 28A.

As described above, the filter unit 33 has a function of calculating the average bus current absolute value |IPNave| from the bus current absolute value |IPN|. This function can be achieved by a moving average filter or an IIR filter.

Next, an operation of the overload detection unit 28A will be described. The overload detection unit 28A detects whether the power regenerative converter 1 is overloaded based on the bus current IPN detected by the bus current detection unit 25. With the above configuration, when the average bus current absolute value |IPNave| increases to be equal to or larger than the average threshold current absolute value |Irefave|, the comparator 34 outputs H, and therefore, the overload detection unit 28A outputs H.

As can be seen from the aforementioned formula (3), the power Pin to be supplied to the motor drive device 4 by the power regenerative converter 1 can be calculated based on the average bus current IPNave and the capacitor voltage VDC. In addition, according to the formula (3), when the power regenerative converter 1 does not change the power Pin to be supplied to the motor drive device 4, the average bus current IPNave can be reduced when the capacitor voltage VDC is large. On the other hand, an operation of the power regenerative converter 1 has characteristics that the number of switching operations of the power elements constituting the power module 22 is small and a conduction time is long. Therefore, the losses generated in the power module 22 in the power regenerative converter 1 are dominated by conduction losses, and the average bus current IPNave, which is highly involved in the conduction losses, is dominant. Therefore, the average bus current IPNave is used which is calculated based on a case where the capacitor voltage VDC is the lowest voltage assumed as the capacitor voltage VDC.

Next, the filter unit 33 will be described. As described above, the filter unit 33 has a function of calculating the average bus current absolute value |IPNave| from the bus current absolute value |IPN|, and this function can be constituted by a moving average filter or an IIR filter. Here, a first-order lag IIR filter is assumed. When a transfer function of the filter unit 33 constituted by the IIR filter is denoted by G1(s), the transfer function G1(s) can be expressed by the following formula while denoting a Laplace operator by s, and a time constant by ts1.

$$G1(s)=1/(ts1 \times s+1) \quad (23)$$

In addition, when the allowable continuous rated output capacity of the power regenerative converter 1 is denoted by Pinave and an inter-terminal minimum voltage of the smoothing capacitor 21 is denoted by VDCmin, an allowable bus current average value Iavemax can be expressed by the following formula.

$$Iavemax=Pinave/VDCmin \quad (24)$$

As described above, the allowable continuous rated output capacity of the power regenerative converter 1 has to satisfy a steady operation of the motor in which a case temperature rise $\Delta Tc$ of the power module 22 is equal to or less than an allowable maximum case temperature rise $\Delta Tcmax$.

Next, the increase in the case temperature rise $\Delta Tc$ of the power module 22 used in the power regenerative converter 1 will be described. As described above, in the power conversion device using the power module, the junction temperature Tj and the case temperature Tc increase in this order, and the saturation temperature of each of the junction temperature Tj and the case temperature Tc is determined by cooling performance of the heat sink. When the cooling performance of the heat sink is high, a thermal time constant is prolonged, the case temperature Tc is less likely to rise, and regarding both of the junction temperature Tj and the case temperature Tc, the saturation temperatures decrease.

The cooling performance of the heat sink can be grasped at a design stage and a performance evaluation stage of the power conversion device. In addition, the case-to-junction thermal resistance R(j-c) can also be grasped at a design stage thereof. Therefore, it is possible to calculate the case temperature rise $\Delta Tc$ of the power module 22 during a long-time operation of the motor from losses generated in the power module 22 and the cooling performance of the heat sink.

Figure 17:
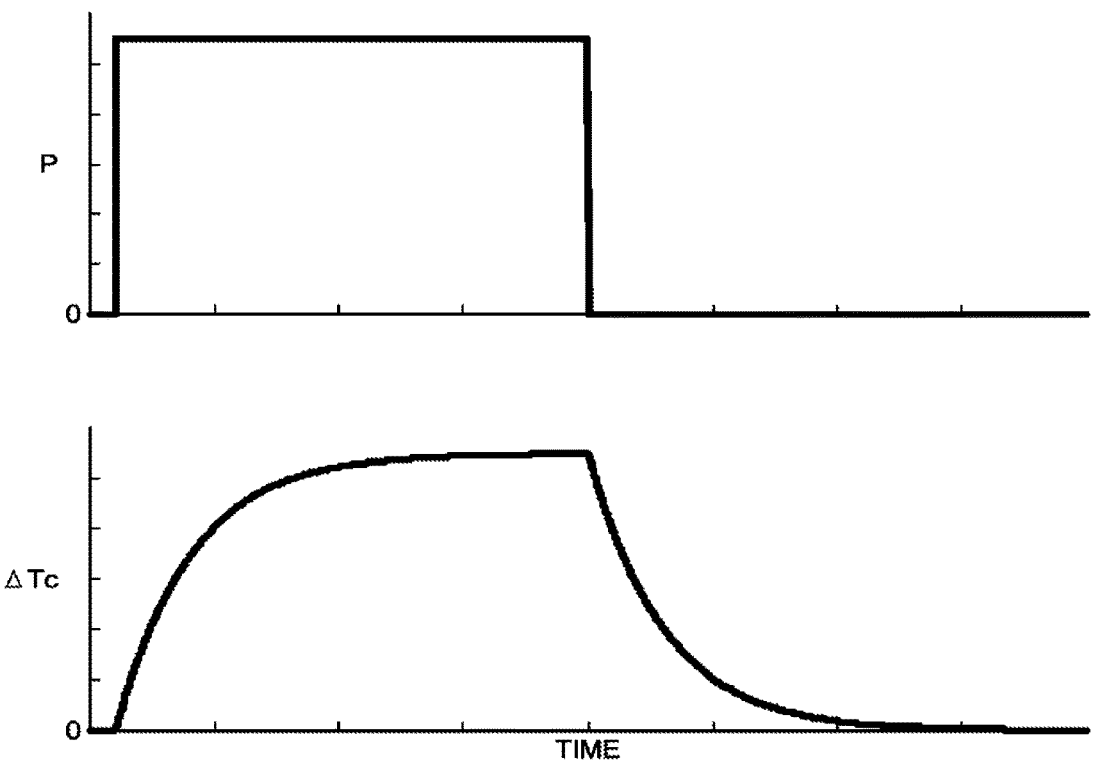
FIG. 17 is a set of waveform diagrams illustrating a relationship between a loss generated in a power element and a case temperature rise.

FIG. 17 illustrates a relationship between a loss P generated in the power element and the case temperature rise $\Delta Tc$. In an upper portion of FIG. 17, a waveform of the generated loss P which changes stepwise is illustrated. In a lower portion thereof, the case temperature rise $\Delta Tc$ when the loss P generated in the power element changes stepwise is illustrated. As can be seen from FIG. 17, a change characteristic of the case temperature rise $\Delta Tc$ is close to that of a lag filter of several orders (for example, IIR filter).

From the diagrams illustrating the relationship between the loss P generated in the power element and the case temperature rise $\Delta Tc$ illustrated in FIG. 17, a transfer characteristic using a loss P(s) generated in the power element as input and a case temperature rise $\Delta Tc(s)$ as output is approximated with a formula having a transfer characteristic of first-order lag. The case temperature rise $\Delta Tc$ is expressed by the following formula, using a Laplace operator denoted by s, a conversion constant which is a positive real number denoted by $\alpha$, and a time constant denoted by tc1.

$$\Delta Tc(s) = \alpha/(1+s \times tc1) \times P(s) \quad (25)$$

The conversion constant $\alpha$ in the above formula (25) is calculated from a case temperature rise value Tcm which saturates when the loss P generated in the power element is constant, and can be expressed by the following formula.

$$\alpha = Tcm/P \quad (26)$$

When an average loss generated in the power elements is denoted by Pave, the case temperature rise $\Delta Tc$ can be expressed by the following formula from the formula (26).

$$\Delta Tc = \alpha \times Pave \quad (27)$$

As described above, when the transfer characteristic based on the thermal time constant and the conversion constant as expressed by the formula (25) is used in the design stage and a performance evaluation stage, and Pave of the power element is detected, the case temperature rise $\Delta Tc$ can be calculated.

The loss P generated in the power element of the power module 22 can be calculated from a current flowing through the power element as can be seen from the formulas (15) and (19). In order to express a loss generated in each of rectifier elements and regenerative switching elements which are power elements of the power module 22 as a function of the time t, the losses are described as PD(t) and PS(t), respectively.

When a current flowing through each rectifier element is denoted by ID(t), the loss PD(t) generated in each rectifier element can be expressed by the following formula using the formula (15).

$$PD(t) = VF \times ID(t) \quad (28)$$

Similarly, when a current flowing through each regenerative switching element is denoted by IS(t), the loss PS(t) generated in each regenerative switching element can be expressed by the following formula using the formula (19).

$$PS(t) = Vce(\text{sat}) \times IS(t) \quad (29)$$

When Laplace transform is applied to each of the formulas (28) and (29), results of the Laplace transform can be expressed by the following formulas, respectively.

$$PD(s) = VF \times ID(s) \quad (30)$$

$$PS(s) = Vce(\text{sat}) \times IS(s) \quad (31)$$

By inputting the formula (30) into the formula (25), the following formula can be derived.

$$\Delta Tdc(s) = \alpha/(1+s \times tc1) \times VF \times ID(s) \quad (32)$$

With the use of the above formula (32), it is possible to calculate the case temperature rise $\Delta Tdc$ due to the loss generated in each rectifier element.

In addition, by inputting the formula (31) into the formula (25), the following formula can be derived.

$$\Delta Tsc(s) = \alpha/(1+s \times tc1) \times Vce(\text{sat}) \times IS(s) \quad (33)$$

With the use of the above formula (33), it is possible to calculate the case temperature rise $\Delta Tsc$ due to the loss generated in each regenerative switching element.

The temperature rise of the power module during a long-time operation is generally calculated from an average of generated losses, and the average of generated losses is generally calculated by using an average value of currents flowing through respective power elements, that is, an average current. When an average current flowing through each rectifier element is denoted by IDave and an average current flowing through each regenerative switching element is denoted by ISave, the case temperature rises $\Delta Tdc$ and $\Delta Tsc$ in a long-time operation sufficiently longer than the time constant tc1 can be expressed by the following formulas, respectively.

$$\Delta Tdc = \alpha \times VF \times IDave \quad (34)$$

$$\Delta Tsc = \alpha \times Vce(\text{sat}) \times ISave \quad (35)$$

In addition, the following formulas can be derived from the formulas (32) to (35).

$$IDave(s) = ID(s)/(1+s \times tc1) \quad (36)$$

$$ISave(s) = IS(s)/(1+s \times tc1) \quad (37)$$

The formulas (36) and (37) indicate that the average current IDave(s) flowing through each rectifier element and the average current ISave(s) flowing through each regenerative switching element can be respectively calculated by a first-order lag filter with the time constant tc1 calculated based on the cooling performance of the heat sink.

Based on the aforementioned formulas (32) and (33), it is possible to calculate the case temperature rise $\Delta Tdc$ due to the power loss generated in each rectifier element, and the case temperature rise $\Delta Tsc$ due to the power loss generated in each regenerative switching element, from the rectified current ID flowing through each rectifier element and the regenerative current IS flowing through each regenerative switching element, respectively.

However, since only the bus current IPN is detected in this embodiment, the formulas (32) to (37) cannot be used as they are. Therefore, the relationship between the bus current IPN and the case temperature rise $\Delta Tc$ will be examined.

According to FIGS. 4 and 6, a conduction period of each rectifier element and each regenerative switching element is ⅓ of that of the bus current IPN. The average bus current IPNave is calculated from the formula (3), and the average current IDave of each rectifier element and the average current ISave of each regenerative switching element can be expressed by the following formulas, respectively.

$$IDave = 1/3 \times IPNave = 1/3 \times Pout/(\eta \times VDC) \quad (38)$$

$$ISave = 1/3 \times IPNave = 1/3 \times Pout/(\eta \times VDC) \quad (39)$$

From the formulas (38) and (39), an average loss PDave of each rectifier element and an average loss PSave of each regenerative switching element can be expressed by the following formulas, respectively.

$$PDave = \frac{1}{3} \times IPNave \times VF \quad (40)$$

$$PSave = \frac{1}{3} \times IPNave \times Vce(\text{sat}) \quad (41)$$

From the aforementioned formula (27), the case temperature rise value $\Delta Tc$ can be calculated when the average loss Pave generated in each power element is known.

First, from the formulas (27) and (40), the case temperature rise value $\Delta Tdc$ due to the loss in each rectifier element can be estimated by the following formula.

$$\Delta Tdc = \alpha \times PDave = \alpha \times \frac{1}{3} \times IPNave \times VF \quad (42)$$

In addition, from the formulas (27) and (41), the case temperature rise value $\Delta Tsc$ due to the loss in each regenerative switching element can be estimated by the following formula.

$$\Delta Tsc = \alpha \times PSave = \alpha \times \frac{1}{3} \times IPNave \times Vce(\text{sat}) \quad (43)$$

The average bus current IPNave is included in the formula (42), and the case temperature rise value ΔTdc caused by each rectifier element can be estimated using the formula (42). In addition, the average bus current IPNave is also included in the formula (43), and the case temperature rise value ΔTsc caused by each regenerative switching element can be estimated using the formula (43). That is, even without detecting the aforementioned input current, the case temperature rise value ΔTdc due to the loss in each rectifier element and the case temperature rise value ΔTsc due to the loss in each regenerative switching element can be estimated by detecting the bus current IPN.

With the use of the first-order lag filter with the time constant tc1 calculated based on the cooling performance of the heat sink and the bus current IPN, the average bus current IPNave is expressed by the following formula.

$$IPNave(s) = IPN(s)/(1 + s \times tc1) \qquad (44)$$

From the formulas (42) and (43), the case temperature rise value ΔTdc due to the loss in each rectifier element can be expressed by the following formula.

$$\Delta Tdc(s) = \alpha \times \tfrac{1}{3} \times IPNave(s) \times VF \qquad (45)$$

In addition, from the formulas (42) and (44), the case temperature rise value ΔTsc due to the loss in each regenerative switching element can be expressed by the following formula.

$$\Delta Tsc(s) = \alpha \times \tfrac{1}{3} \times IPNave(s) \times Vce(\mathrm{sat}) \qquad (46)$$

Figure 18:
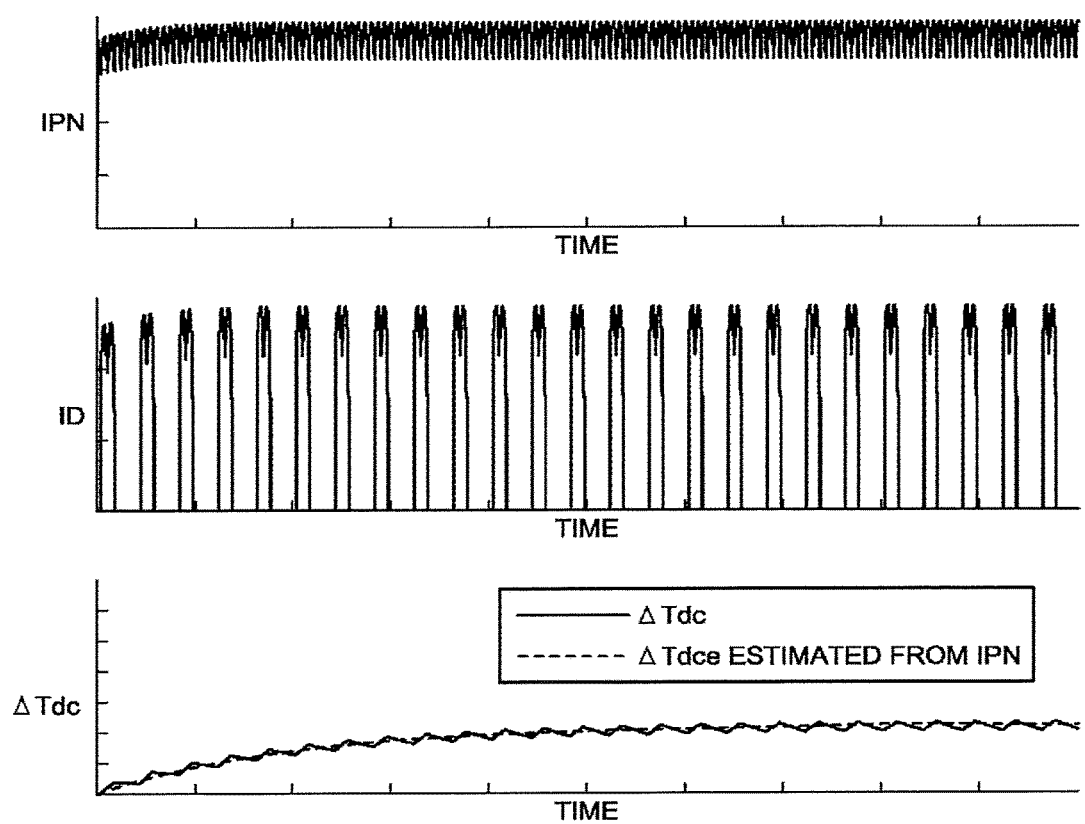
FIG. 18 is a set of waveform diagrams illustrating a case temperature rise when a current flows through a rectifier element.

FIG. 18 is a set of waveform diagrams illustrating the case temperature rise ΔTdc when a current flows through the rectifier element. In FIG. 18, the bus current IPN, the rectified current ID, and the case temperature rise ΔTdc are illustrated in this order from an upper portion of the figure. In a lower portion of FIG. 18, the case temperature rise ΔTdc is indicated by a solid line, and the case temperature rise estimate value ΔTdce calculated based on the formula (45) is indicated by a dashed line.

In the lower portion of FIG. 18, a center value of the case temperature rise ΔTdc actually obtained and that of the case temperature rise estimate value ΔTdce substantially coincide with each other. Accordingly, it is possible to accurately calculate the case temperature rise ΔTdc also by detecting the bus current IPN. Although the case where the current flows through the rectifier element is illustrated here, the same result is obtained in the case of the regenerative switching element.

Returning to FIG. 16, the operation of the overload detection unit 28A will be described again. The transfer function of the filter unit 33 is expressed by a first-order lag filter with the time constant ts1 as expressed by the formula (23), and as the time constant ts1, a value may be used which is calculated based on the cooling performance of the heat sink used in the power regenerative converter 1. As the average threshold current absolute value |Irefave| input to the negative terminal of the comparator 34 in FIG. 16, a value may be used which is calculated in advance based on the formulas (42) and (43).

In the overload detection unit 28A illustrated in FIG. 16, the absolute value calculation unit 32 calculates the bus current absolute value |IPN| which is the absolute value of the bus current IPN, and steady-state overload is detected based on |IPN|.

As described above, the power regenerative converter 1 causes to flow a current to any of the rectifier elements D1 to D6 during the power running operation and causes to flow a current to any of the regenerative switching elements S1 to S6 during the regenerative operation. During the power running operation, the bus current IPN flows in a direction toward the N terminal of the power module 22 from the P terminal of the power module 22 via the smoothing capacitor 21. On the other hand, during the regenerative operation, the bus current IPN flows in a direction toward the P terminal of the power module 22 from the N terminal of the power module 22 via the smoothing capacitor 21. When the bus current detection unit 25 is disposed between the P terminal of the power module 22 and the smoothing capacitor 21 as in the first and second embodiments, the flowing direction of the bus current IPN changes between the power running operation and the regenerative operation.

Since the rectifier elements D1 to D6 generate heat during the power running operation and the regenerative switching elements S1 to S6 generate heat during the regenerative operation, a method for obtaining the case temperature rises ΔTdc and ΔTsc separately based on the detected bus current IPN is also conceivable. However, regenerative switching elements and rectifier elements are closely arranged in a power module in general, and thermal interference exists between the regenerative switching elements and the rectifier elements. For example, not only temperatures of the rectifier elements but also those of the regenerative switching elements rise due to the power running operation, and not only temperatures of the regenerative switching elements but also those of the rectifier elements rise due to the regenerative operation. Therefore, in the second embodiment, the overload detection unit 28A is configured to use the bus current absolute value |IPN| on an assumption that when the bus current IPN flows, both of the rectifier elements and the regenerative switching elements generate heat and thereby temperatures thereof rise regardless of the direction in which the current flows.

By using the bus current absolute value |IPN|, it is possible to estimate the case temperature rise ΔTc of the power module 22 and to monitor the continuous operation of the motor 5.

In the second embodiment, by monitoring the bus current IPN, it is determined whether the motor 5 is operating so that the case temperature rise ΔTc of the power module 22 falls under an allowable case temperature rise value, that is, it is determined whether the power regenerative converter 1 is in the steady-state overload condition.

Similarly to the first embodiment, a current detection unit needs to be provided only for detecting the bus current in the second embodiment. Therefore, the number of the current detection units can be reduced as compared with the aforementioned conventional art, which is advantageous in terms of cost. The necessity of the input-current to direct-current conversion units is obviated, and the system can be simplified.

In the second embodiment, the configuration is based on the thermal cycle life of the power module 22 used in the power regenerative converter 1 and is suitable for detection of a case where an operation beyond assumptions is performed in the continuous operation of the motor 5. Although the average threshold current absolute value |Irefave| is determined based on the aforementioned formulas (42) and (43), the average threshold current absolute value Irefave may be a smaller value than the value calculated by the formulas (42) and (43) in order to secure a margin.

Furthermore, by combining the overload detection unit 28 suitable for detection of the instantaneous overload described in the first embodiment and the overload detection unit 28A suitable for detection of the steady-state overload described in the second embodiment, an overload detection unit may be configured which is capable of performing both of instantaneous overload detection and steady-state overload detection.

Third Embodiment

Figure 19:
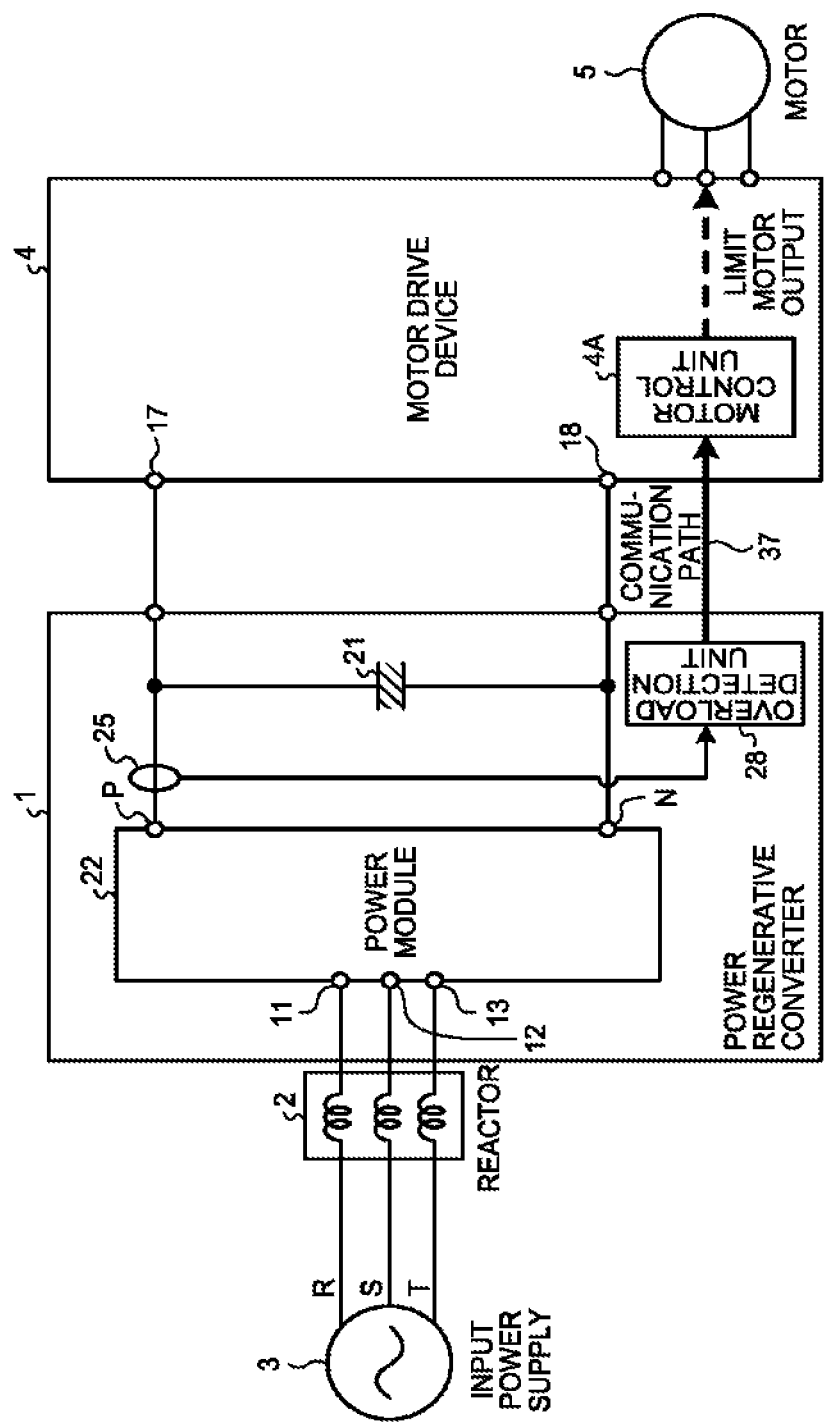
FIG. 19 is a block diagram illustrating a configuration of a motor control device according to a third embodiment.

FIG. 19 is a block diagram illustrating a configuration of a motor control device according to a third embodiment. In FIG. 19, the same reference signs are given to constituent elements which are the same as or equivalent to the constituent elements illustrated in FIG. 1 (first embodiment) or FIG. 15 (second embodiment). Although FIG. 19 illustrates a configuration similar to that of FIG. 1 or FIG. 15, while illustrations of the PN bus voltage detection unit 23, the power supply phase detection unit 24, the base drive signal generation unit 26, and the regeneration control unit 27 are omitted, a motor control unit 4A is added inside the motor drive device 4.

The motor control unit 4A has a function of supplying arbitrary alternating-current power to the motor 5 to perform variable speed control of the motor 5. A configuration is employed in which an output of the overload detection unit 28 in the power regenerative converter 1 is input to the motor control unit 4A through a communication path 37. In FIG. 19, the overload detection unit 28 described in the first embodiment, that is, the overload detection unit 28 having the function of determining the instantaneous overload condition is used. However, the overload detection unit 28 may be replaced with the overload detection unit 28A described in the second embodiment, that is, the overload detection unit 28A having the function of determining the steady-state overload condition, or an overload detection unit may be used which has both the function of determining the instantaneous overload condition and the function of determining the steady-state overload condition.

The bus current detection unit 25 detects the bus current IPN flowing among the P terminal of the power module 22, the smoothing capacitor 21, and the N terminal of the power module 22, and inputs a detected value of the detected bus current IPN to the overload detection unit 28. The overload detection unit 28 determines whether the power regenerative converter 1 is in the overload condition based on the bus current IPN. When it is determined that the power regenerative converter 1 is in the overload condition and the overload detection unit 28 outputs H, the motor control unit 4A controls the alternating-current power so as to lower output of the motor 5.

As a method for lowering the output of the motor 5, the following methods are exemplified.

(i) The motor 5 is controlled to operate in accordance with a torque command which is further limited in comparison with a torque command specified in advance by a motor operation command.

(ii) The motor 5 is controlled to operate in accordance with a rotation command which is further limited in comparison with a rotation command specified in advance by a motor operation command.

(iii) The motor 5 is controlled to freely run.

Specifically, a switching operation for performing ON/OFF control of a switching element (not illustrated) provided inside the motor drive device 4 is stopped, and the motor 5 is brought into a free state.

Figure 20:
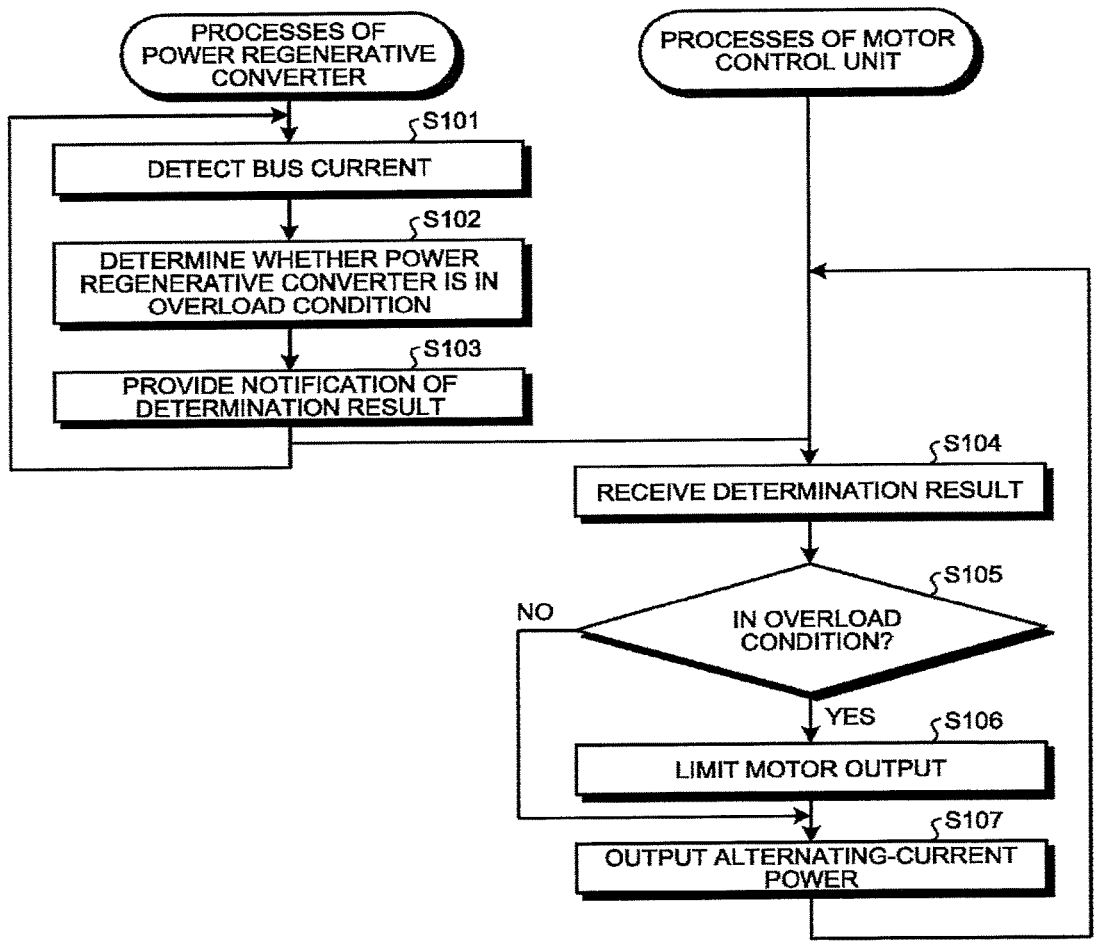
FIG. 20 is a flowchart illustrating an operation of the motor control device according to the third embodiment.

Next, an operation of the motor control device according to the third embodiment will be described with reference to FIGS. 19 and 20. FIG. 20 is a flowchart illustrating the operation of the motor control device according to the third embodiment. In FIG. 20, reference signs are omitted.

The bus current detection unit 25 detects the bus current IPN as described above (step S101). Based on the bus current IPN, the overload detection unit 28 determines whether the power regenerative converter 1 is in the overload condition (step S102). The overload detection unit 28 notifies the motor control unit 4A in the motor drive device 4 of a determination result through the communication path 37 (step S103). The processes of steps S101 to S103 above are processes of the power regenerative converter 1, and the power regenerative converter 1 repeatedly executes the processes of steps S101 to S103.

The motor control unit 4A receives the determination result of the overload detection unit 28 (step S104). Based on the received determination result, the motor control unit 4A determines whether the power regenerative converter 1 is in the overload condition (step S105). In a case where the received determination result is a signal indicating that the power regenerative converter 1 is in the overload condition (a signal "H" in the example of the third embodiment) (step S105, Yes), motor output from the motor drive device 4 is limited so that the output of the motor 5 is limited (step S106), and alternating-current power with the limited motor output is output to the motor 5 (step S107). In a case where the received determination result is a signal indicating that the power regenerative converter 1 is not in the overload condition (a signal "L" in the example of the third embodiment) (step S105, No), the motor control unit 4A proceeds to step S107 without performing the process of step S106. That is, when the received determination result does not indicate the overload condition, the output of the motor 5 is not limited, and alternating-current power in a normal control operation is output to the motor 5 (step S107). The processes of steps S104 to S107 above are processes of the motor control unit 4A, and the motor control unit 4A repeatedly executes the processes of steps S104 to S107.

According to the third embodiment, even when an operation beyond assumptions is performed in an operation of the motor 5 and the power regenerative converter 1 is in the overload condition, the motor drive device 4 controls the alternating-current power so as to lower the output of the motor 5, and accordingly, it is possible to eliminate the overload condition of the power regenerative converter 1 and to eliminate adverse effects such as life degradation and damage of the power regenerative converter 1 without stopping the system. Therefore, it is possible to select a power regenerative converter with small capacity, which contributes to cost reduction of industrial machines.

Fourth Embodiment

Figure 21:
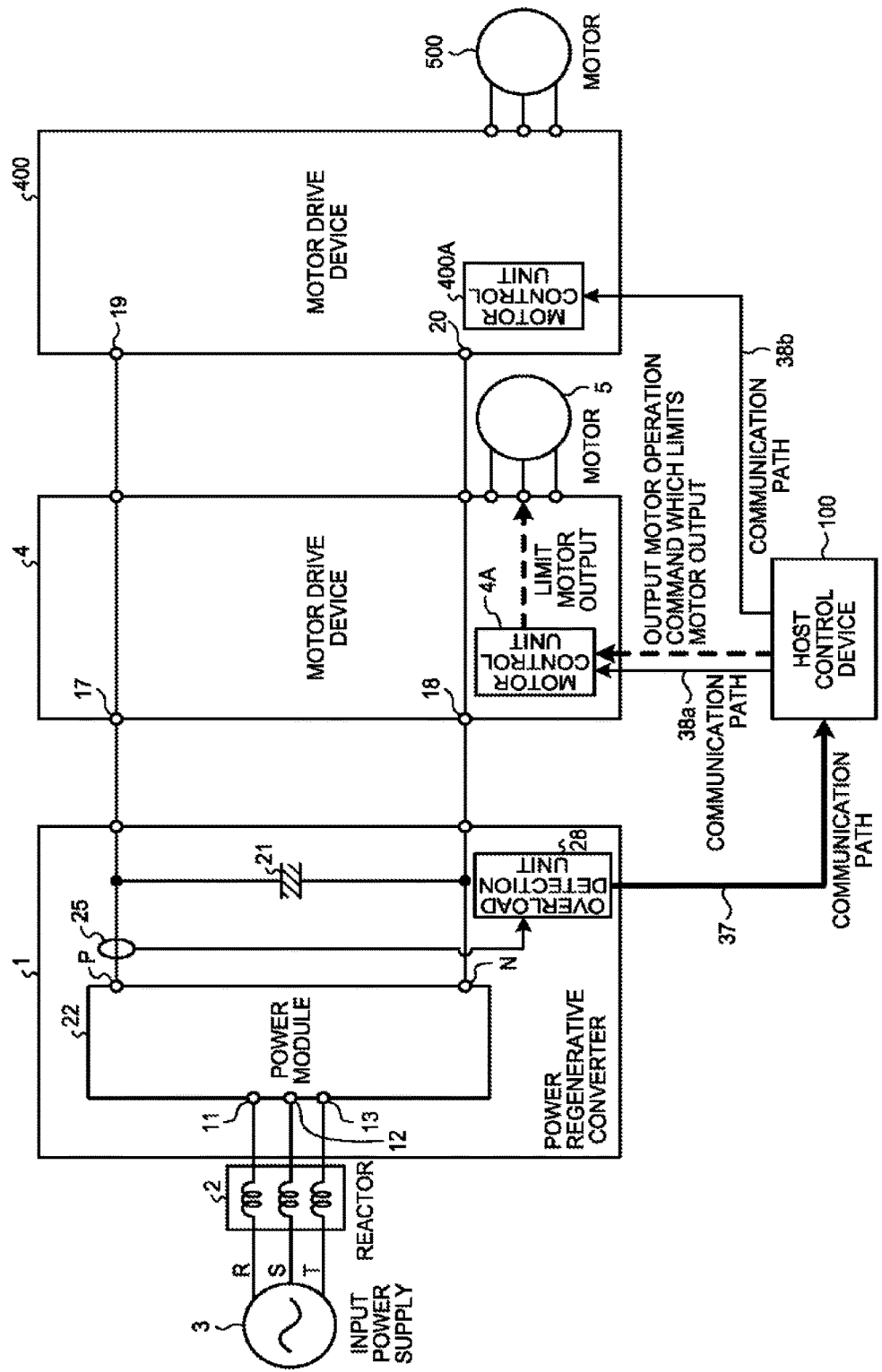
FIG. 21 is a block diagram illustrating a configuration of a motor control device according to a fourth embodiment.

FIG. 21 is a block diagram illustrating a configuration of a motor control device according to a fourth embodiment. In FIG. 21, a host control device 100, a motor drive device 400, and a motor 500 in addition to the motor 5 are added to the configuration of the third embodiment illustrated in FIG. 19. The host control device 100 has a function of outputting a motor operation command to the motor drive devices 4 and 400 through communication paths 38a and 38b, and outputs a motor operation command to each of the motor drive devices 4 and 400. An output of the overload detection unit 28 in the power regenerative converter 1 is input to the host control device 100 through the communication path 37. The motor drive device 400 includes direct-current power supply terminals 19 and 20 and a motor control unit 400A. The direct-current power supply terminals 19 and 20 are respectively connected to the direct-current power supply terminals 17 and 18 of the motor drive device 4, and are also connected to the smoothing capacitor 21 in the power regenerative converter 1. The motor control unit 400A supplies arbitrary alternating-current power to the motor 500 to perform variable speed control. In FIG. 21, the overload detection unit 28 suitable for detection of the instantaneous overload is employed. However, the overload detection unit 28 may be replaced with the overload detection unit 28A (second embodiment, FIG. 16) suitable for detection of the steady-state overload, or an overload detection unit may be used which has both functions of detecting the instantaneous overload and detecting the steady-state overload.

The bus current detection unit 25 detects the bus current IPN flowing among the P terminal of the power module 22, the smoothing capacitor 21, and the N terminal of the power module 22, and inputs a detected value of the detected bus current IPN to the overload detection unit 28. The overload detection unit 28 determines whether the power regenerative converter 1 is in the overload condition based on the bus current IPN. When it is determined that the power regenerative converter 1 is in the overload condition, the host control device 100 is notified of a signal H indicating that the power regenerative converter 1 is in the overload condition through the communication path 37. The host control device 100 instructs, with respect to at least one of the motor control unit 4A of the motor drive device 4 and the motor control unit 400A of the motor drive device 400, to generate a motor operation command which limits output of the motor as an object to be controlled by using either or both of the corresponding communication paths 38a and 38b. At least one of the motor control unit 4A and the motor control unit 400A controls alternating-current power so as to lower the output of the motor 5 or the motor 500 based on the received motor operation command.

Specific examples will be described below. Here, a machine tool including a spindle motor and a servo motor is used as an example. It is assumed that the motor 5 is the spindle motor and the motor 500 is the servo motor. The host control device 100 may be provided in the machine tool or may not be provided in the machine tool.

(i) The host control device 100 outputs, to the motor control unit 4A, a motor operation command for lowering the output of the motor 5 as a spindle motor.

(ii) In order not to prolong a cycle time, the host control device 100 determines to limit the output of the motor 500 as a servo motor having a shorter acceleration/deceleration time than the motor 5 as a spindle motor. The host control device 100 outputs motor operation commands for maintaining the output of the motor 5 as a spindle motor and for limiting the output of the motor 500 as a servo motor to the motor control unit 4A and the motor control unit 400A, respectively.

Figure 22:
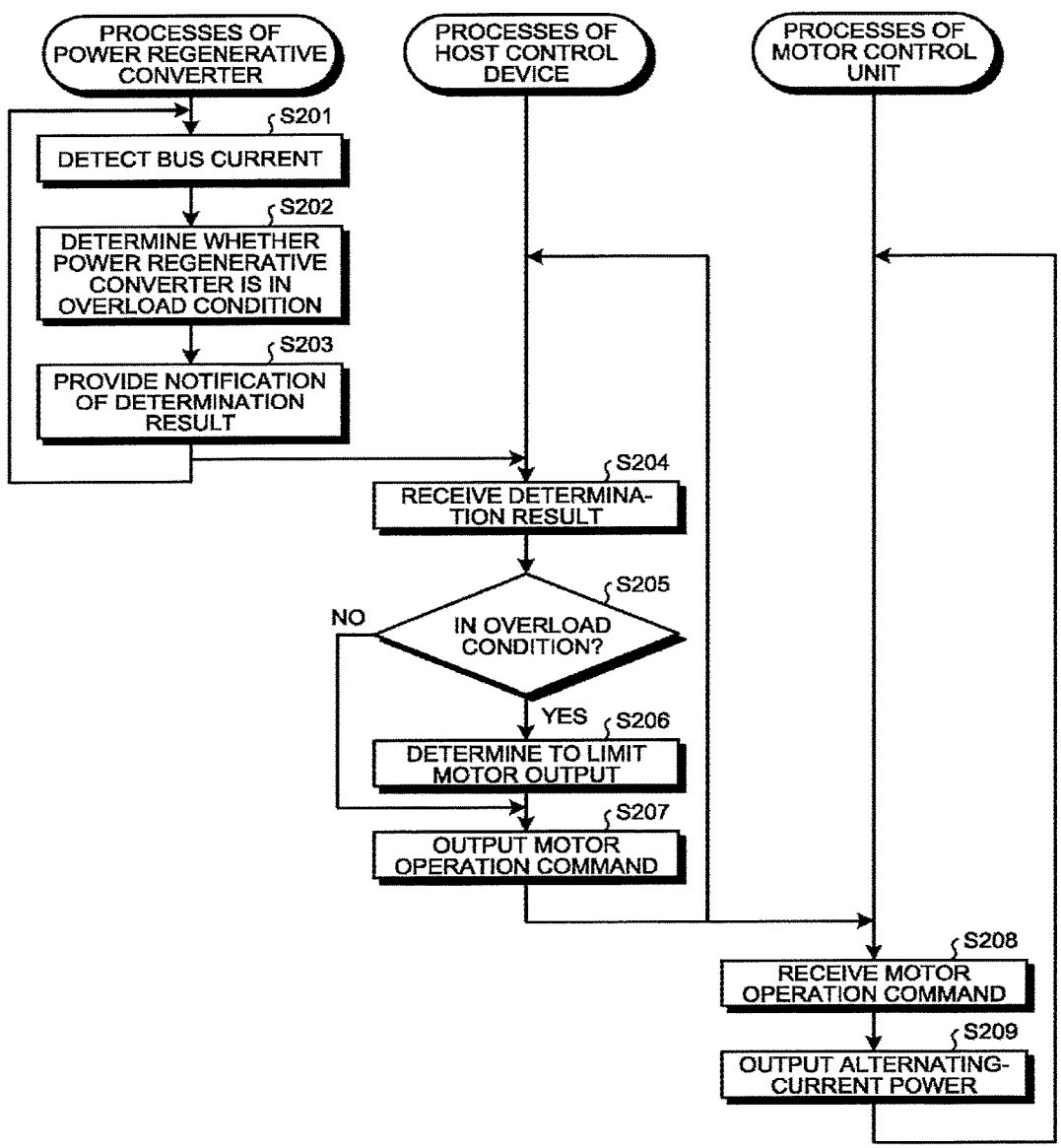
FIG. 22 is a flowchart illustrating an operation of the motor control device according to the fourth embodiment.

Next, an operation of the motor control device according to the fourth embodiment will be described with reference to FIGS. 21 and 22. FIG. 22 is a flowchart illustrating the operation of the motor control device according to the fourth embodiment. In FIG. 22, reference signs are omitted.

The bus current detection unit 25 detects the bus current IPN as described above (step S201). Based on the bus current IPN, the overload detection unit 28 determines whether the power regenerative converter 1 is in the overload condition (step S202). The overload detection unit 28 notifies the host control device 100 of a determination result through the communication path 37 (step S203). The processes of steps S201 to S203 above are processes of the power regenerative converter 1, and the power regenerative converter 1 repeatedly executes the processes of steps S201 to S203.

The host control device 100 receives the determination result of the overload detection unit 28 (step S204). Based on the received determination result, the host control device 100 determines whether the power regenerative converter 1 is in the overload condition (step S205). In a case where the received determination result is a signal indicating that the power regenerative converter 1 is in the overload condition (a signal "H" in the example of the fourth embodiment) (step S205, Yes), it is determined to limit the output of at least one of the motor 5 and the motor 500 (step S206), and a motor operation command which limits motor output is output to the motor control device which drives the motor as an object to be controlled (step S207). In a case where the received determination result is a signal indicating that the power regenerative converter 1 is not in the overload condition (a signal "L" in the example of the fourth embodiment) (step S205, No), the host control device 100 proceeds to step S207 without performing the process of step S206. That is, when the received determination result does not indicate the overload condition, the output limitation is not performed to the motor 5 and the motor 500, and a normal motor operation command is output (step S207). The processes of steps S204 to S207 above are processes of the host control device 100, and the host control device 100 repeatedly executes the processes of steps S204 to S207.

The motor control unit 4A of the motor drive device 4 and the motor control unit 400A of the motor drive device 400 each receive the motor operation command from the host control device 100 (step S208), and operate such that the alternating-current power corresponding to the received motor operation command is output to each of the motor 5 and the motor 500 (step S209). The processes of steps S208 and S209 above are processes of the motor control units 4A and 400A, and the motor control units 4A and 400A repeatedly execute the processes of steps S208 and S209.

According to the fourth embodiment, even when an operation beyond assumptions is performed in an operation of each of the motor 5 and the motor 500 and the power regenerative converter 1 is in the overload condition, the host control device 100 outputs a motor operation command which limits the output of at least one of the motor 5 and the motor 500 to the corresponding motor control device, and the motor control device controls the alternating-current power so as to lower the motor output of the object to be controlled, and accordingly, it is possible to eliminate the overload condition of the power regenerative converter 1, and to eliminate adverse effects such as life degradation and damage of the power regenerative converter 1 without stopping the system. In addition, in an industrial machine using a plurality of motors such as a machine tool, by outputting a motor operation command so as to prevent a cycle time from being prolonged, the overload condition of the power regenerative converter 1 can be eliminated while maintaining the cycle time. Therefore, it is possible to select a power regenerative converter with small capacity, which contributes to cost reduction of industrial machines.

Fifth Embodiment

Figure 23:
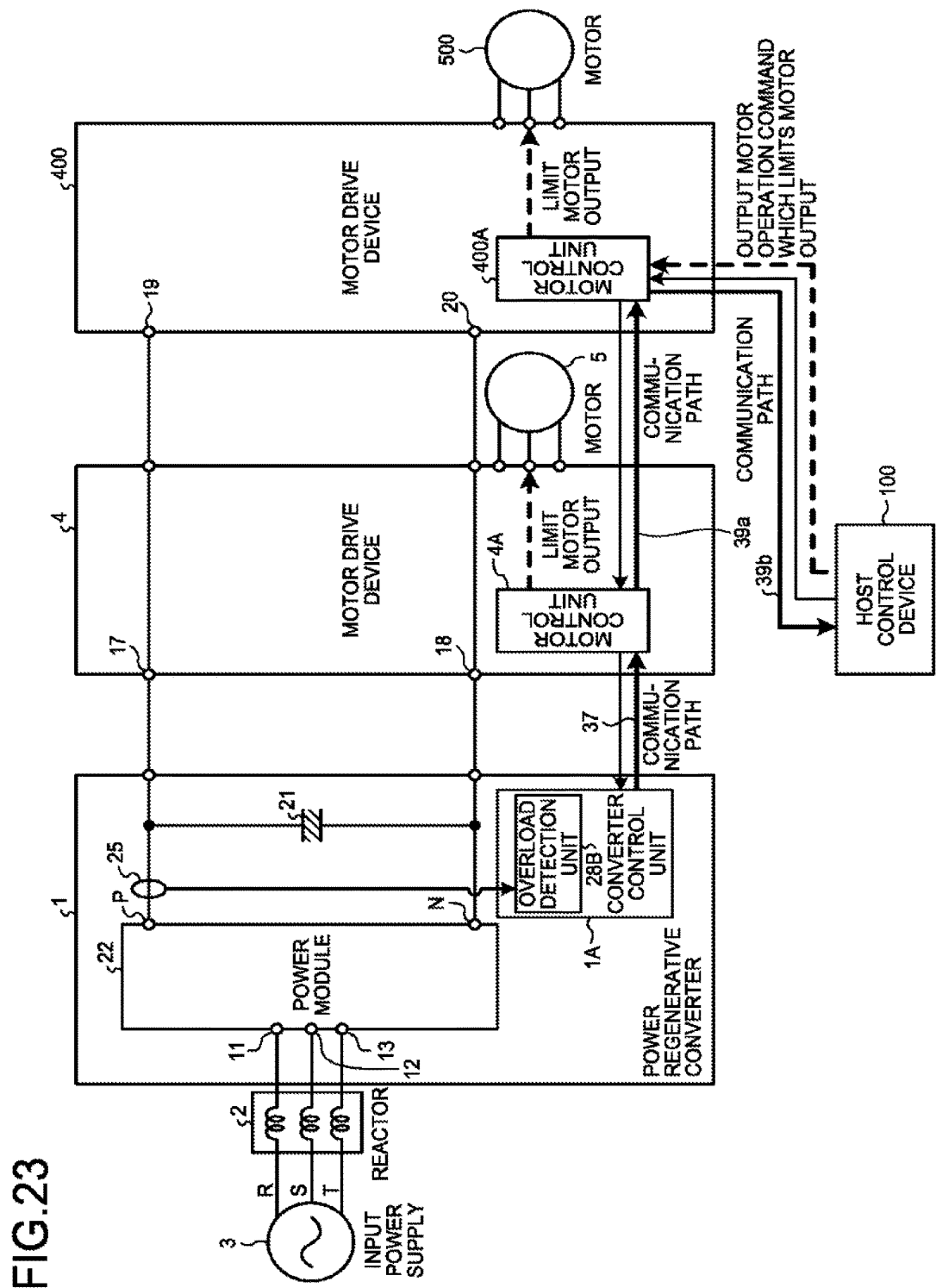
FIG. 23 is a block diagram illustrating a configuration of a motor control device according to a fifth embodiment.

FIG. 23 is a block diagram illustrating a configuration of a motor control device according to a fifth embodiment. In FIG. 23, although the configuration is the same as or equivalent to the configuration of the fourth embodiment illustrated in FIG. 21, a converter control unit 1A is added inside the power regenerative converter 1 and an overload detection unit 28B is provided inside the converter control unit 1A. The overload detection unit 28B is an overload detection unit having both functions of instantaneous overload detection and steady-state overload detection as described above. The host control device 100, the motor drive device 400, the motor drive device 4, and the power regenerative converter 1 are daisy-chain connected through communication paths. Specifically, the converter control unit 1A of the power regenerative converter 1 and the motor control unit 4A of the motor drive device 4 are connected by the communication path 37, the motor control unit 4A of the motor drive device 4 and the motor control unit 400A of the motor drive device 400 are connected by a communication path 39a, and the motor control unit 400A of the motor drive device 400 and the host control device 100 are connected by a communication path 39b. In the motor control device configured as described above, for example, a motor operation command output from the host control device 100 to the motor drive device 4 is input to the motor control unit 4A of the motor drive device 4 via the motor control unit 400A of the motor drive device 400.

In industrial machines such as those described above, the instantaneous overload condition generally occurs in a case where a plurality of motors operates with high output. Here, a machine tool including a plurality of servomotors and a spindle motor will be taken as an example. The spindle motor and the servo motor are considered as the motor 5 and the motor 500, respectively. In a machine tool, there is an operation in which a plurality of servomotors and a spindle motor perform a simultaneous acceleration operation or a simultaneous deceleration operation. When the servo motors and the spindle motor operate at maximum outputs, the maximum output of each motor overlaps in a simultaneous acceleration/deceleration operation such as that described above, and thereby power supplied by the power regenerative converter increases.

In addition, when a simultaneous acceleration/deceleration operation such as that described above occurs, an excessive current continues to flow through the power module 22 in a short time. When such an excessive current continues to flow through the power module 22 in a short time, the life degradation of the power module 22 rapidly proceeds due to the power cycle life of the power module 22.

In a machine tool, output of a spindle motor is generally larger than that of a servo motor. For this reason, a spindle motor drive device occupies a larger proportion of power which the power regenerative converter supplies to the motor drive devices. In the case of a simultaneous acceleration/deceleration operation such as that described above, a current flowing through the power module 22 can be reduced quickly by lowering the output of the motor 5 as a spindle motor not via the host control device 100.

On the other hand, the steady-state overload condition occurs in a case where an operation cycle is severe and a case temperature rise $\Delta Tc$ of the power module 22 is severe rather than where an excessive current flows through the power module 22. In such a case, the operation cycle has to be reviewed, and it is suitable to lower a total of average motor outputs during a long-time operation by reviewing motor operation commands for the motor 5 as a spindle motor, the motor 500 as a servo motor, or both, via the host control device 100.

Figure 24:
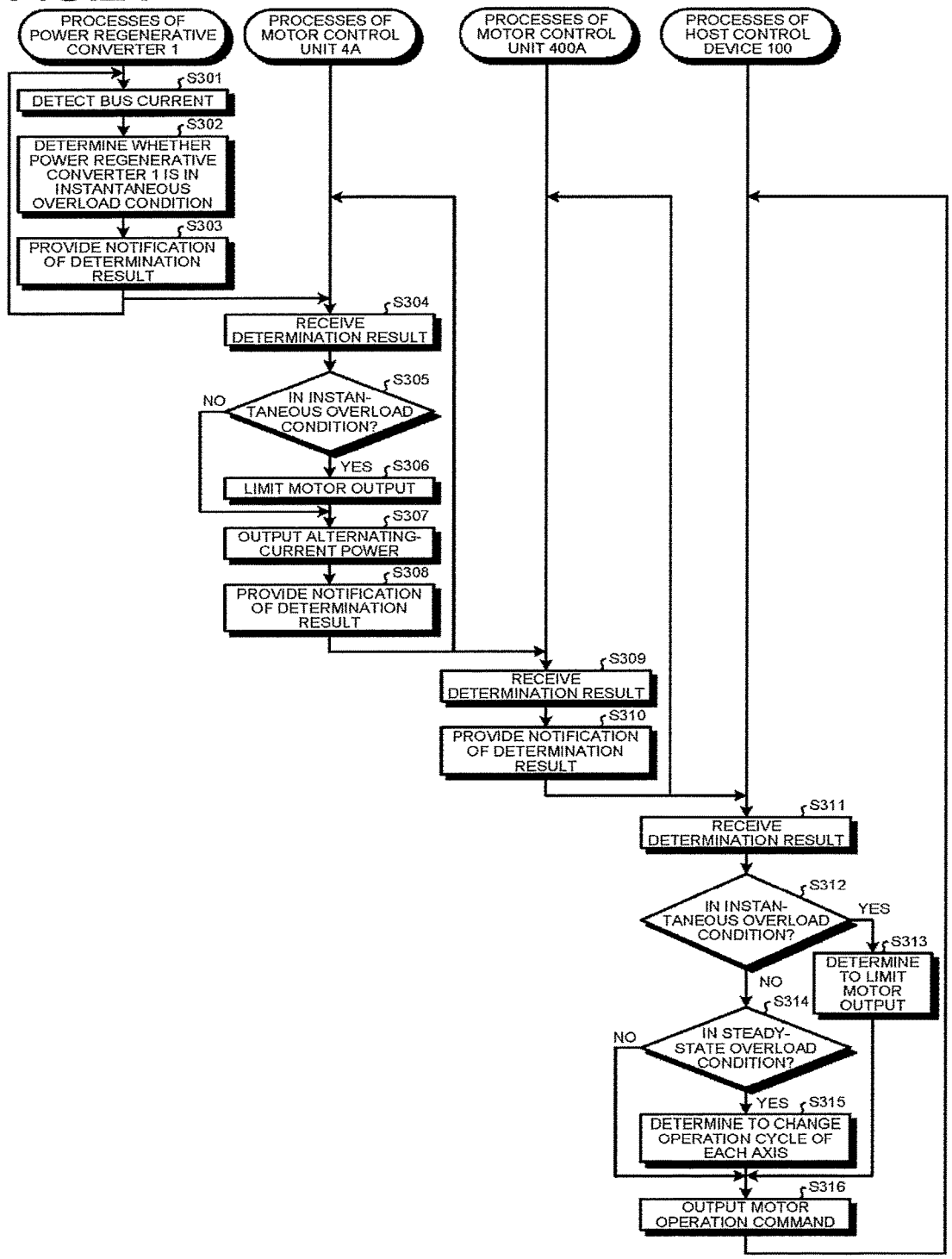
FIG. 24 is a flowchart illustrating an operation of the motor control device according to the fifth embodiment.

Next, an operation of the motor control device according to the fifth embodiment will be described with reference to FIGS. 23 and 24. FIG. 24 is a flowchart illustrating the operation of the motor control device according to the fifth embodiment.

The bus current detection unit 25 detects the bus current IPN as described above (step S301). Based on the bus current IPN, the overload detection unit 28B determines whether the power regenerative converter 1 is in the instantaneous overload condition, in the steady-state overload condition, or has no abnormality (step S302). The overload detection unit 28B notifies the motor control unit 4A of a determination result through the communication path 37 (step S303). The processes of steps S301 to S303 above are processes of the power regenerative converter 1, and the power regenerative converter 1 repeatedly executes the processes of steps S301 to S303.

The motor control unit 4A receives the determination result of the overload detection unit 28B (step S304). Based on the received determination result, the motor control unit 4A determines whether the power regenerative converter 1 is in the instantaneous overload condition (step S305). In a case where the received determination result is a signal indicating that the power regenerative converter 1 is in the instantaneous overload condition (step S305, Yes), motor output from the motor drive device 4 is limited so that the output of the motor 5 is limited (step S306), and alternating-current power with the limited motor output is output to the motor 5 (step S307). In a case where the received determination result is a signal indicating that the power regenerative converter 1 is not in the instantaneous overload condition (step S305, No), the motor control unit 4A proceeds to step S307 without performing the process of step S306. That is, when the received determination result does not indicate the instantaneous overload condition, the output of the motor 5 is not limited, and the alternating-current power in a normal control operation is output to the motor 5 (step S307). The motor control unit 4A notifies the motor control unit 400A of the determination result of the overload detection unit 28B (step S308). The processes of steps S304 to S308 above are processes of the motor control unit 4A, and the motor control unit 4A repeatedly executes the processes of steps S304 to S308.

The motor control unit 400A receives the determination result of the overload detection unit 28B from the motor control unit 4A through the communication path 39a (step S309), and notifies the host control device 100 of the determination result through the communication path 39b (step S310). The processes of steps S309 and S310 above are processes of the motor control unit 400A, and the motor control unit 400A repeatedly executes the processes of steps S309 and S310.

The host control device 100 receives the determination result of the overload detection unit 28B from the motor control unit 400A (step S311). Based on the received determination result, the host control device 100 determines whether the power regenerative converter 1 is in the instantaneous overload condition (step S312). In a case where the received determination result is a signal indicating that the power regenerative converter 1 is in the instantaneous overload condition (step S312, Yes), it is determined to limit the output of the motor 500 (step S313), and a motor operation command which limits the motor output is output to the motor control unit 400A which controls the motor 500 (step S316). On the other hand, in a case where the received determination result is a signal indicating that the power regenerative converter 1 is not in the instantaneous overload condition (step S312, No), it is further determined whether the power regenerative converter 1 is in the steady-state overload condition (step S314). In a case where the received determination result is a signal indicating that the power regenerative converter 1 is in the steady-state overload condition (step S314, Yes), it is determined to change an operation cycle of each axis (step S315), and a motor operation command which has been changed so as to suppress average output of the motor 500 is output to the motor control unit 400A which controls the motor 500 (step S316). In a case where the received determination result is a signal indicating that the power regenerative converter 1 is not in the steady-state overload condition (step S314, No), the host control device 100 proceeds to step S316 without performing the process of step S315. The processes of steps S311 to S316 above are processes of the host control device 100, and the host control device 100 repeatedly executes the processes of steps S311 to S316.

The above control can be summarized as follows. First, when it is determined that the power regenerative converter 1 is in the instantaneous overload condition, alternating-current power is output to the motor 5 so as to limit the motor output by the motor control unit 4A not via the host control device 100. Along with this control, the motor control unit 400A and the host control device 100 are notified that the power regenerative converter 1 is in the instantaneous overload condition. The host control device 100 generates a motor operation command for the motor 500 so as to limit the output of the motor operation of the motor 500 based on the determination result and outputs the motor operation command to the motor drive device 400. In the motor drive device 4, once the output of the motor 5 is limited to avoid the instantaneous overload condition, and thereafter, the motor operation command is reviewed in the host control device 100.

On the other hand, when it is determined that the power regenerative converter 1 is in the steady-state overload condition, the motor control unit 4A continues an operation command based on the motor operation command output from the host control device 100, and along with this, notifies the motor control unit 400A and the host control device 100 that the power regenerative converter 1 is in the steady-state overload condition. The host control device 100 generates a motor operation command so as to limit the average output in the motor operation of the motor 500 based on the determination result, and outputs the motor operation command to the motor drive device 400.

It has been described in the above that output limitation to the motor 5 is performed when the power regenerative converter 1 is determined to be in the instantaneous overload condition, and output limitation to the motor 500 is performed when the power regenerative converter 1 is determined to be in the steady-state overload condition. However, output limitation to both the motor 5 and the motor 500 may be performed when the power regenerative converter 1 is determined to be in the instantaneous overload condition. Alternatively, output limitation to both the motor 5 and the motor 500 may be performed when the power regenerative converter 1 is determined to be in the steady-state overload condition.

The overload detection unit 28B can detect each of the instantaneous overload condition and the steady-state overload condition. However, as for the notification method of the overload conditions, a communication line dedicated for each overload detection may be established, or notification of the overload conditions may be provided through serial communication or the like.

According to the fifth embodiment, when the power regenerative converter 1 is in the instantaneous overload condition, the motor output can be quickly lowered. When the power regenerative converter 1 is in the steady-state overload condition, it is possible to improve the severe operation cycle by reviewing the motor operation command output from the host control device 100 to each motor drive device, and to reduce the case temperature rise ΔTc of the power module 22. With the above control, it is possible to eliminate adverse effects such as life degradation and damage of the power regenerative converter 1 without stopping the system. In addition, in an industrial machine using a plurality of motors such as a machine tool, by outputting a motor operation command so as to prevent a cycle time from being prolonged, the overload condition of the power regenerative converter 1 can be eliminated while maintaining the cycle time. Therefore, it is possible to select a power regenerative converter with small capacity, which contributes to cost reduction of industrial machines.

Sixth Embodiment

Figure 25:
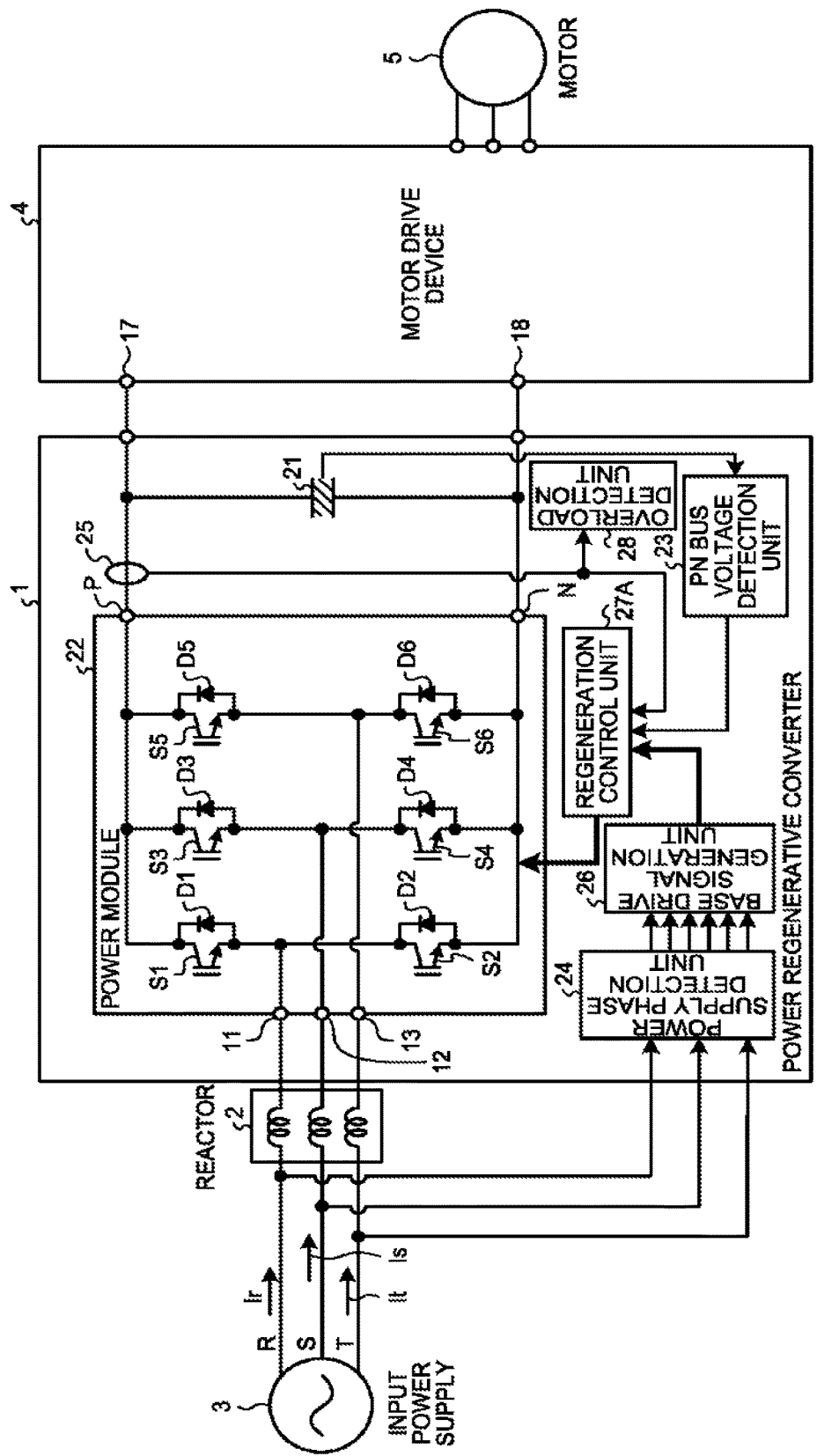
FIG. 25 is a block diagram illustrating a configuration of a motor control device according to a sixth embodiment.

FIG. 25 is a block diagram illustrating a configuration of a motor control device according to a sixth embodiment. In FIG. 25, the same reference signs are given to constituent elements which are the same as or equivalent to the constituent elements of the first embodiment illustrated in FIG. 1. Here, a description will be given focusing on parts relating to the sixth embodiment. In FIG. 25, in a power regenerative converter according to the sixth embodiment, the regeneration control unit 27A is provided in place of the regeneration control unit 27 in the configuration illustrated in FIG. 1.

Figure 26:
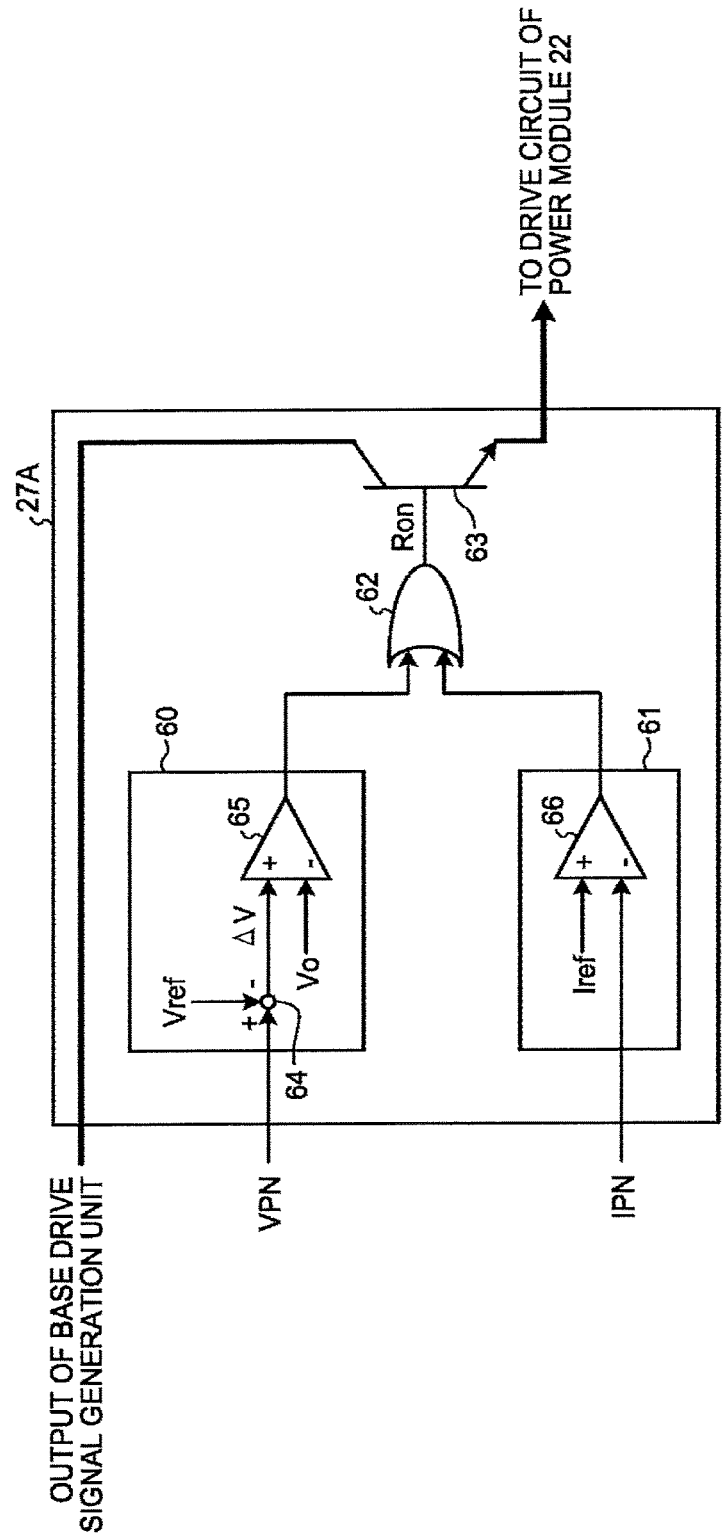
FIG. 26 is a block diagram illustrating a configuration example of a regeneration control unit according to the sixth embodiment.

The regeneration control unit 27A will be described. FIG. 26 is a block diagram illustrating a configuration example of the regeneration control unit 27A. As illustrated in FIG. 26, the regeneration control unit 27A is configured to include a regeneration start determination unit 60, a regeneration stop determination unit 61, an OR circuit 62, and an NPN transistor 63.

In the regeneration control unit 27A, a bus voltage VPN detected by the PN bus voltage detection unit 23 is input to the regeneration start determination unit 60, and the bus current IPN detected by the bus current detection unit 25 is input to the regeneration stop determination unit 61. Output signals of the regeneration start determination unit 60 and the regeneration stop determination unit 61 are input to the OR circuit 62, and a regeneration ON signal Ron of the OR circuit 62 is applied to a base terminal of the NPN transistor 63. The base drive signals as output of the base drive signal generation unit 26 are input to a collector terminal of the NPN transistor 63, and an emitter terminal of the NPN transistor 63 is input to a drive circuit (not illustrated) which drives the power module 22.

Next, configurations and operations of the regeneration start determination unit 60 and the regeneration stop determination unit 61 will be described.

First, the regeneration start determination unit 60 has a function of determining whether to start a regenerative operation based on the bus voltage VPN. The regeneration start determination unit 60 is configured to include a subtractor 64 and a comparator 65. The bus voltage VPN is input to a positive terminal of the subtractor 64 and a reference voltage Vref based on a power supply voltage of the input power supply 3 is input to a negative terminal of the subtractor 64. The subtractor 64 calculates a difference voltage ΔV which is a difference between the bus voltage VPN and the reference voltage Vref. The difference voltage ΔV is input to a positive terminal of the comparator 65. A threshold voltage Vo is input to a negative terminal of the comparator 65. A signal indicating a magnitude relationship between the difference voltage ΔV and the threshold voltage Vo is an output signal of the comparator 65, and the output signal of the comparator 65 is an output signal of the regeneration start determination unit 60.

With the above configuration, when the difference voltage ΔV increases to be equal to or larger than the threshold voltage Vo, the comparator 65 outputs H, and therefore, the regeneration start determination unit 60 outputs H. What is meant by that the regeneration start determination unit 60 outputs H is that the regenerative operation is started when the bus voltage VPN increases and the difference between the bus voltage VPN and the reference voltage Vref becomes equal to or larger than the threshold voltage Vo, a relationship of the difference voltage ΔV<the threshold voltage Vo is established immediately after the start of the regenerative operation. Therefore, a configuration is employed in which the regenerative operation is continued for a while after the start of the regenerative operation, for example, by providing a hysteresis function to the comparator 65 and providing a one-shot trigger circuit to the output of the comparator 65. There are some methods for generating the reference voltage Vref. For example, the reference voltage Vref is generated by detecting an input power supply voltage from the input power supply 3, or is generated based on the bus voltage VPN which is an output signal of the PN bus voltage detection unit 23. Since all of the methods are well known, detailed descriptions thereof will be omitted here.

The regeneration stop determination unit 61 has a function of determining whether to stop the regenerative operation based on the bus current IPN. The regeneration stop determination unit 61 is configured to include a comparator 66. A threshold current Iref is input to a positive terminal of the comparator 66, and the bus current IPN is input to a negative terminal of the comparator 66. A signal indicating a magnitude relationship between the threshold current Iref and the bus current IPN is an output signal of the comparator 66, and the output signal of the comparator 66 is an output signal of the regeneration stop determination unit 61.

With the above configuration, when the bus current IPN decreases to be equal to or less than the threshold current Iref, the comparator 66 outputs H, and therefore, the regeneration stop determination unit 61 outputs H.

Next, an operation of the regeneration control unit 27A will be described. As described above, output signals of the regeneration start determination unit 60 and the regeneration stop determination unit 61 are input to the OR circuit 62. When either of the signals is H, the OR circuit 62 outputs H. When the OR circuit 62 outputs H, the NPN transistor 63 is turned ON, the base drive signals are input to the drive circuit of the power module 22, and each switching element of the power module 22 performs an ON or OFF operation based on the base drive signal corresponding thereto, and performs a regenerative operation. On the other hand, when the OR circuit 62 outputs L, the NPN transistor 63 is turned OFF, the base drive signals supplied to the drive circuit of the power module 22 are blocked, all switching elements of the power module 22 are turned OFF, and the regenerative operation is stopped. From the above configuration, the OR circuit 62 outputs H as long as either the regeneration start determination unit 60 or the regeneration stop determination unit 61 outputs H. That is, when at least one of the regeneration start determination unit 60 and the regeneration stop determination unit 61 outputs H, the regenerative operation is continued, and when both the regeneration start determination unit 60 and the regeneration stop determination unit 61 output L, the regenerative operation is stopped.

As described above, the bus current IPN flows in a positive direction during power running and flows in a negative direction during regeneration. When regenerative energy of the motor 5 decreases, the regenerative current decreases, that is, the bus current IPN also decreases. Then, the capacitor voltage VDC decreases, eventually the power supply voltage of the input power supply 3>the capacitor voltage VDC is satisfied, and the bus current IPN starts flowing in the positive direction. Therefore, in order to detect the decrease in the regenerative energy, the threshold current Iref of the regeneration stop determination unit 61 is set to a positive value in the configuration of FIG. 26.

Figure 27:
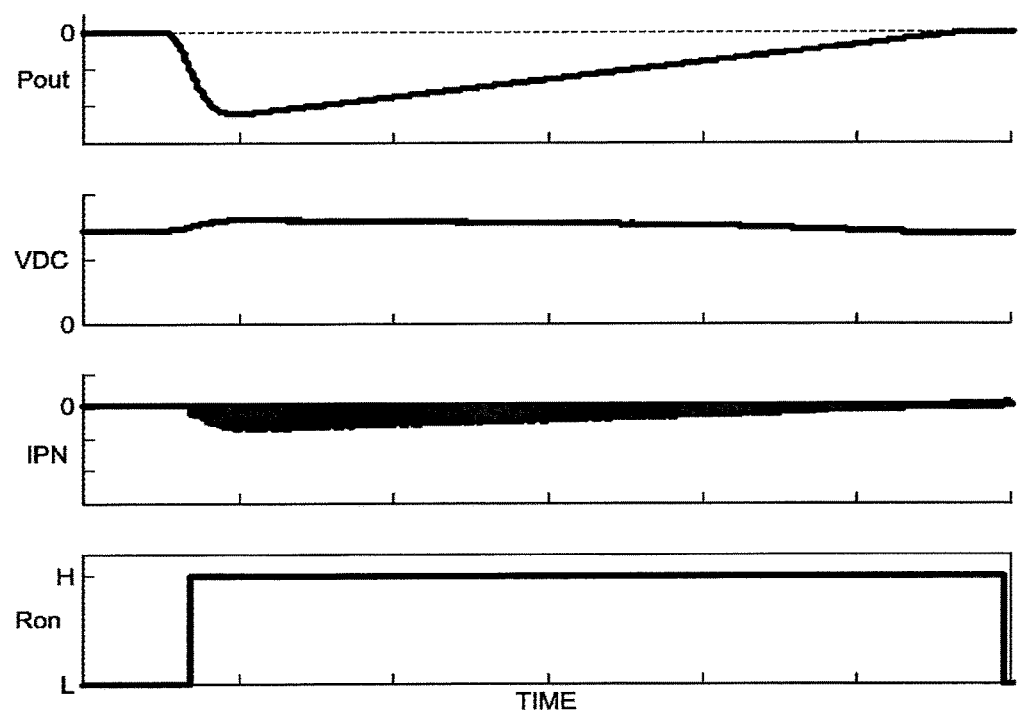
FIG. 27 is a set of waveform diagrams of relevant components illustrating a behavior when a motor performs a deceleration operation.

FIG. 27 is a set of waveform diagrams of relevant components illustrating a behavior when the motor 5 performs a deceleration operation. In FIG. 27, each horizontal axis represents time, and waveforms of motor output Pout, the capacitor voltage VDC, the bus current IPN, and the regeneration ON signal Ron are illustrated from an upper side of the figure.

When the motor 5 starts decelerating, the capacitor voltage VDC increases. When VDC is determined to exceed a threshold by the regeneration start determination unit 60, the regeneration start determination unit 60 outputs H and the regeneration ON signal Ron outputs H. As a result, the base drive signals are output from the regeneration control unit 27A to the drive circuit of the power module 22, a power regenerative operation is started, and a negative regenerative current flows in the bus current IPN. When the motor output Pout decreases, that is, when the regenerative energy of the motor 5 decreases, the regenerative current decreases and eventually the power supply voltage of the input power supply 3>VDC is satisfied, and a positive current, that is, a power running current starts flowing in the bus current IPN. When the current flowing in the bus current IPN increases to be larger than Iref, the regeneration stop determination unit 61 outputs L, that is, the regeneration ON signal Ron outputs L, and the regenerative operation is stopped.

According to the sixth embodiment, by monitoring the bus current flowing between the power module 22 and the smoothing capacitor 21, and determining the stop of the regenerative operation based on the flowing directions of the bus current (positive current, negative current), it is possible to achieve an operation as the power regenerative converter 1 without monitoring the input current. As a result, the number of the current detection units is reduced, and the necessity of an input current to direct-current conversion unit is obviated, which makes it possible to achieve regeneration control with a simple configuration and low cost.

Seventh Embodiment

Figure 28:
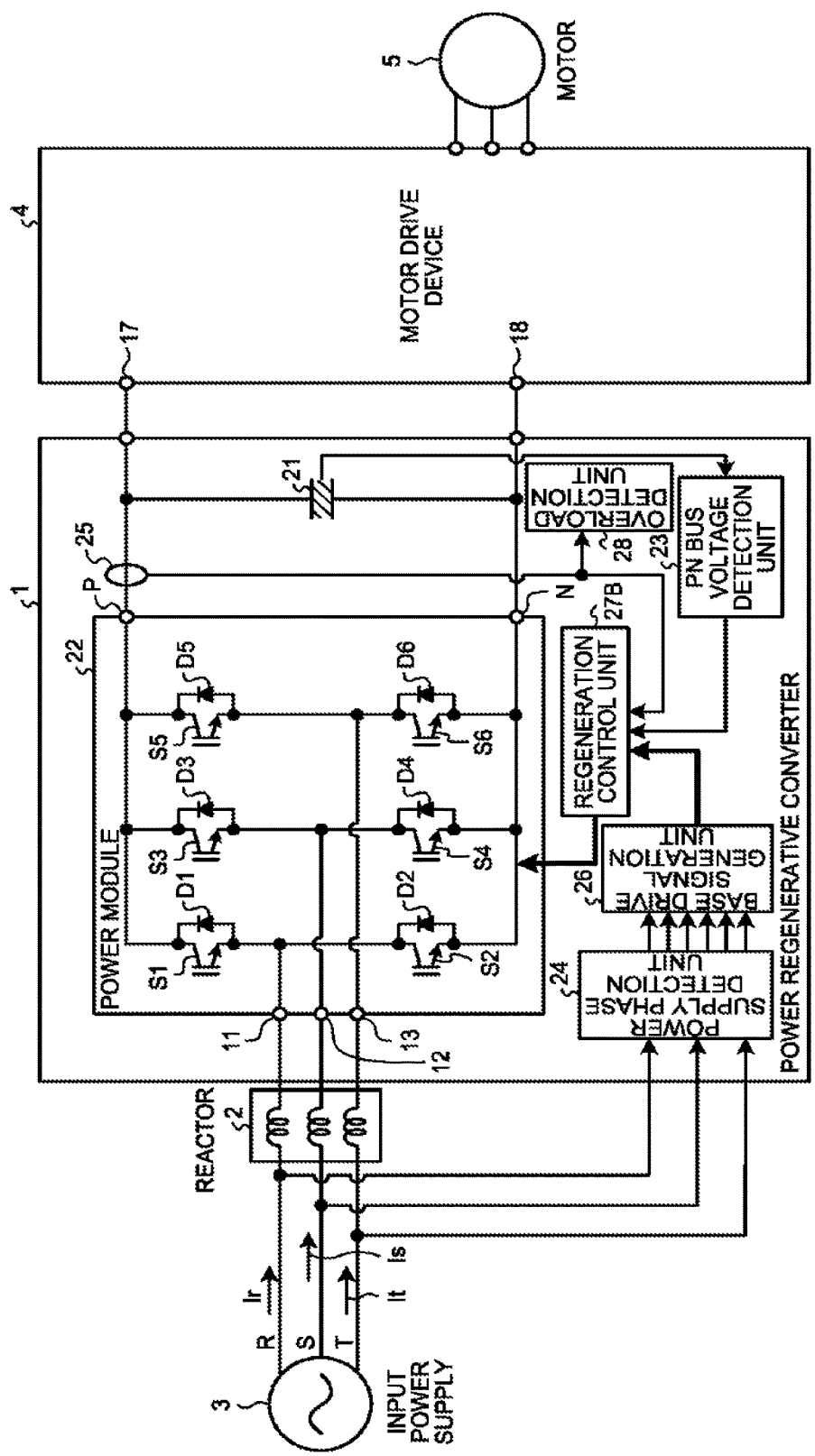
FIG. 28 is a block diagram illustrating a configuration of a motor control device according to a seventh embodiment.

FIG. 28 is a block diagram illustrating a motor control device according to a seventh embodiment. In FIG. 28, the same reference signs are given to constituent elements which are the same as or equivalent to the constituent elements of the sixth embodiment illustrated in FIG. 25. Here, a description will be given focusing on parts relating to the seventh embodiment. In FIG. 28, in a power regenerative converter according to the seventh embodiment, the regeneration control unit 27B is provided in place of the regeneration control unit 27A in the configuration illustrated in FIG. 25.

In the sixth embodiment, the stop of the regenerative operation is determined based on the directions of the bus current flowing between the power module 22 and the smoothing capacitor 21. However, depending on power supply situations of the input power supply 3 or source impedance of the input power supply 3, it is expected that the regenerative operation will be stopped even when the motor 5 still has large regenerative energy.

FIGS. 29 to 34 are waveform diagrams of relevant components for explaining behaviors during a regenerative operation, the behaviors being caused by changes in the source impedance. The behaviors during the regenerative operation are easily affected by inductance of the source impedance. Therefore, a basic component of an inductance component is denoted by L, the inductance component of the source impedance is denoted by Lin, and consideration is given to behaviors when changing a value of the inductance component Lin of the source impedance.

Figure 29:
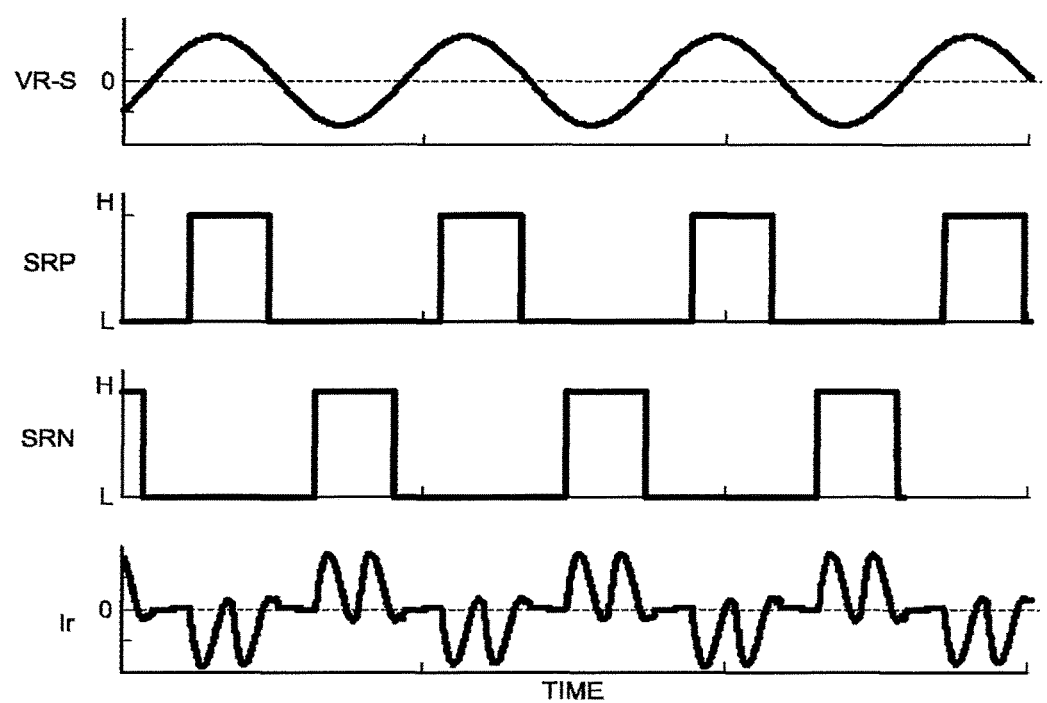
FIG. 29 is a set of waveform diagrams of relevant components when an inductance component Lin of source impedance is (0.2×L).
Figure 30:
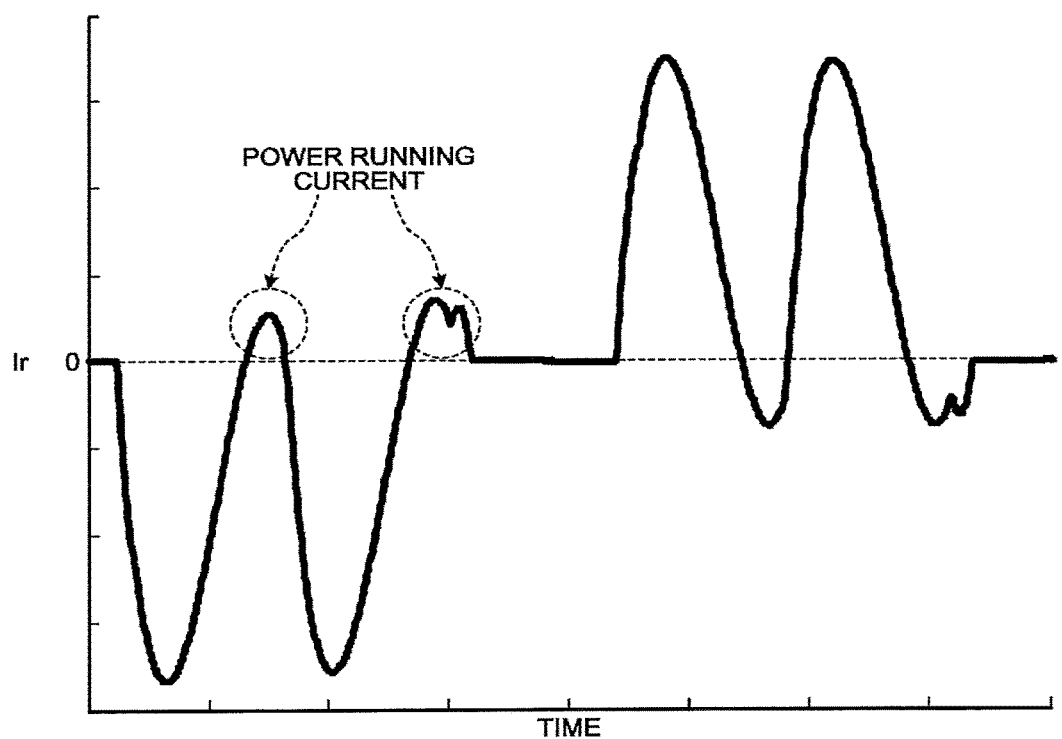
FIG. 30 is an enlarged waveform diagram of an R-phase current Ir illustrated in FIG. 29.
Figure 31:
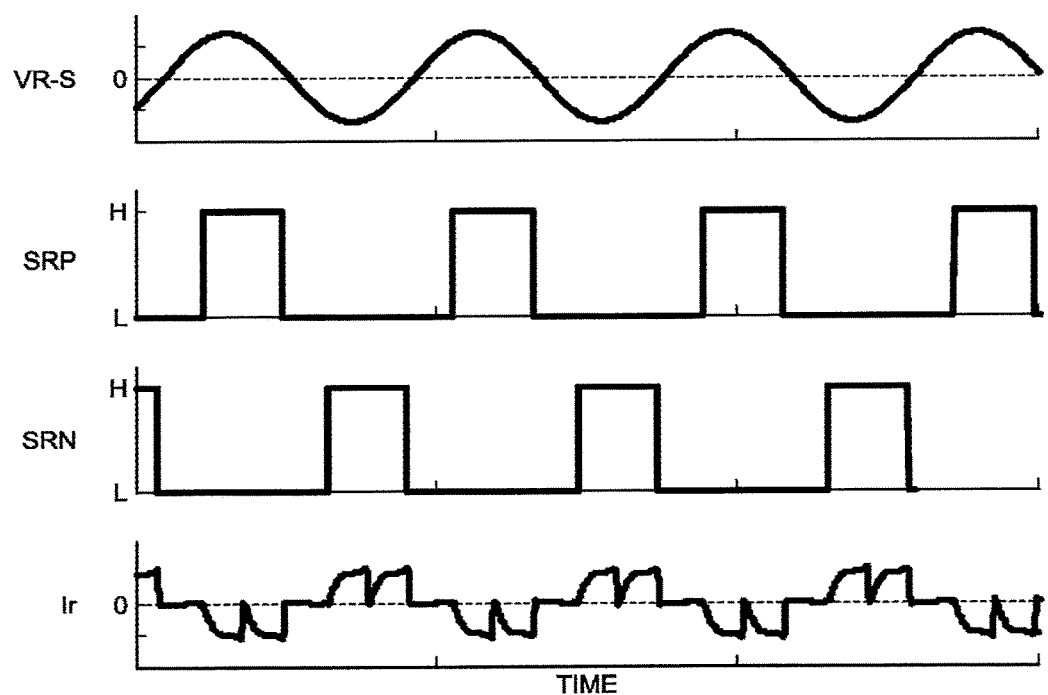
FIG. 31 is a set of waveform diagrams of relevant components when the inductance component Lin of the source impedance is (1×L).
Figure 32:
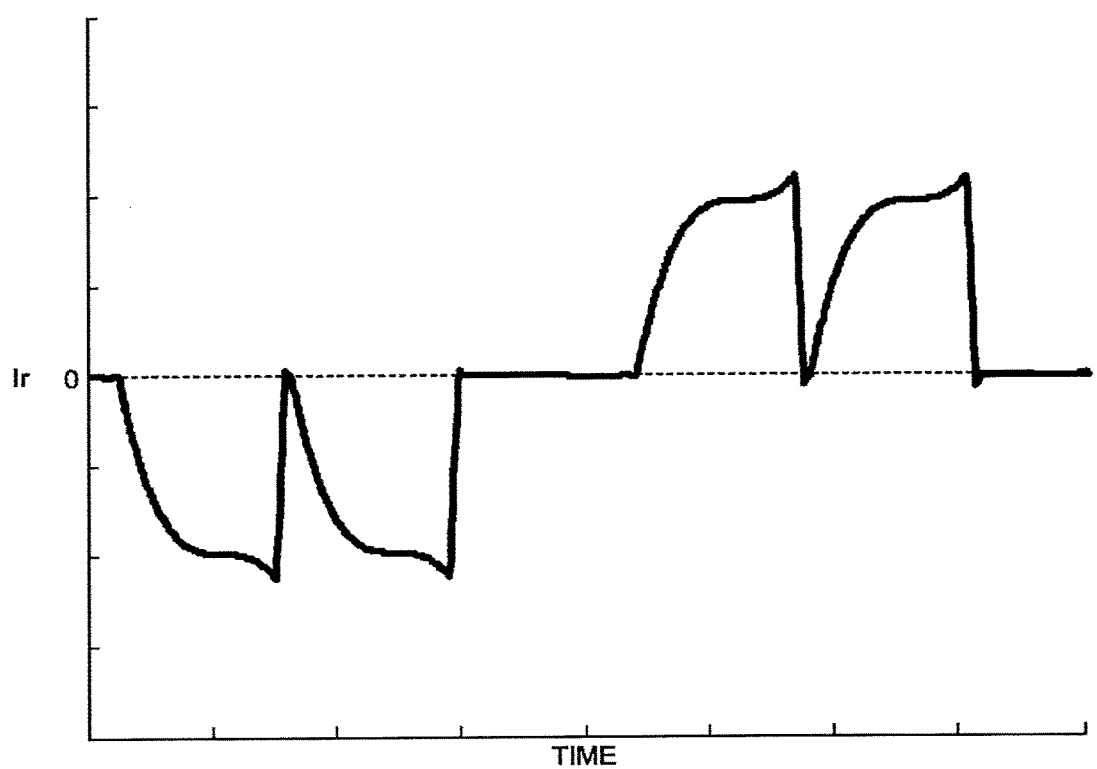
FIG. 32 is an enlarged waveform diagram of an R-phase current Ir illustrated in FIG. 31.
Figure 33:
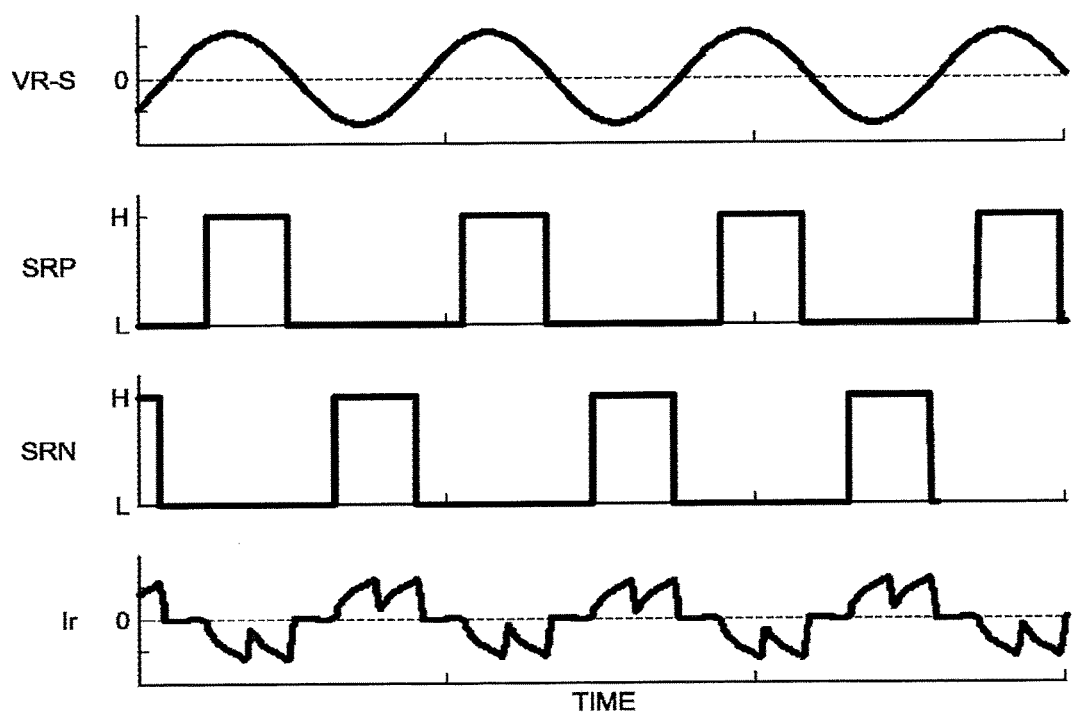
FIG. 33 is a set of waveform diagrams of relevant components when the inductance component Lin of the source impedance is (5×L).
Figure 34:
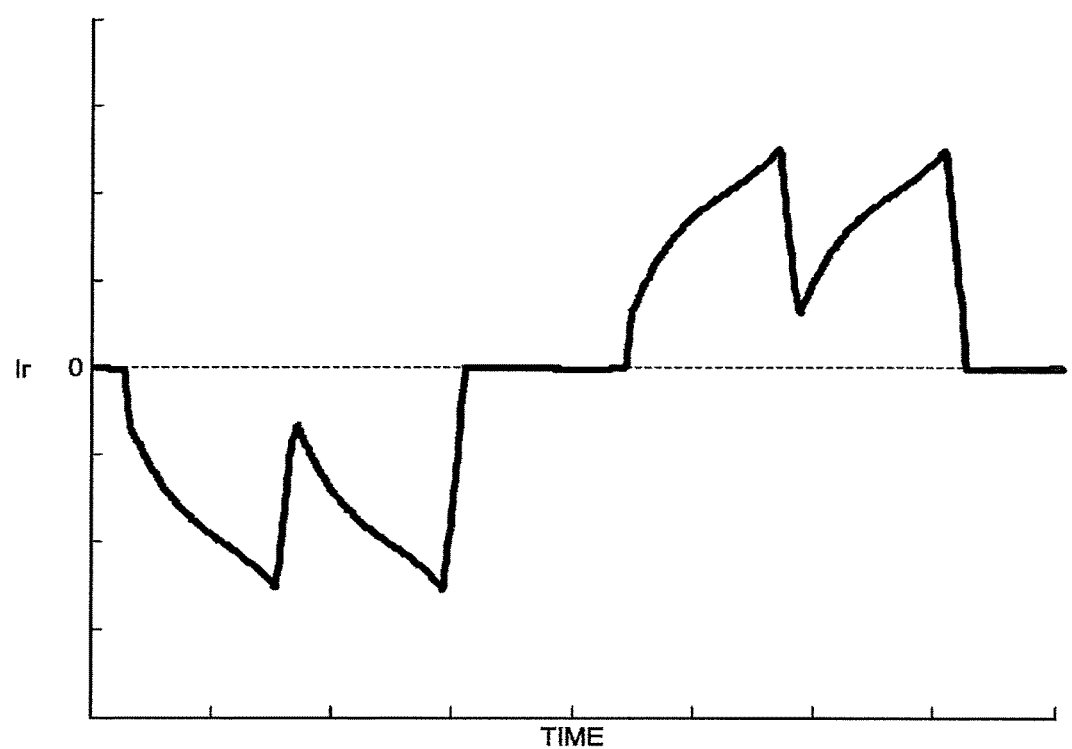
FIG. 34 is an enlarged waveform diagram of an R-phase current Ir illustrated in FIG. 33.

Among FIGS. 29 to 34, FIG. 29 is a set of waveform diagrams when Lin=0.2×L is satisfied for the inductance component Lin of the source impedance, and illustrates, from an upper portion thereof, the R-S line voltage VR-S, the base drive signal for driving the regenerative switching element S1, that is, the S-phase upper arm base drive signal SRP, the base drive signal for driving the regenerative switching element S2, that is, the S-phase lower arm base drive signal SRN, and the R-phase current Ir. FIG. 30 is a waveform diagram obtained by enlarging the R-phase current Ir illustrated in FIG. 29. The same applies to FIGS. 31 to 34, and FIG. 31 is a set of waveform diagrams when Lin=1×L is satisfied for the inductance component Lin of the source impedance, and FIG. 32 is an enlarged waveform diagram of the R-phase current Ir illustrated in FIG. 31. FIG. 33 is a set of waveform diagrams when Lin=5×L is satisfied for the inductance component Lin of the source impedance, and FIG. 34 is an enlarged waveform diagram of the R-phase current Ir illustrated in FIG. 33.

The capacitor voltage VDC increases due to regenerative power generated when the motor 5 is decelerated. The regenerative operation is started by the operation of the regeneration control unit 27A, and the base drive signals are input to a drive circuit which drives each regenerative switching element. When the regenerative switching elements S1 and S4 are turned ON by the base drive signals SRP and SSN (SSN is not illustrated in FIGS. 29, 31, and 33), the R-phase current Ir, which is negative, flows. As described above, FIGS. 29 and 30 illustrate waveforms when the source impedance is low (Lin=0.2×L) and a state where the current easily flows, and accordingly, for example, while the base drive signal SRP outputs H, the power running current flows after the regenerative current flows (see dashed circles in FIG. 30). On the other hand, in FIGS. 31 and 32, as well as FIGS. 33 and 34, no power running current flows while the regenerative switching elements S1 and S4 are ON. From the above, it can be seen that when the source impedance is low, the power running current flows even while the regenerative operation is being performed. Although only the R-phase current Ir is illustrated in FIGS. 29 to 34, the S-phase current Is and the T-phase current It have a similar waveform.

Figure 35:
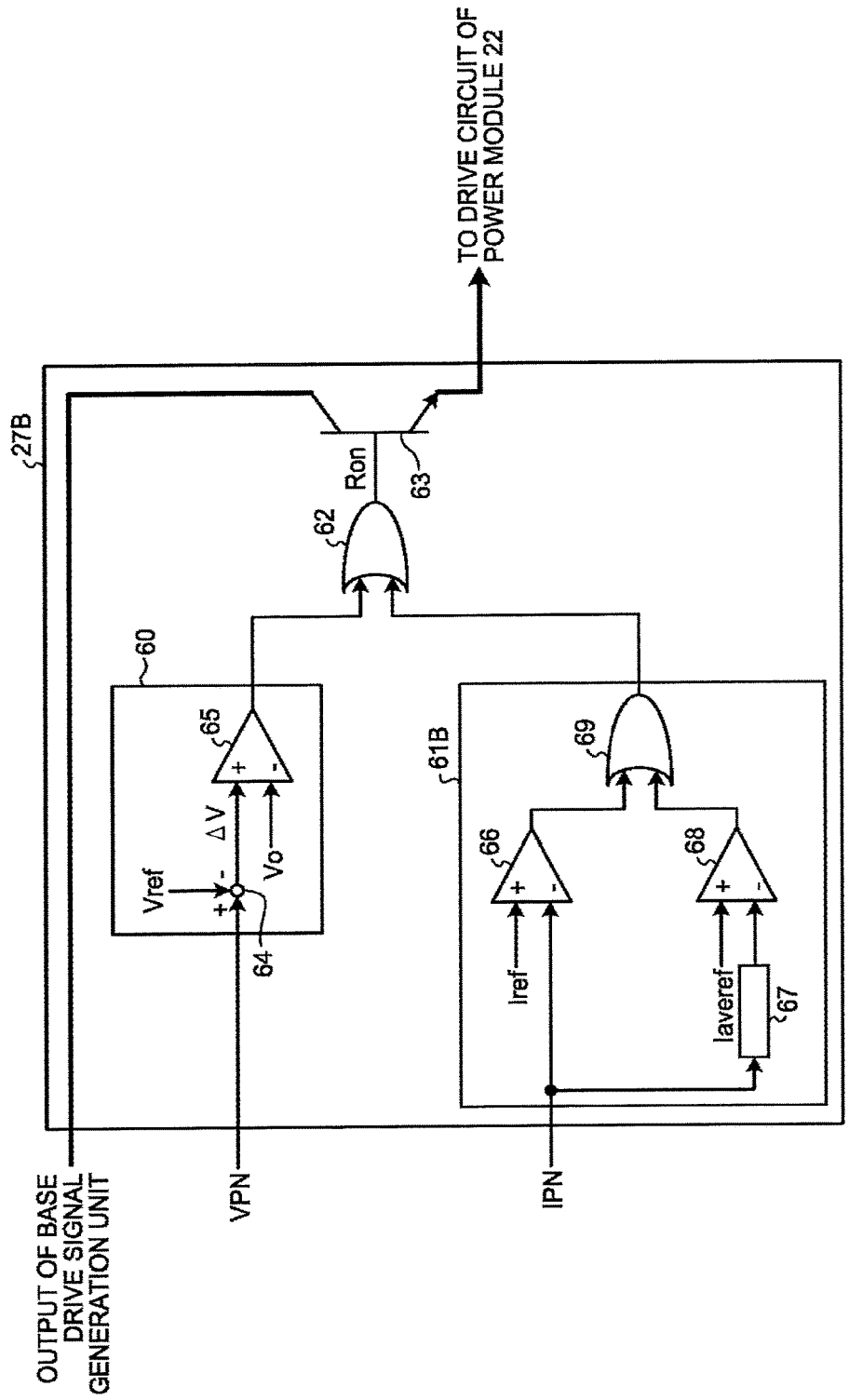
FIG. 35 is a block diagram illustrating a configuration example of a regeneration control unit according to the seventh embodiment.

In the seventh embodiment, the regeneration control unit 27B is applied in order to achieve regenerative control which can reliably stop the regenerative operation after the reduction of the regenerative energy of the motor 5 without being affected by the source impedance. FIG. 35 is a block diagram illustrating a configuration example of the regeneration control unit 27B. Compared with the block diagram of the regeneration control unit 27A illustrated in FIG. 26, the regeneration stop determination unit 61 is replaced with a regeneration stop determination unit 61B.

The regeneration stop determination unit 61B is configured to include the comparator 66, a filter unit 67, a comparator 68, and an OR circuit 69. The threshold current Iref is input to the positive terminal of the comparator 66, and the bus current IPN is input to the negative terminal of the comparator 66. The bus current IPN is input to the filter unit 67 to calculate the average bus current IPNave. A threshold current Iaveref is input to a positive terminal of the comparator 68, and the average bus current IPNave which is an output of the filter unit 67 is input to a negative terminal of the comparator 68. Respective outputs of the comparator 66 and the comparator 68 are input to the OR circuit 69, and an output signal of the OR circuit 69 is an output signal of the regeneration stop determination unit 61B.

The filter unit 67 includes a moving average filter or an IIR low pass filter, removes a high frequency ripple component and a noise component, and performs an averaging process of the bus current IPN.

The regeneration stop determination unit 61B determines whether to stop the regenerative operation based on the bus current IPN and the average bus current IPNave. According to the configuration of the regeneration stop determination unit 61B, even when the bus current IPN becomes larger than the threshold current Iref, the OR circuit 69 outputs H unless the average bus current IPNave is larger than the threshold current Iaveref, and therefore, the regenerative operation is not stopped. In addition, even when the average bus current IPNave exceeds the threshold current Iaveref, the OR circuit 69 outputs H unless the bus current IPN exceeds the threshold current Iref, and therefore, the regenerative operation is not stopped. Conversely, the regenerative operation is stopped only when the bus current IPN exceeds the threshold current Iref and the average bus current IPNave exceeds the threshold current Iaveref.

Figure 39:
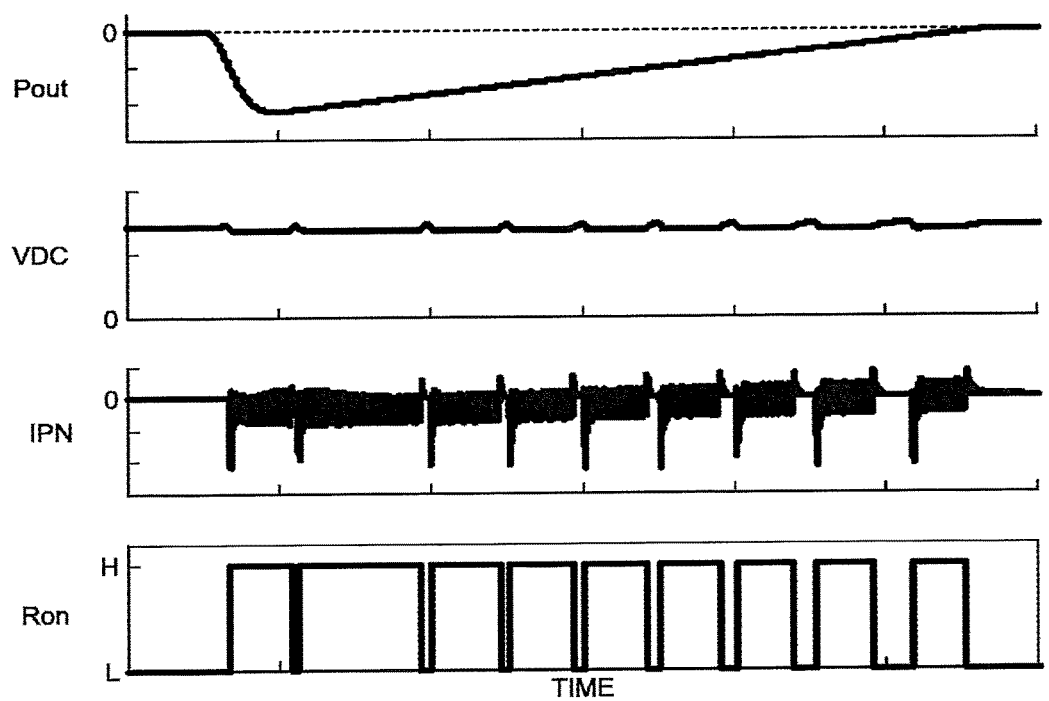
FIG. 39 is a set of waveform diagrams of relevant components (Lin=0.2×L) illustrating a behavior during a regenerative operation in a case of using the regeneration control unit applied in the sixth embodiment as a comparative example.

In the seventh embodiment, by adding the average bus current IPNave to determination conditions for stopping the regenerative operation, even when the source impedance is low and the power running current easily flows even while the motor is decelerating as illustrated in FIGS. 29 and 30, and FIG. 39 to be described later, it is possible to continue the regenerative operation while the motor 5 is decelerating, and to stop the regenerative operation even after the regenerative energy of the motor 5 approaches zero.

Figure 36:
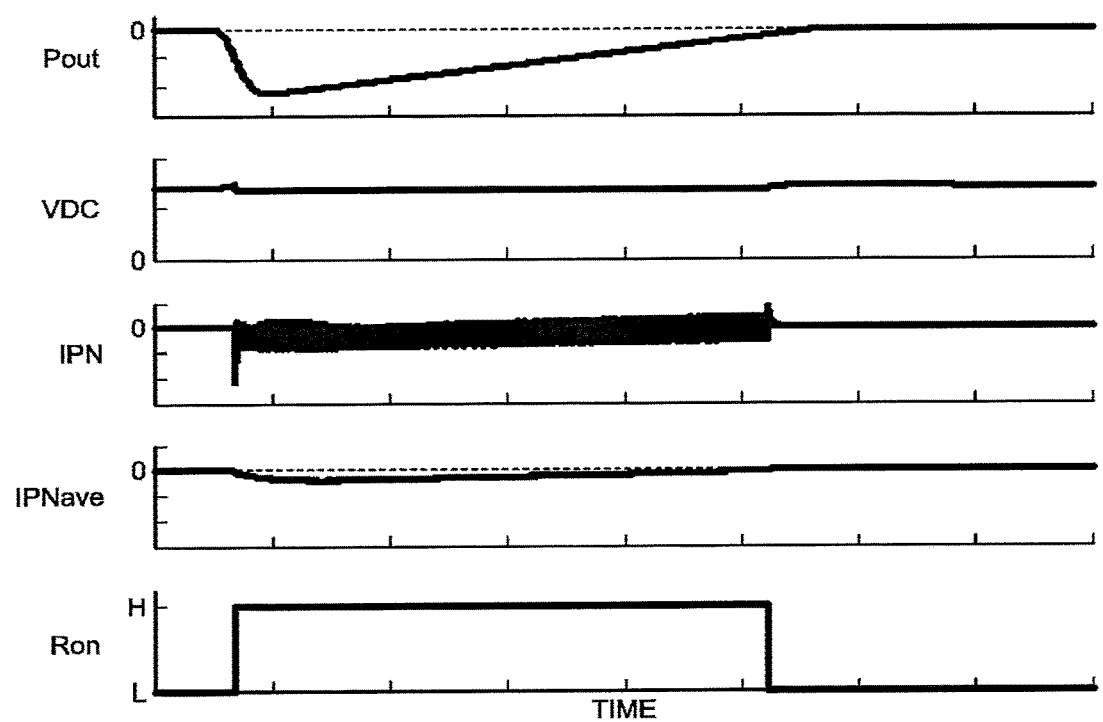
FIG. 36 is a set of waveform diagrams of relevant components (Lin=0.2×L) illustrating a behavior during a regenerative operation in a case of using the regeneration control unit applied in the seventh embodiment.
Figure 37:
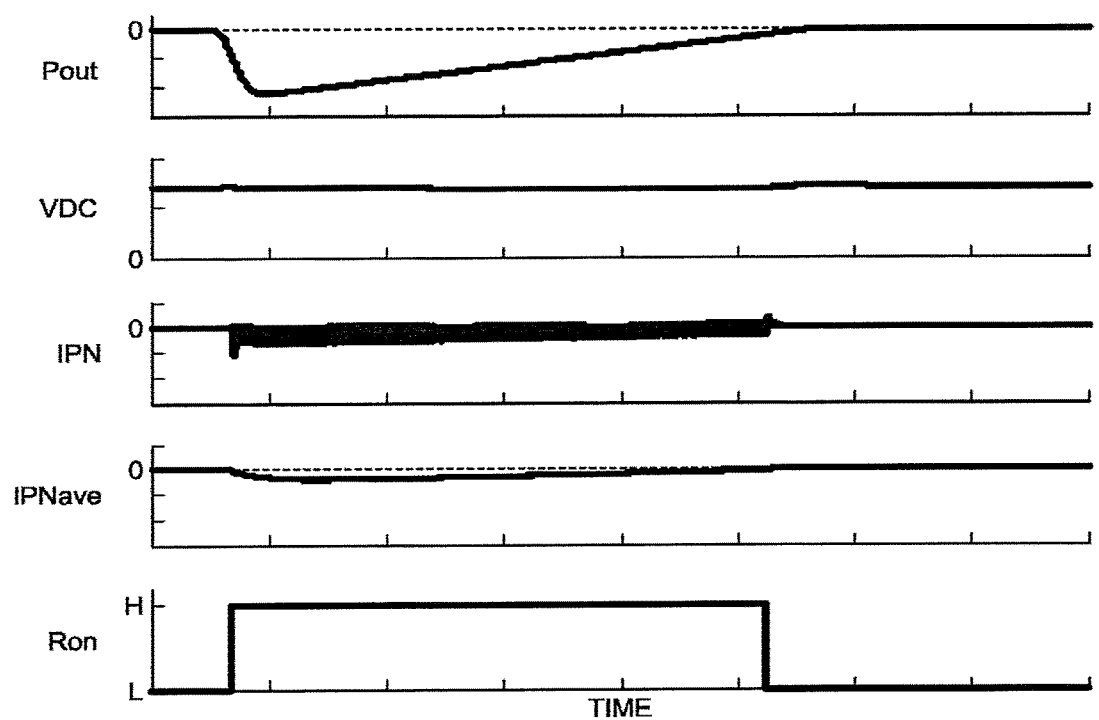
FIG. 37 is a set of waveform diagrams of relevant components (Lin=1×L) illustrating a behavior during the regenerative operation in the case of using the regeneration control unit applied in the seventh embodiment.
Figure 38:
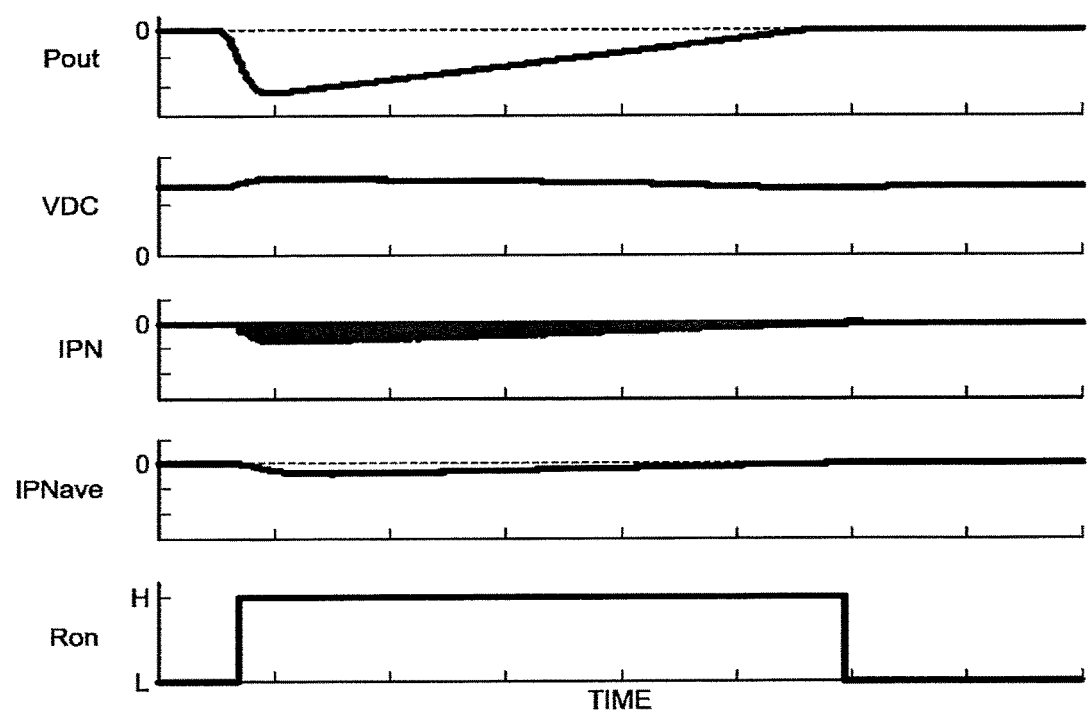
FIG. 38 is a set of waveform diagrams of relevant components (Lin=5×L) illustrating a behavior during the regenerative operation in the case of using the regeneration control unit applied in the seventh embodiment.

FIGS. 36 to 38 are diagrams illustrating behaviors during the regenerative operation, the behaviors being caused by changes in the source impedance when using the regeneration control unit 27B applied in the seventh embodiment. Among FIGS. 36 to 38, FIG. 36 is a set of waveform diagrams of relevant components when the inductance component Lin of the source impedance is 0.2×L, FIG. 37 is a set of waveform diagrams of respective components when the inductance component Lin of the source impedance is 1×L, and FIG. 38 is a set of waveform diagrams of respective components when the inductance component Lin of the source impedance is 5×L. Each of the figures illustrates, from an upper side thereof, waveforms of motor output Pout, the capacitor VDC, the bus current IPN, the average bus current IPNave, and the regeneration ON signal Ron.

Figure 40:
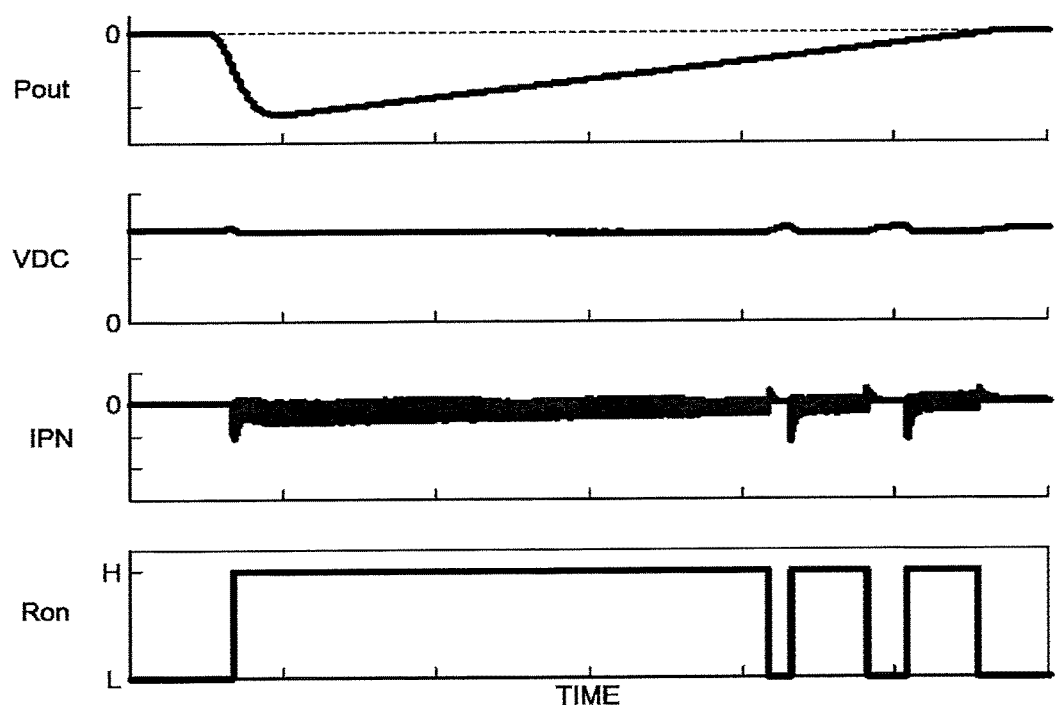
FIG. 40 is a set of waveform diagrams of relevant components (Lin=1×L) illustrating a behavior during the regenerative operation in the case of using the regeneration control unit applied in the sixth embodiment as a comparative example.
Figure 41:
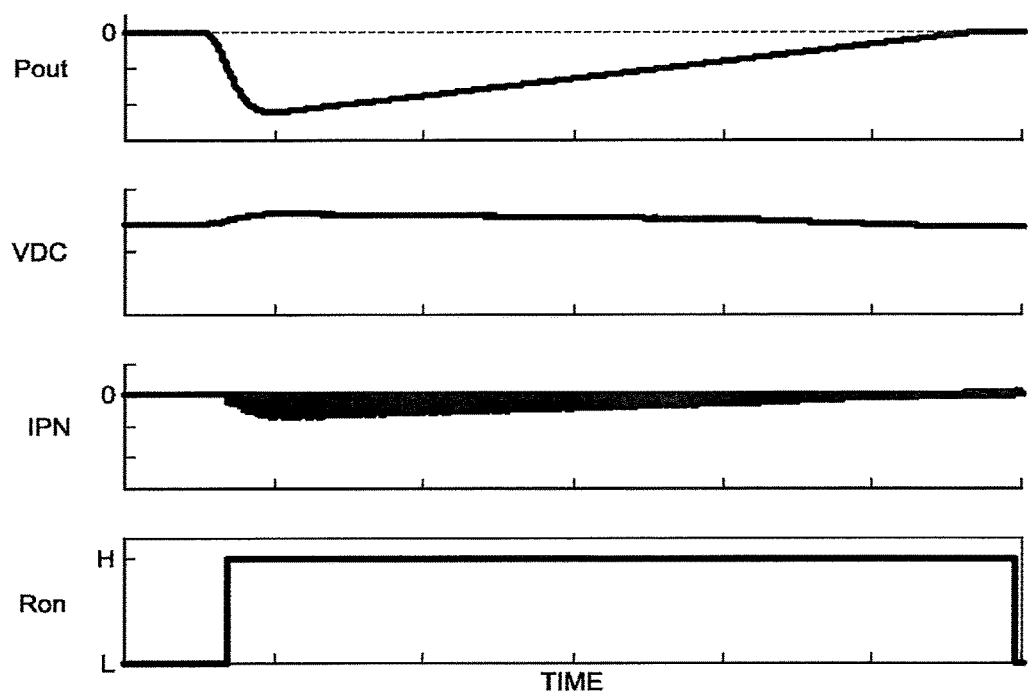
FIG. 41 is a set of waveform diagrams of relevant components (Lin=5×L) illustrating a behavior during the regenerative operation in the case of using the regeneration control unit applied in the sixth embodiment as a comparative example.

FIGS. 39 to 41 are diagrams illustrating, as a comparative example, behaviors during the regenerative operation, the behaviors being caused by changes in the source impedance when using the regeneration control unit 27A applied in the sixth embodiment. Similarly to FIGS. 36 to 38, these figures illustrate cases where the inductance components Lin of the source impedance are 0.2×L, 1×L, and 5×L, respectively, in this order.

When using the regeneration control unit 27A, although not seen in the waveforms illustrated in FIGS. 40 and 41, there are sections in the waveform illustrated in FIG. 39 where a positive current flows in the bus current IPN while the regenerative operation is being performed, due to the influence of the low source impedance. When this current becomes larger than the threshold current Iref, the regeneration ON signal Ron becomes L, and the regenerative operation is stopped. At that time, since the motor 5 continues to decelerate, the capacitor voltage VDC increases, the regeneration ON signal Ron becomes H, and the regenerative operation is resumed. That is, it can be seen that while the motor 5 is decelerating, the regenerative operation is repeatedly switched between ON and OFF.

On the other hand, it can be seen that when using the regeneration control unit 27B, even in the case illustrated in FIG. 36 where the source impedance is low, the regeneration ON signal Ron outputs L after the motor output Pout approaches zero, and the regenerative operation is stopped similarly to the cases illustrated in FIGS. 37 and 38. In addition, it can be seen that the capacitor voltage VDC does not fluctuate and the stable regenerative operation continues.

From the above, when the source impedance is relatively large and it is less likely to be affected by the source impedance, a power regenerative converter with reduced cost and reduced circuit scale can be achieved by adopting the regeneration control unit 27A applied in the sixth embodiment. On the other hand, when the source impedance is relatively small and the influence of the source impedance is non-negligible, a highly reliable power regenerative converter can be achieved by adopting the regeneration control unit 27B applied in the seventh embodiment.

As described above, according to the seventh embodiment, not only the bus current IPN but also the average bus current IPNave is used for determination to stop the regenerative operation, and thereby it is possible to continue the regenerative operation without being affected by the source impedance while the motor is decelerating, and to stop the regenerative operation without fail after the regenerative energy has considerably decreased. As a result, regeneration control can be achieved at low cost with a simple configuration in which the number of the current detection units is reduced and an input current to direct-current conversion unit is not necessary.

Eighth Embodiment

Figure 42:
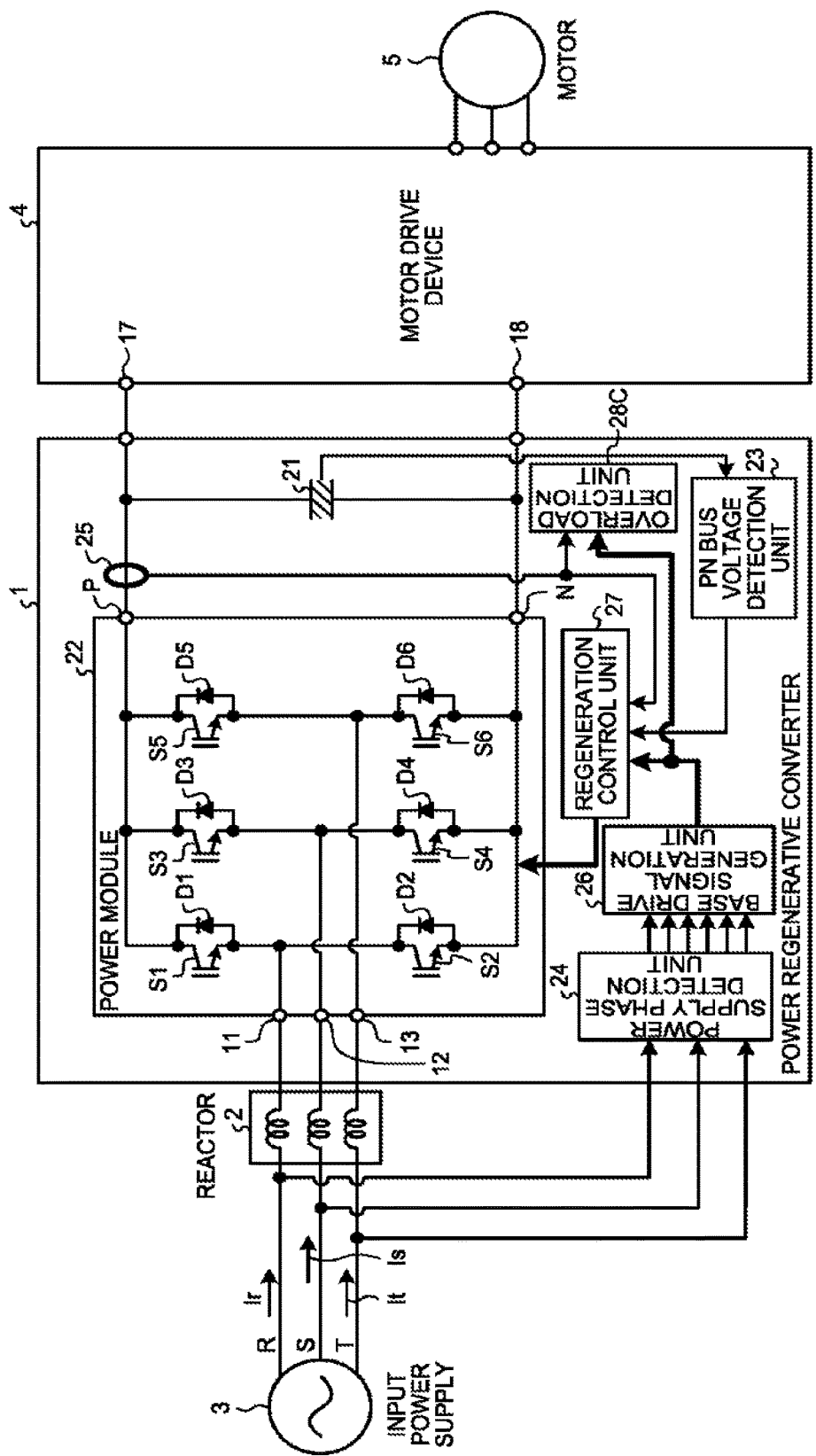
FIG. 42 is a block diagram illustrating a configuration of a motor control device according to an eighth embodiment.

FIG. 42 is a block diagram illustrating a configuration of a motor control device according to an eighth embodiment. In FIG. 42, the same reference signs are given to constituent elements which are the same as or equivalent to the constituent elements of the first embodiment illustrated in FIG. 1. Here, a description will be given focusing on parts relating to the eighth embodiment. In FIG. 42, in a power regenerative converter according to the eighth embodiment, an overload detection unit 28C is provided in place of the overload detection unit 28 in the configuration illustrated in FIG. 1. In addition to the bus current IPN detected by the bus current detection unit 25, a base drive signal which is an output signal of the base drive signal generation unit 26 is input to the overload detection unit 28C.

In the first embodiment, the instantaneous overload is detected in the overload detection unit 28 based on whether the bus current IPN flowing between the power module 22 and the smoothing capacitor 21 falls under a predetermined threshold current value. This configuration is based on a premise that the case-to-junction thermal resistance Rj-c of each power element constituting the power module 22 is constant, and is equivalent to instantaneous overload detection based on the case-to-junction temperature rise ΔTj-c obtained by the aforementioned formula (13) (calculated from the formula (18) in a case of the rectifier elements, and from the formula (22) in a case of the regenerative switching elements).

However, as described above, the case-to-junction thermal resistance Rj-c has a transient thermal resistance characteristic which is a characteristic that a thermal resistance value changes with supply time of power that causes a power loss generated by the power element, and when the application time of the power loss is short, the case-to-junction temperature rise ΔTj-c of each power element is actually smaller than that expressed by the formula (13).

Figure 43:
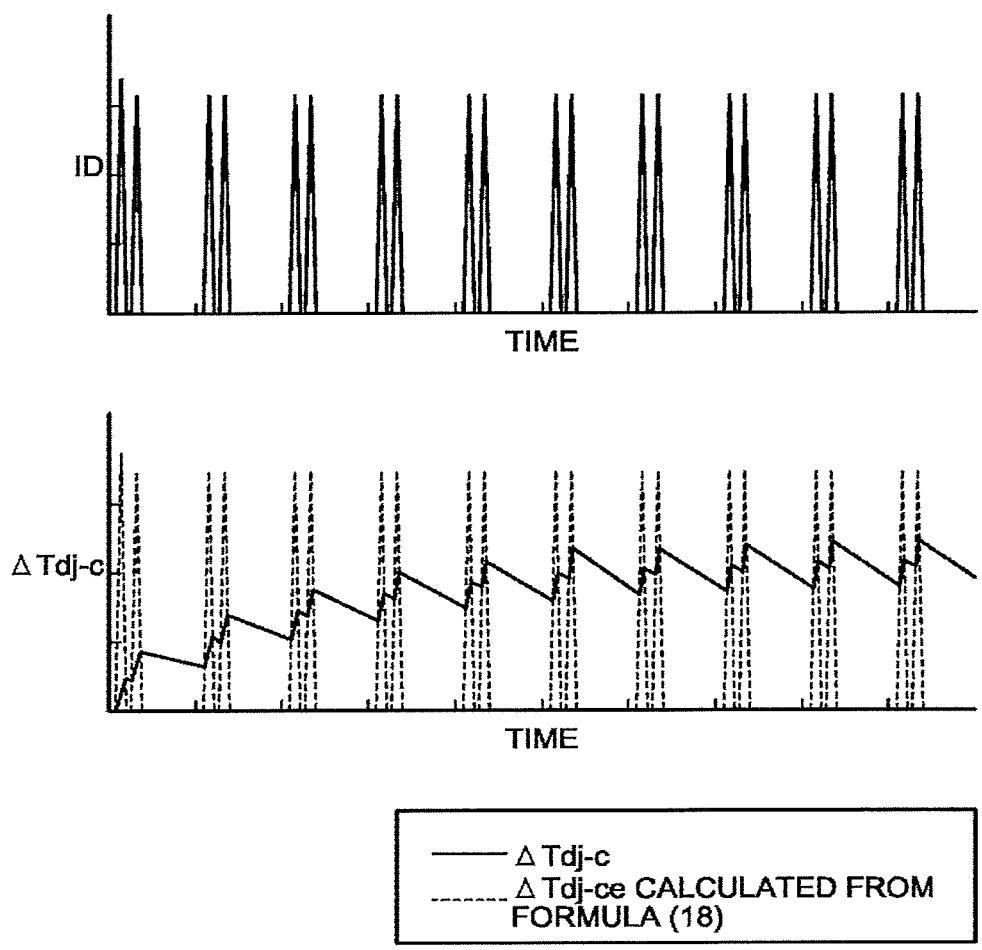
FIG. 43 is a set of waveform diagrams illustrating a case-to-junction temperature rise when a current flows through a rectifier element.

FIG. 43 is a set of waveform diagrams illustrating a case-to-junction temperature rise ΔTdj-c when a current flows through the rectifier element. FIG. 43 illustrates, from an upper portion thereof, the rectified current ID and the case-to-junction temperature rise ΔTdj-c in this order. In a lower portion of FIG. 43, the case-to-junction temperature rise ΔTdj-c is indicated by a solid line and a case-to-junction temperature rise calculation value ΔTdj-ce calculated based on the formula (18) is indicated by a dashed line.

In the lower portion of FIG. 43, the case-to-junction temperature rise calculation value ΔTdj-ce is a large value as compared with the actual case-to-junction temperature rise ΔTdj-c, and it can be seen that the case-to-junction temperature rise calculation value ΔTdj-ce is overestimated when using the formula (18). Although the case where the current flows through the rectifier element is illustrated here, the same result is obtained in a case of the regenerative switching element.

In the case of the configuration of the first embodiment, since a transient thermal characteristic of the case-to-junction thermal resistance Rj-c is not taken into consideration, the overload detection unit 28 determines that the power regenerative converter 1 is overloaded although there is a margin in the case-to-junction temperature rise ΔTj-c of the power element. In that case, an operation is performed such that motor output is limited, and there is a disadvantage that a cycle time is prolonged in industrial machines such as those described above.

Therefore, in the overload detection unit 28C, instantaneous overload is detected while taking the transient thermal characteristic between the case and the junction of each power element constituting the power module 22 into consideration. Details of a configuration example, an operation, and the like of the overload detection unit 28C will be described later.

Figure 44:
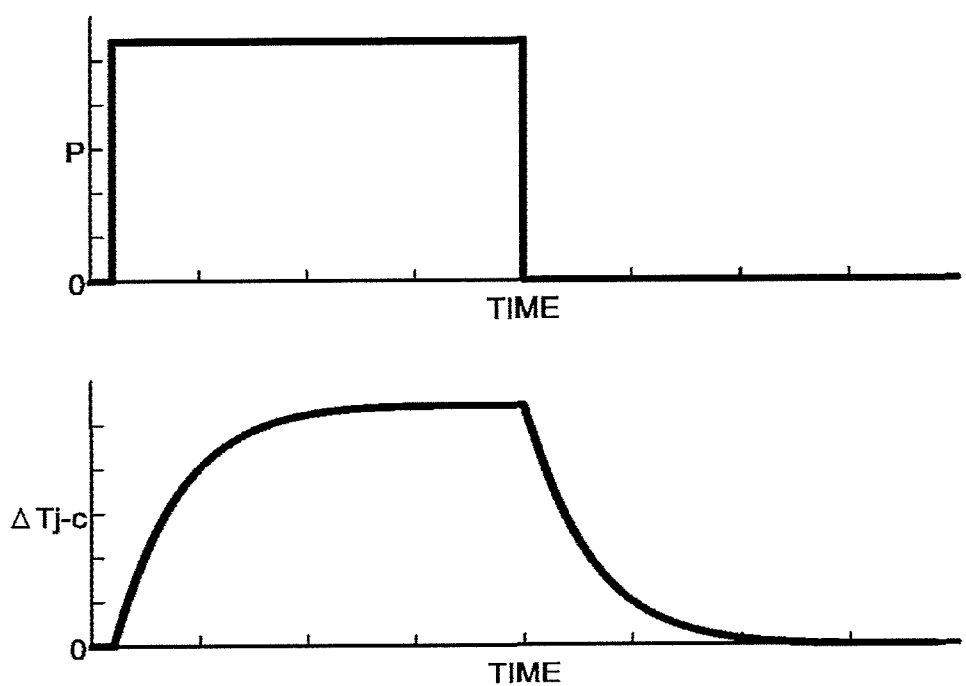
FIG. 44 is a set of waveform diagrams illustrating a relationship between a loss generated in each power element constituting the power module and the case-to-junction temperature rise.

FIG. 44 illustrates a relationship between the loss P generated in each power element constituting the power module 22 and the case-to-junction temperature rise ΔTj-c. In FIG. 44, a waveform of the generated loss P which changes stepwise is illustrated in an upper portion thereof. In a lower portion thereof, the case-to-junction temperature rise ΔTj-c when the loss P generated in the power element changes stepwise is illustrated. As can be seen from FIG. 44, a change characteristic of the case-to-junction temperature rise ΔTj-c is close to that of a lag filter of several orders (for example, an IIR filter).

Therefore, the relationship between the loss P generated in the power element and the case-to-junction temperature rise ΔTj-c illustrated in FIG. 44 can be expressed by the following formula.

$$\Delta Tj\text{-}c(s) = G2(s) \times P(s) = \beta/(1+s \times tj1) \times P(s) \qquad (49)$$

In the above formula (49), s is a Laplace operator, and $G2(s)(=\beta/(1+s \times tj1))$ is a transfer function when a transfer characteristic using the loss P(s) generated in the power element as input and a case-to-junction temperature rise ΔTj-c(s) as output is approximated with a formula having a transfer function of first-order lag. In addition, β is a conversion constant, and tj1 is a time constant.

The conversion constant β in the above formula (49) is calculated from a case-to-junction temperature rise value ΔTj-cm which is saturated when the power loss P generated in the power element is constant, and can be expressed by the following formula.

$$\beta = \Delta Tj\text{-}cm/P \quad (50)$$

The conversion constant β calculated by the above formula (50) can be expressed from the aforementioned formula (13) as follows.

$$\beta = \Delta Tj\text{-}cm/P = Rj\text{-}c \times P/P = Rj\text{-}c \quad (51)$$

That is, the conversion constant β is equivalent to the case-to-junction thermal resistance Rj-c. When the transient thermal characteristic of the case-to-junction thermal resistance Rj-c is denoted by Rj-c(s) and saturation case-to-junction thermal resistance is denoted by Rj-cm, the transient thermal characteristic Rj-c(s) of the case-to-junction thermal resistance Rj-c can be expressed by the following formula.

$$Rj\text{-}c(s) = Rj\text{-}cm/(1+s \times tj1) \quad (52)$$

From the formulas (49) and (52), the case-to-junction temperature rise ΔTj-c(s) taking the transient thermal resistance into consideration can be expressed by the following formula.

$$\Delta Tj\text{-}c(s) = Rj\text{-}cm/(1+s \times tj1) \times P(s) \quad (53)$$

Here, since the saturation case-to-junction thermal resistance Rj-cm and the time constant tj1 in the aforementioned formula (53) are known values at a design stage, it is possible to calculate the case-to-junction temperature ΔTj-c taking the transient thermal resistance into consideration by inputting the loss generated in each power element. The loss generated in each power element can be calculated from the aforementioned formulas (15) and (19), and it suffices to detect a current flowing through each power element. However, the bus current detection unit 25 monitors the bus current IPN in the eighth embodiment, and consequently, it is difficult to directly detect the current flowing through each power element.

Figure 45:
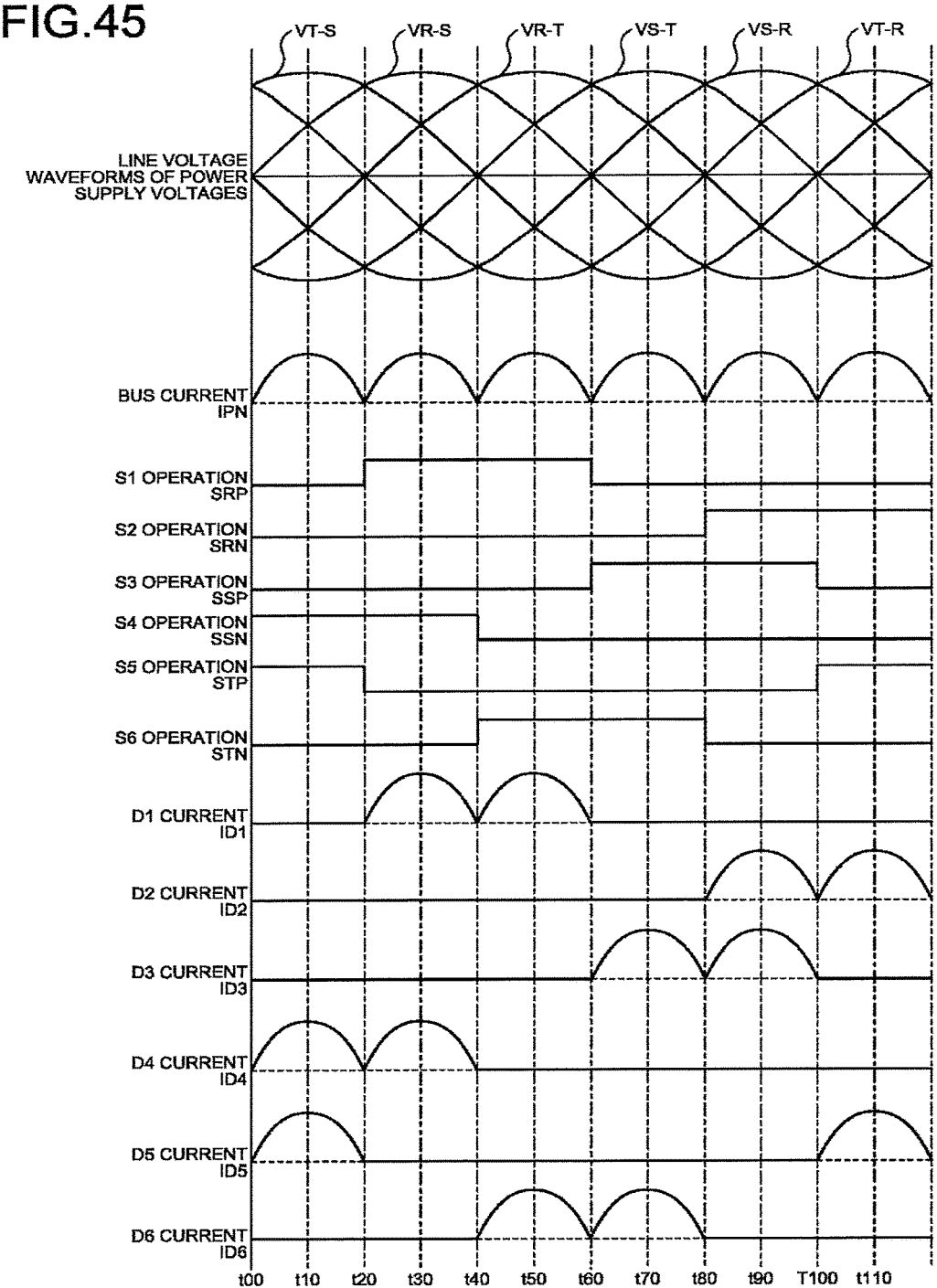
FIG. 45 is a time chart illustrating waveforms during motor power running in the eighth embodiment.

Therefore, a method of estimating the current flowing through each power element from the bus current IPN and each base drive signal will be examined. FIG. 45 is a time chart illustrating waveforms during motor power running. FIG. 45 illustrates, from an upper side thereof, changes with time of line voltage waveforms (VR-S, VS-T, VT-R, VS-R, VT-S, and VR-T) of power supply voltages, the bus current IPN, the base drive signals (SRP, SRN, SSP, SSN, STP, and STN) output from the base drive signal generation unit 26, and the rectified currents (ID1, ID2, ID3, ID4, ID5, and ID6) flowing through the rectifier elements D1 to D6, respectively. According to FIG. 45, the following operations are performed during motor power running.

<When the R-S Line Voltage VR-S has the Maximum Potential>

The rectifier elements D1 and D4 conduct and the rectified currents ID1 and ID4 flow. At that time, the base drive signals SRP and SSN output H.

<When the S-T Line Voltage VS-T has the Maximum Potential>

The rectifier elements D3 and D6 conduct and the rectified currents ID3 and ID6 flow. At that time, the base drive signals SSP and STN output H.

<When the T-R Line Voltage VT-R has the Maximum Potential>

The rectifier elements D2 and D5 conduct and the rectified currents ID2 and ID5 flow. At that time, the base drive signals STP and SRN output H.

<When the S-R Line Voltage VS-R has the Maximum Potential>

The rectifier elements D2 and D3 conduct and the rectified currents ID2 and ID3 flow. At that time, the base drive signals SSP and SRN output H.

<When the T-S Line Voltage VT-S has the Maximum Potential>

The rectifier elements D4 and D5 conduct and the rectified currents ID4 and ID5 flow. At that time, the base drive signals STP and SSN output H.

<When the R-T Line Voltage VR-T has the Maximum Potential>

The rectifier elements D1 and D6 conduct and the rectified currents ID1 and ID6 flow. At that time, the base drive signals SRP and STN output H.

As can be seen from FIG. 45, when the rectifier element D1 conducts, the base drive signal SRP outputs H. Likewise, when the rectifier element D2 conducts, the base drive signal SRN outputs H. When the rectifier element D3 conducts, the base drive signal SSP outputs H. When the rectifier element D4 conducts, the base drive signal SSN outputs H. When the rectifier element D5 conducts, the base drive signal STP outputs H. When the rectifier element D6 conducts, the base drive signal STN outputs H.

Similarly to FIG. 4, regarding the bus current IPN flowing between the P terminal of the power module 22 and the smoothing capacitor 21, a current which is the sum of currents flowing through the rectifier elements D1, D3, and D5 (or D2, D4, and D6) flows.

Here, L=0 and H=1 are treated as a premise in an output signal of each base drive signal. For example, when the base drive signal SRP is multiplied by the bus current IPN, a result of the multiplication is equivalent to the current flowing through the rectifier element D1. It goes without saying that the same result will be obtained when another base drive signal is multiplied by the bus current IPN, as can be seen from FIG. 45.

Figure 46:
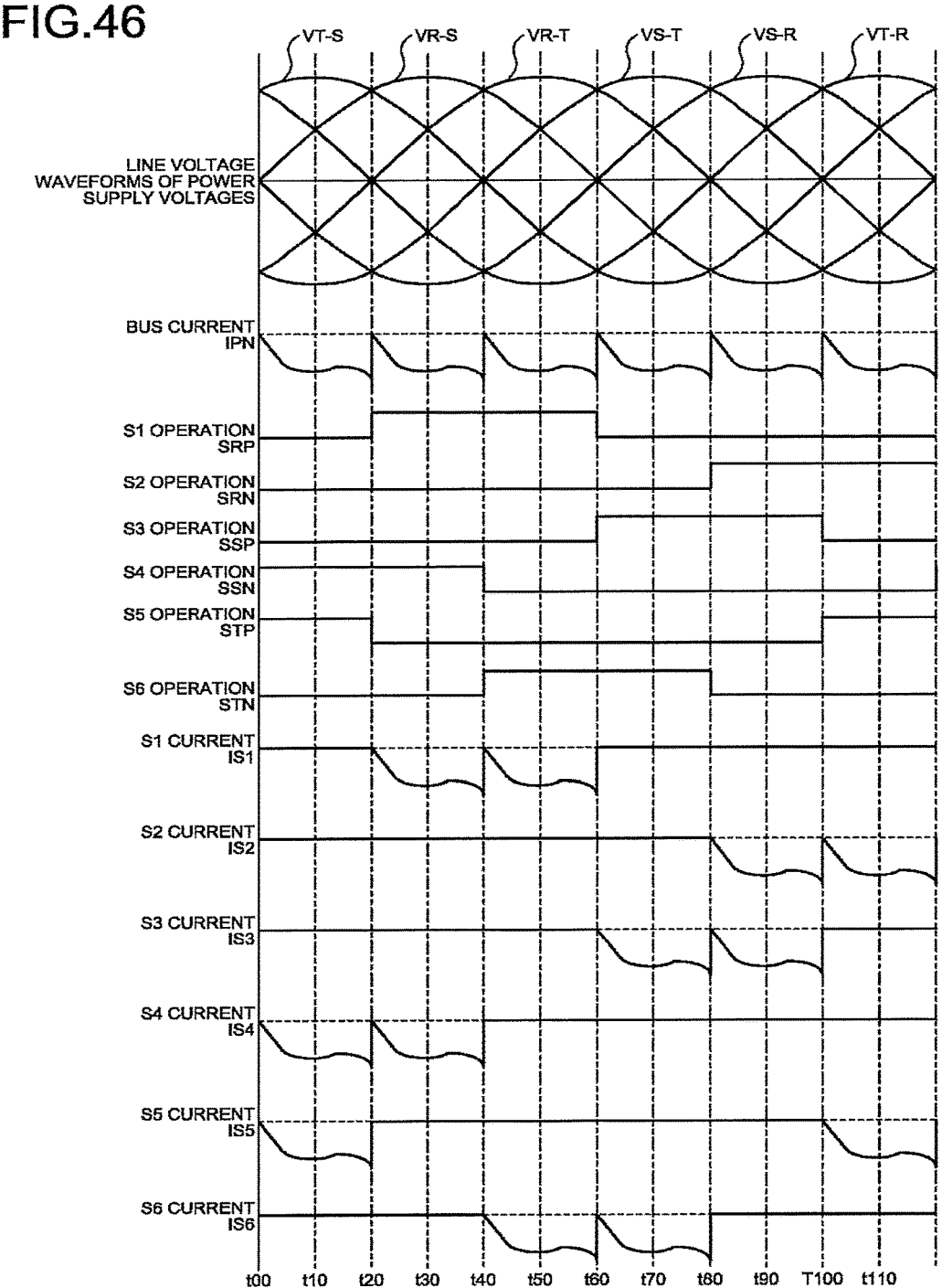
FIG. 46 is a time chart illustrating waveforms during motor regeneration in the eighth embodiment.

FIG. 46 is a time chart illustrating waveforms when a power regenerative operation is performed during motor regeneration. FIG. 46 illustrates, from an upper side thereof, changes with time of the line voltage waveforms (VR-S, VS-T, VT-R, VS-R, VT-S, and VR-T) of the power supply voltages, the bus current IPN, the base drive signals (SRP, SRN, SSP, SSN, STP, and STN) output from the base drive signal generation unit 26, and the regenerative currents (IS1, IS2, IS3, IS4, IS5, and IS6) flowing through the regenerative switching elements S1 to S6, respectively. According to FIG. 46, the following operations are performed during motor regeneration.

<When the R-S Line Voltage VR-S has the Maximum Potential>

The regenerative switching elements S1 and S4 conduct and the regenerative currents IS1 and IS4 flow. At that time, the base drive signals SRP and SSN output H.

<When the S-T Line Voltage VS-T has the Maximum Potential>

The regenerative switching elements S3 and S6 conduct and the regenerative currents IS3 and IS6 flow. At that time, the base drive signals SSP and STN output H.

<When the T-R Line Voltage VT-R has the Maximum Potential>

The regenerative switching elements S2 and S5 conduct and the regenerative currents IS2 and IS5 flow. At that time, the base drive signals STP and SRN output H.

<When the S-R Line Voltage VS-R has the Maximum Potential>

The regenerative switching elements S2 and S3 conduct and the regenerative currents IS2 and IS3 flow. At that time, the base drive signals SSP and SRN are H.

<When the T-S Line Voltage VT-S has the Maximum Potential>

The regenerative switching elements S4 and S5 conduct and the regenerative currents IS4 and IS5 flow. At that time, the base drive signals STP and SSN output H.

<When the R-T Line Voltage VR-T has the Maximum Potential>

The regenerative switching elements S1 and S6 conduct and the regenerative currents IS1 and IS6 flow. At that time, the base drive signals SRP and STN output H.

As can be seen from FIG. 46, when the regenerative switching element S1 conducts, the base drive signal SRP outputs H. Likewise, when the regenerative switching element S2 conducts, the base drive signal SRN outputs H. When the regenerative switching element S3 conducts, the base drive signal SSP outputs H. When the regenerative switching element S4 conducts, the base drive signal SSN outputs H. When the regenerative switching element S5 conducts, the base drive signal STP outputs H. When the regenerative switching element S6 conducts, the base drive signal STN outputs H.

Similarly to FIG. 6, regarding the bus current IPN flowing between the P terminal of the power module 22 and the smoothing capacitor 21, a current which is the sum of currents flowing through the regenerative switching elements S1, S3, and S5 (or S2, S4, and S6) flows.

Here, L=0 and H=1 are treated as a premise in an output signal of each base drive signal. For example, when the base drive signal SRP is multiplied by the bus current IPN, a result of the multiplication is equivalent to the current flowing through the regenerative switching element S1. It goes without saying that the same result will be obtained when another base drive signal is multiplied by the bus current IPN, as can be seen from FIG. 46.

From the above, it is possible to calculate the currents flowing through respective power elements from the bus current IPN and the six base drive signals regardless of whether during motor power running or motor regeneration.

Figure 47:
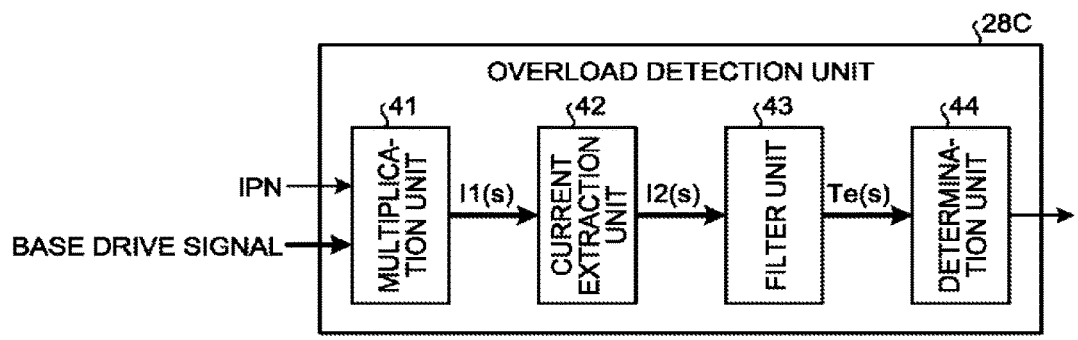
FIG. 47 is a block diagram illustrating a configuration example of an overload detection unit in the eighth embodiment.

Next, the overload detection unit 28C will be described. The overload detection unit 28C detects whether the power regenerative converter 1 is in the instantaneous overload condition based on the bus current IPN which is an output signal of the bus current detection unit 25 and each base drive signal which is an output signal of the base drive signal generation unit 26. FIG. 47 illustrates a configuration example of the overload detection unit 28C.

As illustrated in FIG. 47, the overload detection unit 28C is configured to include a multiplication unit 41, a current extraction unit 42, a filter unit 43, and a determination unit 44. The multiplication unit 41 and the current extraction unit 42 function as a current estimation unit.

The bus current IPN and each base drive signal are input to the multiplication unit 41, and an output signal of the multiplication unit 41 is input to the current extraction unit 42. An output signal of the current extraction unit 42 is input to the filter unit 43, and an output signal of the filter unit 43 is input to the determination unit 44. An output signal of the determination unit 44 is treated as an output signal of the overload detection unit 28C, and when the output signal of the determination unit 44 is H, it is determined that the power regenerative converter 1 is overloaded.

The multiplication unit 41 has a function of multiplying the bus current IPN by each base drive signal. Here, each base drive signal is represented by a function matrix S(s) of an s region indicated below.

[Formula 1]

$$S(s) = \begin{bmatrix} SRP(s) \\ SRN(s) \\ SSP(s) \\ SSN(s) \\ STP(s) \\ STN(s) \end{bmatrix} \quad (54)$$

When a result of multiplication of the bus current IPN(s) expressed as a function of the s region and the function matrix S(s) of the base drive signals expressed by the above formula (54) is denoted by I1(s), I1(s) can be expressed by the following formula.

[Formula 2]

$$I1(s) = \begin{bmatrix} SRP(s) \\ SRN(s) \\ SSP(s) \\ SSN(s) \\ STP(s) \\ STN(s) \end{bmatrix} \cdot IPN(s) = \begin{bmatrix} SRP(s) \cdot IPN(s) \\ SRN(s) \cdot IPN(s) \\ SSP(s) \cdot IPN(s) \\ SSN(s) \cdot IPN(s) \\ STP(s) \cdot IPN(s) \\ STN(s) \cdot IPN(s) \end{bmatrix} = \begin{bmatrix} IRP1(s) \\ IRN1(s) \\ ISP1(s) \\ ISN1(s) \\ ITP1(s) \\ ITN1(s) \end{bmatrix} \quad (55)$$

In the above formula (55), IRP1(s), IRN1(s), ISP1(s), ISN1(s), ITP1(s), and ITN1(s) are functions expressing currents flowing through the R-phase P-side, the R-phase N-side, the S-phase P-side, the S-phase N-side, the T-phase P-side, and the T-phase N-side power elements (the rectifier elements and the regenerative switching elements), respectively. This is equivalent to that when an output of each base drive signal is set to L=0 and H=1, as described above, and each base drive signal is multiplied by the bus current IPN, it is possible to calculate a current flowing through the power element where the regenerative switching element, to which the base drive signal corresponding thereto performs an ON/OFF operation, is disposed. That is, the multiplication unit 41 has a function of multiplying the bus current IPN by each base drive signal to calculate the current flowing through the power element where the regenerative switching element, to which the base drive signal corresponding thereto performs an ON/OFF operation, is disposed, and outputs a function matrix I1(s) including six functions each representing a current signal.

Next, the current extraction unit 42 will be described. The current extraction unit 42 has a function of extracting currents flowing through the rectifier elements of corresponding phases and currents flowing through the regenerative switching elements thereof from the above-described function matrix I1(s).

As can be seen from FIGS. 45 and 46, in each current signal constituting the function matrix I1(s), currents flowing in a positive direction are rectified currents flowing through the rectifier elements and currents flowing in a negative direction are regenerative currents flowing through the regenerative switching elements. In FIG. 42, the directions of the R-phase current Ir, the S-phase current Is, and the T-phase current It indicated by the arrows are positive directions. Therefore, if any of the currents flowing in the positive direction is extracted, any of the rectified currents flowing through the rectifier elements is extracted, and if any of the currents flowing in the negative direction is extracted, any of the regenerative currents flowing through the regenerative switching elements is extracted.

Here, in a case where a function having a function of extracting the rectified current flowing through each rectifier element (hereinafter referred to as "rectified current extraction function") is denoted by SATD(s), when an input signal to the rectified current extraction function SATD(s) is less than zero, zero is output, and when the input signal is zero or larger, the input signal is output as it is.

Alternatively, in a case where a function having a function of extracting the regenerative current flowing through each regenerative switching element (hereinafter referred to as "regenerative current extraction function") is denoted by SATS(s), when an input signal to the regenerative current extraction function SATS(s) is larger than zero, zero is output, and when the input signal is zero or less, the input signal is output as it is.

With the use of the rectified current extraction function SATD(s) and the regenerative current extraction function SATS(s) defined as above, a function matrix SAT(s) indicating the function of the current extraction unit 42 can be expressed by the following formula.

[Formula 3]

$$SAT(s) = \begin{bmatrix} SATD(s) & 0 & 0 & 0 & 0 & 0 \\ SATS(s) & 0 & 0 & 0 & 0 & 0 \\ 0 & SATD(s) & 0 & 0 & 0 & 0 \\ 0 & SATS(s) & 0 & 0 & 0 & 0 \\ 0 & 0 & SATD(s) & 0 & 0 & 0 \\ 0 & 0 & SATS(s) & 0 & 0 & 0 \\ 0 & 0 & 0 & SATD(s) & 0 & 0 \\ 0 & 0 & 0 & SATS(s) & 0 & 0 \\ 0 & 0 & 0 & 0 & SATD(s) & 0 \\ 0 & 0 & 0 & 0 & SATS(s) & 0 \\ 0 & 0 & 0 & 0 & 0 & SATD(s) \\ 0 & 0 & 0 & 0 & 0 & SATS(s) \end{bmatrix} \quad (56)$$

As expressed by the above formula (56), the function matrix SAT(s) includes a function matrix of 12 rows and six columns. By multiplying the function matrix SAT(s) by the function matrix I1(s), currents flowing through the power elements can be calculated separately. When a function matrix indicating the current flowing through each power element is denoted by I2(s), the function matrix I2(s) can be expressed by the following formula.

[Formula 4]

$$I2(s) = SAT(s) \cdot I1(s) \quad (57)$$

$$= \begin{bmatrix} SATD(s) & 0 & 0 & 0 & 0 & 0 \\ SATS(s) & 0 & 0 & 0 & 0 & 0 \\ 0 & SATD(s) & 0 & 0 & 0 & 0 \\ 0 & SATS(s) & 0 & 0 & 0 & 0 \\ 0 & 0 & SATD(s) & 0 & 0 & 0 \\ 0 & 0 & SATS(s) & 0 & 0 & 0 \\ 0 & 0 & 0 & SATD(s) & 0 & 0 \\ 0 & 0 & 0 & SATS(s) & 0 & 0 \\ 0 & 0 & 0 & 0 & SATD(s) & 0 \\ 0 & 0 & 0 & 0 & SATS(s) & 0 \\ 0 & 0 & 0 & 0 & 0 & SATD(s) \\ 0 & 0 & 0 & 0 & 0 & SATS(s) \end{bmatrix} \cdot \begin{bmatrix} IRP1(s) \\ IRN1(s) \\ ISP1(s) \\ ISN1(s) \\ ITP1(s) \\ ITN1(s) \end{bmatrix}$$

$$= \begin{bmatrix} SATD(s) \cdot IRP1(s) \\ SATS(s) \cdot IRP1(s) \\ SATD(s) \cdot IRN1(s) \\ SATS(s) \cdot IRN1(s) \\ SATD(s) \cdot ISP1(s) \\ SATS(s) \cdot ISP1(s) \\ SATD(s) \cdot ISN1(s) \\ SATS(s) \cdot ISN1(s) \\ SATD(s) \cdot ITP1(s) \\ SATS(s) \cdot ITP1(s) \\ SATD(s) \cdot ITN1(s) \\ SATS(s) \cdot ITN1(s) \end{bmatrix} = \begin{bmatrix} ID1e(s) \\ IS1e(s) \\ ID2e(s) \\ IS2e(s) \\ ID3e(s) \\ IS3e(s) \\ ID4e(s) \\ IS4e(s) \\ ID5e(s) \\ IS5e(s) \\ ID6e(s) \\ IS6e(s) \end{bmatrix}$$

As expressed by the above formula (57), the function matrix I2(s) is a function matrix of 12 rows and one column. Here, ID1e(s) is a calculated rectified current flowing through the R-phase P-side rectifier element, and IS1e(s) is a calculated regenerative current flowing through the R-phase P-side regenerative switching element. Likewise, ID2e(s) is a calculated rectified current flowing through the R-phase N-side rectifier element, and IS2e(s) is a calculated regenerative current flowing through the R-phase N-side regenerative switching element. ID3e(s) is a calculated rectified current flowing through the S-phase P-side rectifier element, and IS3e(s) is a calculated regenerative current flowing through the S-phase P-side regenerative switching element. ID4e(s) is a calculated rectified current flowing through the S-phase N-side rectifier element, and IS4e(s) is a calculated regenerative current flowing through the S-phase N-side regenerative switching element. ID5e(s) is a calculated rectified current flowing through the T-phase P-side rectifier element, and IS5e(s) is a calculated regenerative current flowing through the T-phase P-side regenerative switching element. ID6e(s) is a calculated rectified current flowing through the T-phase N-side rectifier element, and IS6e(s) is a calculated regenerative current flowing through the T-phase N-side regenerative switching element.

Next, the filter unit 43 will be described. The filter unit 43 has a function of filtering the rectified currents and a function of filtering the regenerative currents. Here, when a filter function for the rectified current calculation values (hereinafter referred to as "rectified current filter function") is denoted by FD(s) and a filter function for the regenerative current calculation values (hereinafter referred to as "regenerative current filter function") is denoted by FS(s), a function matrix F(s) indicating the function of the filter unit 43 can be expressed by the following formula.

[Formula 5]

$$F(s) = \begin{bmatrix} FD(s) & 0 & 0 & 0 & 0 & 0 & 0 & 0 & 0 & 0 & 0 & 0 \\ 0 & FS(s) & 0 & 0 & 0 & 0 & 0 & 0 & 0 & 0 & 0 & 0 \\ 0 & 0 & FD(s) & 0 & 0 & 0 & 0 & 0 & 0 & 0 & 0 & 0 \\ 0 & 0 & 0 & FS(s) & 0 & 0 & 0 & 0 & 0 & 0 & 0 & 0 \\ 0 & 0 & 0 & 0 & FD(s) & 0 & 0 & 0 & 0 & 0 & 0 & 0 \\ 0 & 0 & 0 & 0 & 0 & FS(s) & 0 & 0 & 0 & 0 & 0 & 0 \\ 0 & 0 & 0 & 0 & 0 & 0 & FD(s) & 0 & 0 & 0 & 0 & 0 \\ 0 & 0 & 0 & 0 & 0 & 0 & 0 & FS(s) & 0 & 0 & 0 & 0 \\ 0 & 0 & 0 & 0 & 0 & 0 & 0 & 0 & FD(s) & 0 & 0 & 0 \\ 0 & 0 & 0 & 0 & 0 & 0 & 0 & 0 & 0 & FS(s) & 0 & 0 \\ 0 & 0 & 0 & 0 & 0 & 0 & 0 & 0 & 0 & 0 & FD(s) & 0 \\ 0 & 0 & 0 & 0 & 0 & 0 & 0 & 0 & 0 & 0 & 0 & FS(s) \end{bmatrix} \quad (58)$$

As expressed by the above formula (58), the function matrix F(s) includes a function matrix of 12 rows and 12 columns. When this function matrix F(s) is multiplied by the above-described function matrix I2(s), an output of the filter unit 43 is obtained. When the output of the filter unit 43 is denoted by Te(s), Te(s) can be expressed by the following formula.

[Formula 6]

$$Te(s) = F(s) \cdot I2(s) \quad (59)$$

$$= \begin{bmatrix} FD(s) & 0 & 0 & 0 & 0 & 0 & 0 & 0 & 0 & 0 & 0 & 0 \\ 0 & FS(s) & 0 & 0 & 0 & 0 & 0 & 0 & 0 & 0 & 0 & 0 \\ 0 & 0 & FD(s) & 0 & 0 & 0 & 0 & 0 & 0 & 0 & 0 & 0 \\ 0 & 0 & 0 & FS(s) & 0 & 0 & 0 & 0 & 0 & 0 & 0 & 0 \\ 0 & 0 & 0 & 0 & FD(s) & 0 & 0 & 0 & 0 & 0 & 0 & 0 \\ 0 & 0 & 0 & 0 & 0 & FS(s) & 0 & 0 & 0 & 0 & 0 & 0 \\ 0 & 0 & 0 & 0 & 0 & 0 & FD(s) & 0 & 0 & 0 & 0 & 0 \\ 0 & 0 & 0 & 0 & 0 & 0 & 0 & FS(s) & 0 & 0 & 0 & 0 \\ 0 & 0 & 0 & 0 & 0 & 0 & 0 & 0 & FD(s) & 0 & 0 & 0 \\ 0 & 0 & 0 & 0 & 0 & 0 & 0 & 0 & 0 & FS(s) & 0 & 0 \\ 0 & 0 & 0 & 0 & 0 & 0 & 0 & 0 & 0 & 0 & FD(s) & 0 \\ 0 & 0 & 0 & 0 & 0 & 0 & 0 & 0 & 0 & 0 & 0 & FS(s) \end{bmatrix} \begin{bmatrix} ID1e(s) \\ IS1e(s) \\ ID2e(s) \\ IS2e(s) \\ ID3e(s) \\ IS3e(s) \\ ID4e(s) \\ IS4e(s) \\ ID5e(s) \\ IS5e(s) \\ ID6e(s) \\ IS6e(s) \end{bmatrix}.$$

$$\begin{bmatrix} FD(s) \cdot ID1e(s) \\ FS(s) \cdot IS1e(s) \\ FD(s) \cdot ID2e(s) \\ FS(s) \cdot IS2e(s) \\ FD(s) \cdot ID3e(s) \\ FS(s) \cdot IS3e(s) \\ FD(s) \cdot ID4e(s) \\ FS(s) \cdot IS4e(s) \\ FD(s) \cdot ID5e(s) \\ FS(s) \cdot IS5e(s) \\ FD(s) \cdot ID6e(s) \\ FS(s) \cdot IS6e(s) \end{bmatrix} = \begin{bmatrix} TD1e(s) \\ TS1e(s) \\ TD2e(s) \\ TS2e(s) \\ TD3e(s) \\ TS3e(s) \\ TD4e(s) \\ TS4e(s) \\ TD5e(s) \\ TS5e(s) \\ TD6e(s) \\ TS6e(s) \end{bmatrix}$$

When saturation case-to-junction thermal resistance of each rectifier element is denoted by RDj-cm, a forward voltage of each rectifier element is denoted by VF, and a time constant is denoted by tD1, the rectified current filter function FD(s) can be expressed by the following formula.

$$FD(s) = RDj\text{-}cm \times VF/(1+tD1 \times s) \tag{60}$$

As expressed by the above formula (60), the rectified current filter function FD(s) is a formula in which a first-order lag filter with the time constant tD1 is multiplied by the saturation case-to-junction thermal resistance RDj-cm and the rectifier element forward voltage VF as a gain term of the first-order lag filter.

For example, when the rectified current filter function FD(s) is multiplied by a first element ID1e(s) of the aforementioned function matrix I2(s) of 12 rows and one column, and when a result of the multiplication is denoted by TD1e(s), TD1e(s) can be expressed by the following formula.

$$TD1e(s) = RDj\text{-}cm \times VF/(1+tD1 \times s) \times ID1e(s) \tag{61}$$

Here, when the aforementioned formula (15) is used, a loss PD1e(s) generated in the R-phase P-side rectifier element D1 can be expressed by the following formula.

$$PD1e(s) = VF \times ID1e(s) \tag{62}$$

From the formulas (61) and (62), the aforementioned TD1e(s) can be expressed by the following formula.

$$TD1e(s) = RDj\text{-}cm/(1+tD1 \times s) \times PD1e(s) \tag{63}$$

The formulas (53) and (63) are compared with each other. When the time constant tD1 in the formula (63) is replaced with a case-to-junction transient thermal time constant tj1 in the formula (53), a result of the replacement is equivalent to calculation of the case-to-junction temperature rise taking the transient thermal resistance expressed by the aforementioned formula (53) into consideration. That is, the rectified current filter function FD(s) employs the current flowing through the rectifier element as an input signal and calculates, as an output signal, the case-to-junction temperature rise of the rectifier element taking the transient thermal resistance into consideration. It goes without saying that when ID1e(s) in the right term of the formula (61) is replaced with a current flowing through another rectifier element, a case-to-junction temperature rise of the other rectifier element can be similarly calculated taking the transient thermal resistance into consideration.

Thus, TD1e(s), TD2e(s), TD3e(s), TD4e(s), TD5e(s), and TD6e(s) expressed in the formula (59) represent case-to-junction estimated temperature rises of the rectifier elements D1, D2, D3, D4, D5, and D6, respectively.

Next, the regenerative current filter function FS(s) will be described. When saturation case-to-junction thermal resistance of the regenerative switching element S1 is denoted by RSj-cm, a regenerative switching element saturation voltage is denoted by Vce(sat), and a time constant is denoted by tS1, the regenerative current filter function FS(s) can be expressed by the following formula.

$$FS(s) = RSj\text{-}cm \times Vce(\text{sat})/(1+tS1 \times s) \tag{64}$$

As expressed by the above formula (64), the regenerative current filter function FS(s) has a configuration in which a first-order lag filter with the time constant tS1 is multiplied by the saturation case-to-junction thermal resistance RSj-cm and the regenerative switching element saturation voltage Vce(sat) which serve as a gain term of the first-order lag filter.

For example, when the regenerative current filter function FS(s) is multiplied by a second element IS1e(s) of the aforementioned function matrix I2(s) of 12 rows and one column, and when a result of the multiplication is denoted by TS1e(s), TS1e(s) can be expressed by the following formula.

$$TS1e(s) = RSj\text{-}cm \times Vce(\text{sat})/(1+tS1 \times s) \times IS1e(s) \tag{65}$$

Here, when the aforementioned formula (19) is used, a loss PS1e(s) generated in the R-phase P-side regenerative switching element S1 can be expressed by the following formula.

$$PS1e(s) = Vce(\text{sat}) \times IS1e(s) \tag{66}$$

From the formulas (65) and (66), the aforementioned TS1e(s) can be expressed by the following formula.

$$TS1e(s) = RSj\text{-}cm/(1+tS1 \times s) \times PS1e(s) \tag{67}$$

The formulas (53) and (67) are compared with each other. When the time constant tS1 in the formula (67) is replaced with the case-to-junction transient thermal time constant tj1 in the formula (53), a result of the replacement is equivalent to calculation of the case-to-junction temperature rise taking the transient thermal resistance expressed by the aforementioned formula (53) into consideration. That is, the regenerative current filter function FS(s) employs the current flowing through the regenerative switching element as an input signal and calculates, as an output signal, the case-to-junction temperature rise of the regenerative switching element taking the transient thermal resistance into consideration. It goes without saying that when IS1e(s) in the right term of the formula (67) is replaced with a current flowing through another regenerative switching element, a case-to-junction temperature rise of the other regenerative switching element can be similarly calculated taking the transient thermal resistance into consideration.

Thus, TS1e(s), TS2e(s), TS3e(s), TS4e(s), TS5e(s), and TS6e(s) expressed in the formula (59) represent case-to-junction estimated temperature rises of the regenerative switching elements S1, S2, S3, S4, S5, and S6, respectively.

As described above, the filter unit 43 has a function of estimating the case-to-junction temperature rise of each power element taking the transient thermal resistance into consideration based on the calculated current flowing through each power element.

Next, the determination unit 44 will be described. The determination unit 44 has a function of determining whether the case-to-junction temperature of each power element is an allowable temperature by comparing with a predetermined threshold temperature based on a function matrix Te(s) representing the case-to-junction estimated temperature rise of each power element, which is an output of the filter unit 43 described above.

Figure 48:
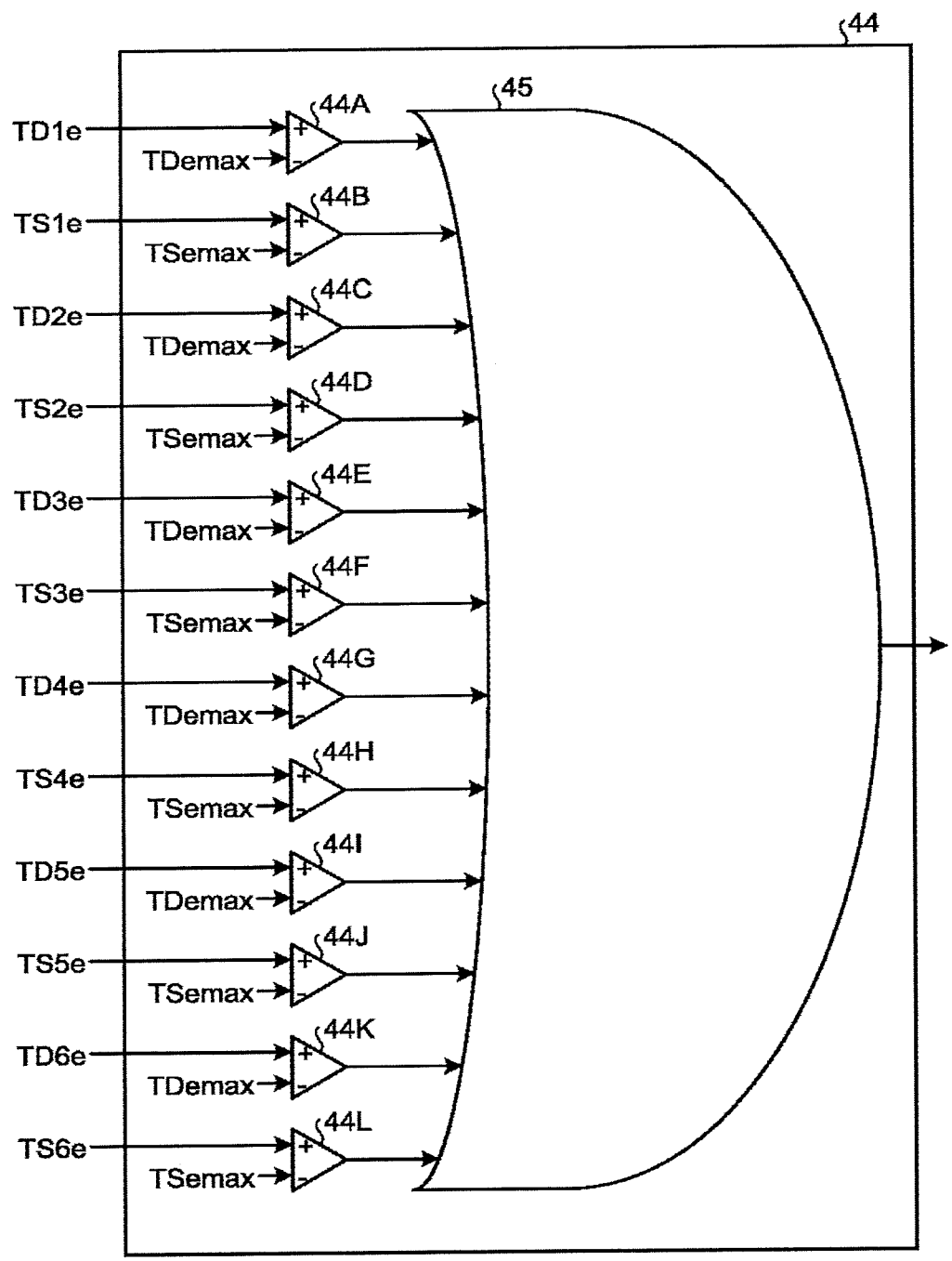
FIG. 48 is a block diagram illustrating a configuration example of a determination unit in the eighth embodiment.

FIG. 48 illustrates a configuration example of the determination unit. As illustrated in FIG. 48, the determination unit 44 includes comparators 44A, 44B, 44C, 44D, 44E, 44F, 44G, 44H, 44I, 44J, 44K, and 44L, and an OR circuit 45. A rectifier element allowable temperature TDemax is input to a negative input terminal of each of the comparators 44A, 44C, 44E, 44G, 44I, and 44K. A regenerative switching element allowable temperature TSemax is input to a negative input terminal of each of the comparators 44B, 44D, 44F, 44H, 44J, and 44L. The above-described TD1e(s), TD2e(s), TD3e(s), TD4e(s), TD5e(s), and TD6e(s) are input to positive input terminals of the comparators 44A, 44C, 44E, 44G, 44I, and 44K, respectively. The above-described TS1e(s), TS2e(s), TS3e(s), TS4e(s), TS5e(s), and TS6e(s) are input to positive input terminals of the comparators 44B, 44D, 44F, 44H, 44J, and 44L, respectively. Respective output signals of the comparators 44A, 44B, 44C, 44D, 44E, 44F, 44G, 44H, 44I, 44J, 44K, and 44L are input to the OR circuit 45, and an output of the OR circuit 45 is treated as an output signal of the overload detection unit 28C.

In the configuration illustrated in FIG. 48, when the case-to-junction estimated temperature rise of each power element becomes equal to or larger than TDemax or TSemax as a predetermined threshold temperature, each comparator outputs H. When H is input as at least one of 12 signals that are input to the OR circuit 45, the OR circuit 45, that is, the overload detection unit 28C outputs H.

As described above, according to the motor control device of the eighth embodiment, since the overload detection unit 28C detects the instantaneous overload based on the estimation result of the case-to-junction temperature rise taking the transient thermal resistance into consideration based on the bus current IPN and each base drive signal, it is possible to reduce unnecessary reduction in motor output when operating industrial machines such as machine tools, manufacturing machines, and robots, and to prevent a cycle time from being unnecessarily prolonged.

Although illustration is omitted in FIG. 42, the output of the overload detection unit 28C in the power regenerative converter 1 may be output to the motor control unit 4A as in the third embodiment, or, the output of the overload detection unit 28C in the power regenerative converter 1 may be output to the host control device 100 as in the fourth embodiment. With this configuration, the motor control unit 4A or the host control device 100 can perform power control to lower the output of the motor 5 based on the output signal of the overload detection unit 28C.

Ninth Embodiment

Figure 49:
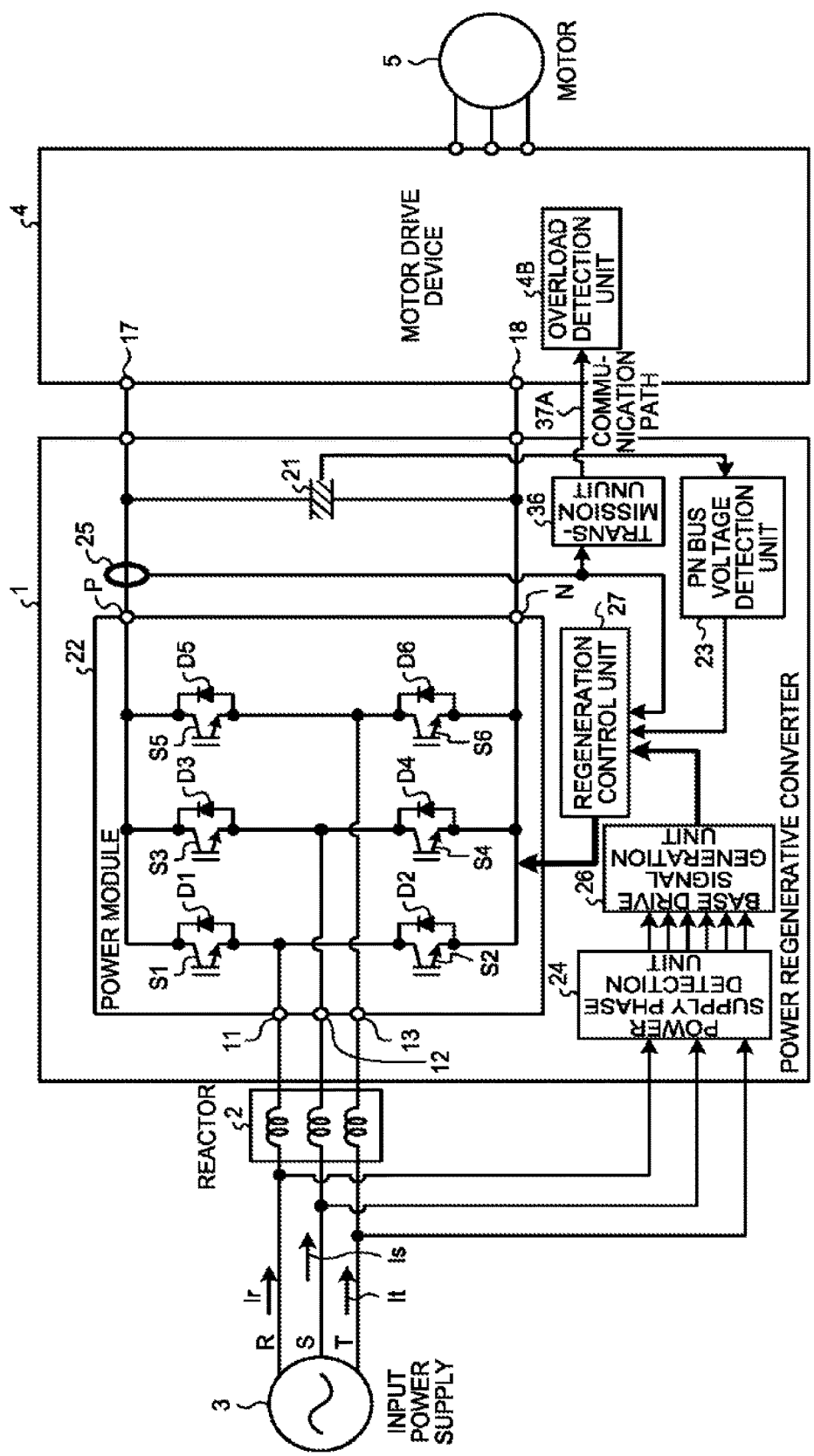
FIG. 49 is a block diagram illustrating a configuration of a motor control device according to a ninth embodiment.

FIG. 49 is a block diagram illustrating a configuration of a motor control device according to a ninth embodiment. In FIG. 49, the same reference signs are given to constituent elements which are the same as or equivalent to the constituent elements of the first embodiment illustrated in FIG. 1. Here, a description will be given focusing on parts relating to the ninth embodiment. In FIG. 49, in a power regenerative converter according to the ninth embodiment, the overload detection unit 28 in the configuration illustrated in FIG. 1 is deleted, instead thereof, a transmission unit 36 as a transmission unit is added inside the power regenerative converter 1, and an overload detection unit 4B is added inside the motor drive device 4. As a result, in the configuration, the output signal of the bus current detection unit 25 is input to the overload detection unit 4B via the transmission unit 36 and a communication path 37A.

Based on the bus current IPN which is an output signal of the bus current detection unit 25, the overload detection unit 4B determines whether the power regenerative converter 1 is overloaded. An internal configuration of the overload detection unit 4B may be achieved by using any of a configuration for determining the instantaneous overload condition, a configuration for determining the steady-state overload condition, and a configuration for determining both the instantaneous overload condition and the steady-state overload condition.

For example, when a configuration similar to that of the overload detection unit 28 (for example, FIG. 14) indicated in the first embodiment is adopted and caused to operate similarly to the first embodiment, whether the power regenerative converter 1 is in the instantaneous overload condition can be determined in the motor drive device 4. Alternatively, for example, when a configuration similar to that of the overload detection unit 28A (for example, FIG. 16) indicated in the second embodiment is adopted and caused to operate similarly to the second embodiment, whether the power regenerative converter 1 is in the steady-state overload condition can be determined in the motor drive device 4. Alternatively, the overload detection unit 4B may be configured by using an overload detection unit having both the function of determining the instantaneous overload condition and the function of determining the steady-state overload condition.

In the configuration of the ninth embodiment, a current detector needs to be provided only for detecting the bus current. Therefore, the number of the current detectors can be reduced as compared with the conventional art. When detecting an input current, it is necessary to detect currents of at least two phases and to output two detection results to the motor drive device 4, so that the number of the communication paths increases. However, an increase in the number of the communication paths can be suppressed when only the bus current is detected.

Tenth Embodiment

Figure 50:
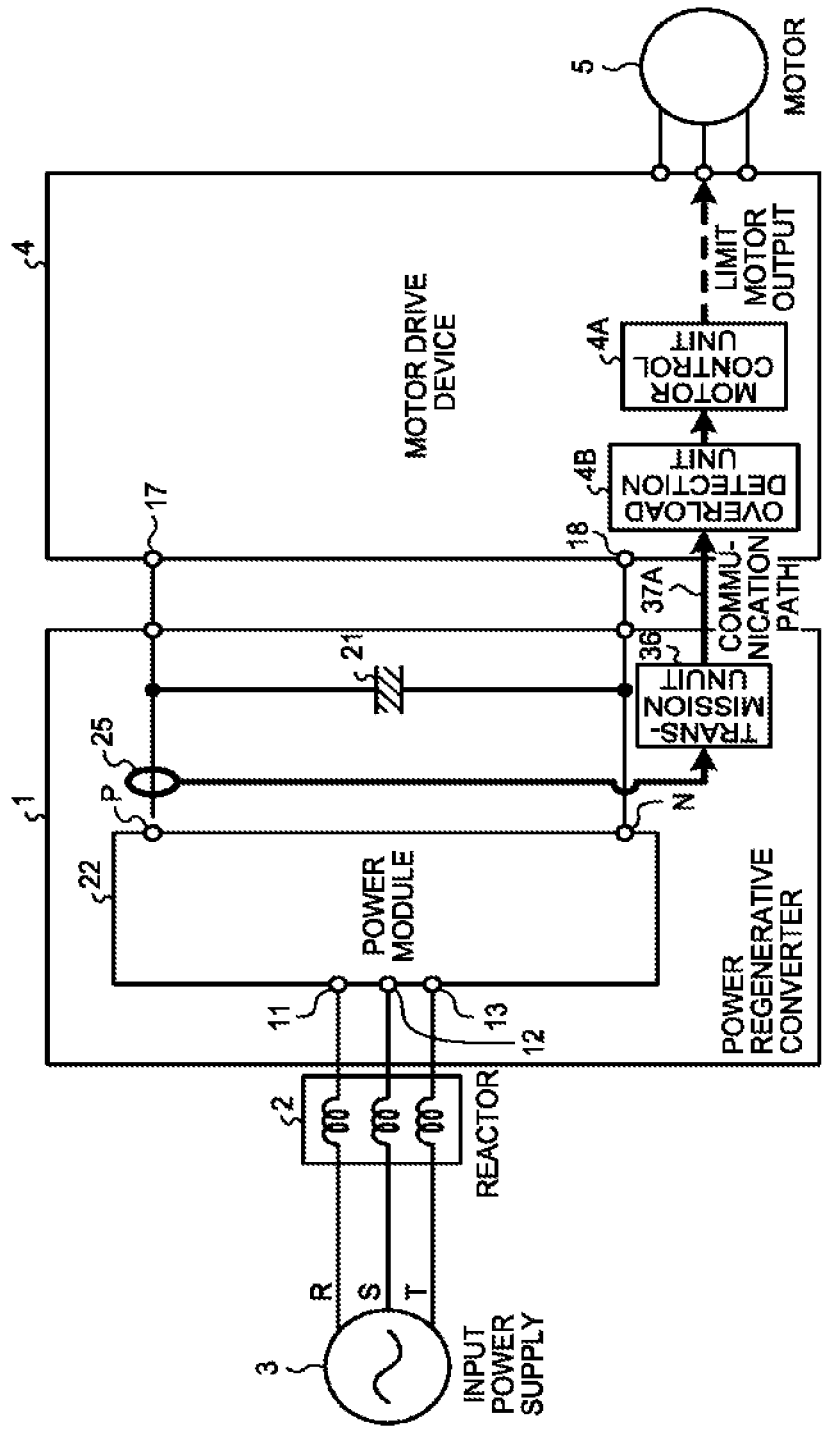
FIG. 50 is a block diagram illustrating a configuration of a motor control device according to a tenth embodiment.

FIG. 50 is a block diagram illustrating a configuration of a motor control device according to a tenth embodiment. In FIG. 50, the same reference signs are given to constituent elements which are the same as or equivalent to the constituent elements of the third embodiment illustrated in FIG. 19. The configuration illustrated in FIG. 50 is similar to that illustrated in FIG. 19, except that the overload detection unit 28 provided inside the power regenerative converter 1 is deleted, instead thereof, the transmission unit 36 which is a transmission unit is added inside the power regenerative converter 1, and the overload detection unit 4B is added inside the motor drive device 4.

As described above, the motor control unit 4A has a function of supplying arbitrary alternating-current power to the motor 5 to perform variable speed control of the motor 5. An output of the bus current detection unit 25 in the power regenerative converter 1 is input to the overload detection unit 4B through the communication path 37A. In the configuration, an output of the overload detection unit 4B is input to the motor control unit 4A. The overload detection unit 4B illustrated in FIG. 50 may have a configuration for determining that the power regenerative converter 1 is in the instantaneous overload condition, or a configuration for determining that the power regenerative converter 1 is in the steady-state overload condition, or, the overload detection unit 4B may be configured as an overload detection unit having both the function of determining the instantaneous overload condition and the function of determining the steady-state overload condition, as described in the ninth embodiment.

The bus current detection unit 25 detects the bus current IPN flowing among the P terminal of the power module 22, the smoothing capacitor 21, and the N terminal of the power module 22, and inputs the detected bus current IPN to the overload detection unit 4B in the motor drive device 4 through the communication path 37A. The overload detection unit 4B determines the overload condition of the power regenerative converter 1 based on the bus current IPN. When it is determined that the power regenerative converter 1 is in the overload condition and the overload detection unit 4B outputs H, the motor control unit 4A controls the alternating-current power so as to lower output of the motor 5. As a method for controlling the alternating-current power so as to lower the output of the motor 5, the method described in the third embodiment is exemplified.

Figure 51:
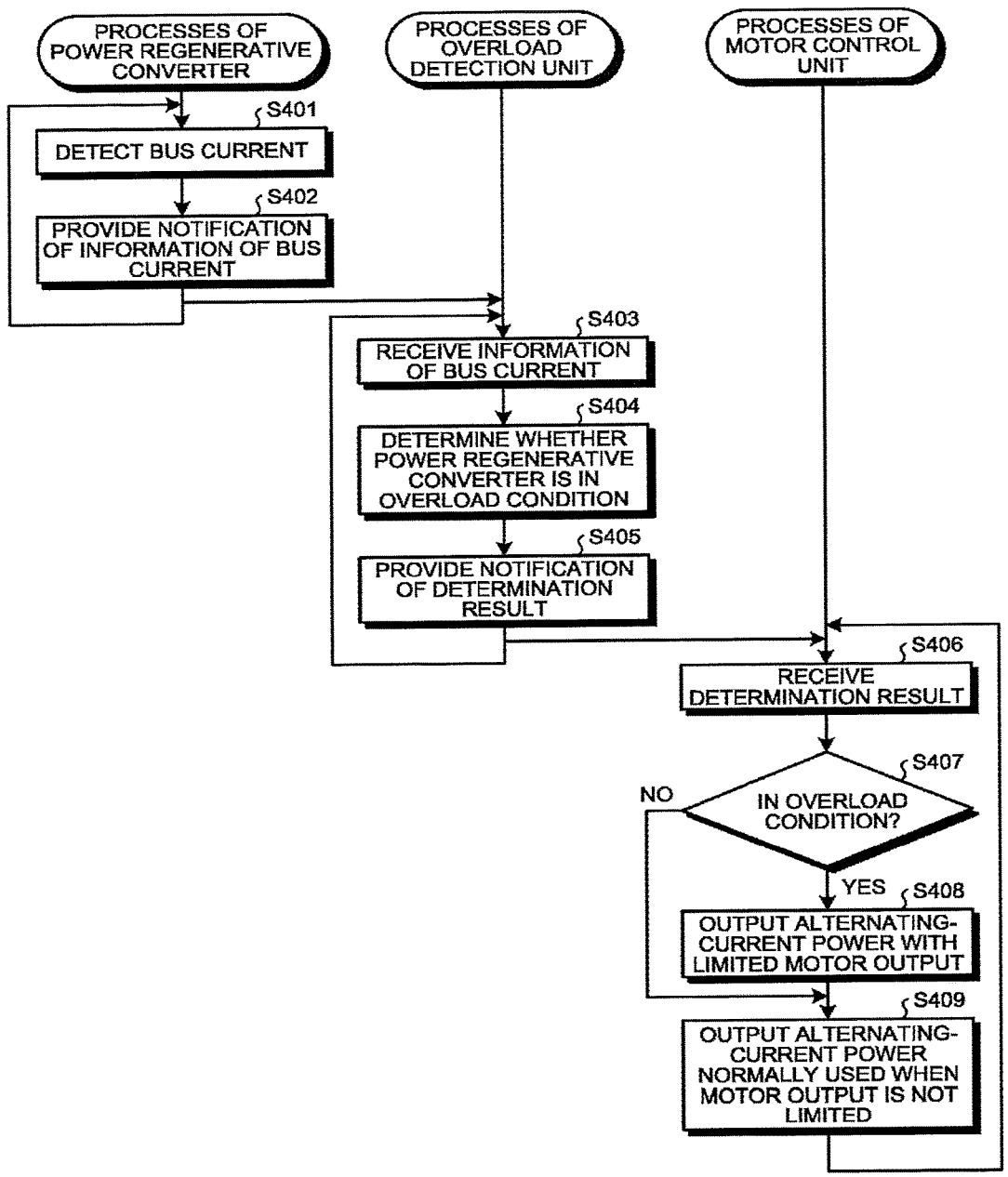
FIG. 51 is a flowchart illustrating an operation of the motor control device according to the tenth embodiment.

Next, an operation of the motor control device according to the tenth embodiment will be described with reference to FIGS. 50 and 51. FIG. 51 is a flowchart illustrating the operation of the motor control device according to the tenth embodiment. In FIG. 51, reference signs are omitted.

In the power regenerative converter 1, the bus current detection unit 25 detects the bus current IPN as described above (step S401). The bus current detection unit 25 notifies the overload detection unit 4B in the motor drive device 4 of information of the detected bus current IPN through the communication path 37A (step S402). Steps S401 and S402 above are processes of the power regenerative converter 1, and the power regenerative converter 1 repeatedly executes the processes of steps S401 and S402.

The overload detection unit 4B receives the information of the bus current IPN which is a detection value of the bus current detection unit 25 (step S403). Based on the bus current IPN, the overload detection unit 4B determines whether the power regenerative converter 1 is in the overload condition (step S404), and notifies the motor control unit 4A of a determination result (step S405). The motor control unit 4A receives the determination result of the overload detection unit 4B (step S406). Based on the received determination result, the motor control unit 4A determines whether the power regenerative converter 1 is in the overload condition (step S407). When the determination result received from the overload detection unit 4B is a signal indicating that the power regenerative converter 1 is in the overload condition (a signal "H" in the example of the tenth embodiment) (step S407, Yes), the motor control unit 4A limits motor output from the motor drive device 4 so that the output of the motor 5 is limited, and outputs alternating-current power with the limited motor output to the motor 5 (step S408). On the other hand, when the received determination result is a signal indicating that the power regenerative converter 1 is not in the overload condition (a signal "L" in the example of the tenth embodiment) (step S407, No), the motor control unit 4A proceeds to step S409 without performing the process of step S408. That is, when the received determination result does not indicate the overload condition, alternating-current power in a normal control operation which does not limit the output of the motor 5 is output to the motor 5 (step S409). The processes of steps S403 to S409 above are processes of the overload detection unit 4B and the motor control unit 4A in the motor drive device 4, and the overload detection unit 4B or the motor control unit 4A repeatedly executes the processes of steps S403 to S409.

According to the tenth embodiment, even when the motor 5 performs an operation beyond assumptions and the power regenerative converter 1 is in the overload condition, the motor drive device 4 controls the alternating-current power so as to lower the output of the motor 5, and accordingly, it is possible to eliminate the overload condition of the power regenerative converter 1 and to eliminate adverse effects such as life degradation and damage of the power regenerative converter 1 without stopping the system. Therefore, it is possible to select a power regenerative converter with small capacity, which contributes to cost reduction of industrial machines.

Eleventh Embodiment

Figure 52:
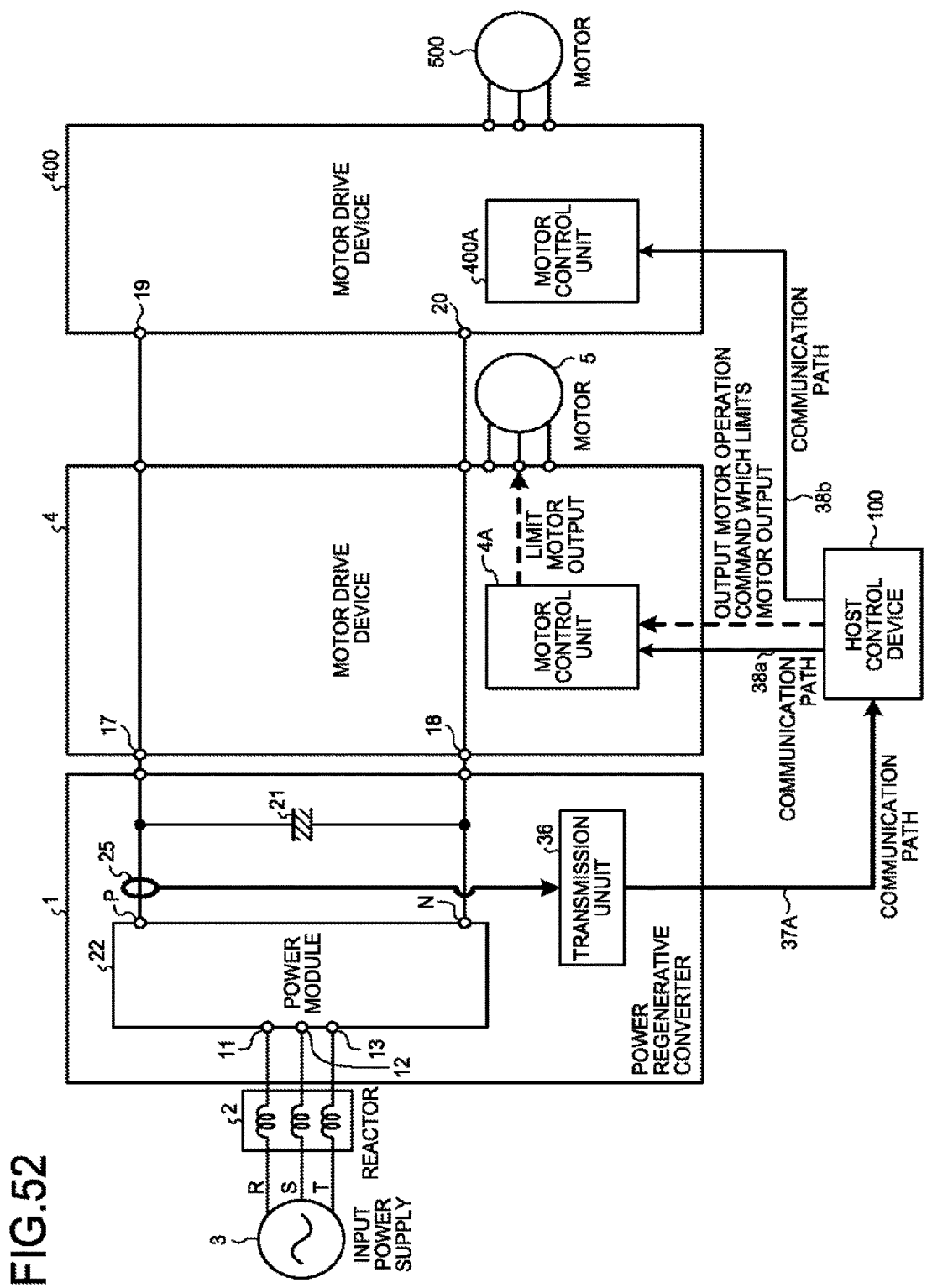
FIG. 52 is a block diagram illustrating a configuration of a motor control device according to an eleventh embodiment.

FIG. 52 is a block diagram illustrating a configuration of a motor control device according to an eleventh embodiment. In FIG. 52, the overload detection unit 28 provided inside the power regenerative converter 1 in the configuration of the fourth embodiment illustrated in FIG. 21 is deleted, and instead thereof, the transmission unit 36 as a transmission unit is added inside the power regenerative converter 1. In the configuration, the output of the bus current detection unit 25 is input to the host control device 100 via the transmission unit 36 and the communication path 37A, and it is determined whether the power regenerative converter 1 is in the overload condition in the host control device 100. Regarding the overload detection performed by the host control device 100, any of a configuration for determining the instantaneous overload condition, a configuration for determining the steady-state overload condition, and a configuration for determining both the instantaneous overload condition and the steady-state overload condition may be adopted.

Information of the bus current IPN which is an output signal of the bus current detection unit 25 is input to the host control device 100 through the communication path 37A. The host control device 100 determines the overload condition of the power regenerative converter 1. When it is determined that the power regenerative converter 1 is in the overload condition, the host control device 100 outputs a motor operation command which limits output of the motor 5 or the motor 500 as an object to be controlled to at least one of the motor control unit 4A of the motor drive device 4 and the motor control unit 400A of the motor drive device 400, using either or both of the corresponding communication paths 38*a* and 38*b*. At least one of the motor control unit 4A and the motor control unit 400A controls the alternating-current power so as to lower the output of the motor 5 or the motor 500 based on the received motor operation command.

Figure 53:
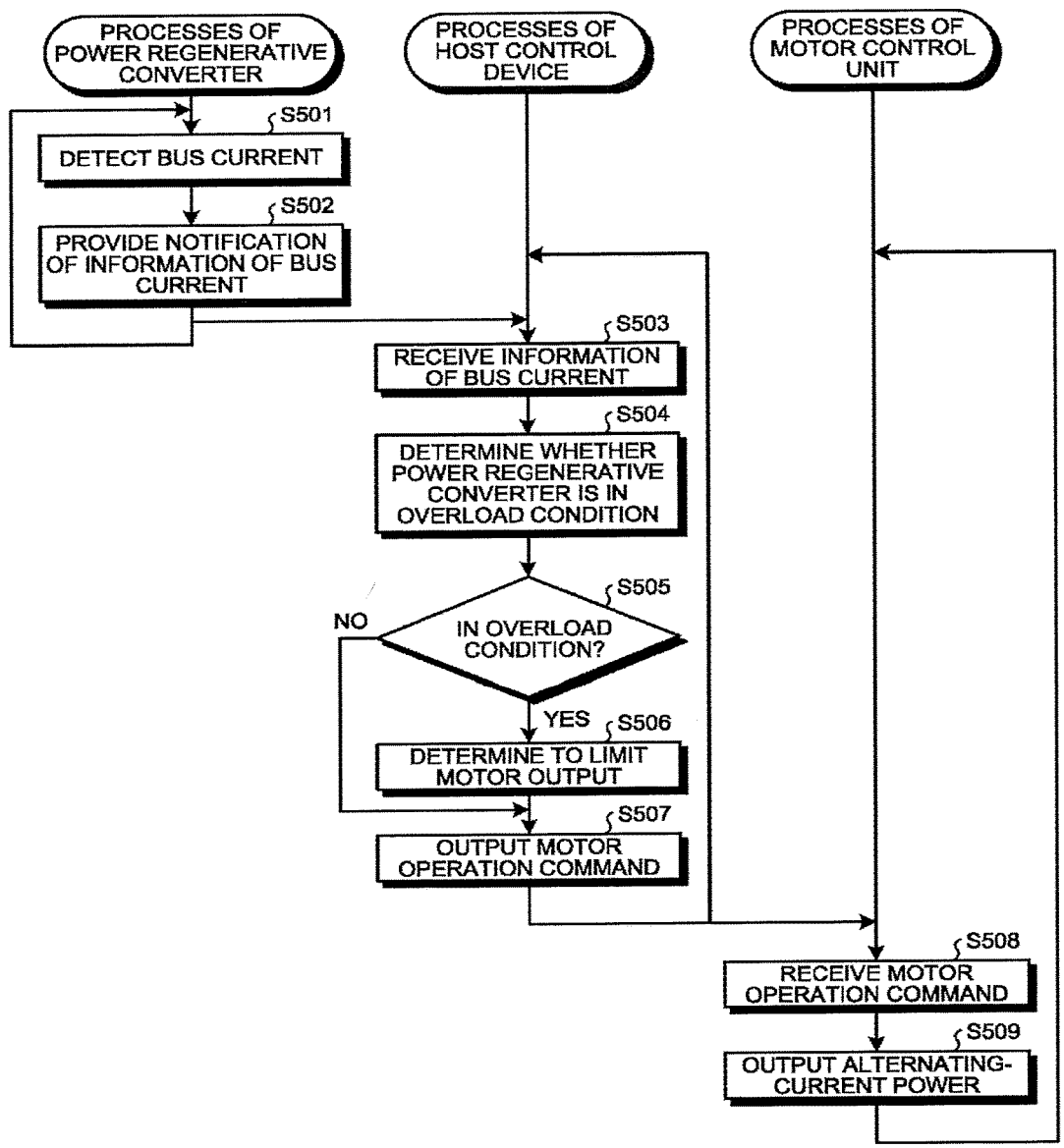
FIG. 53 is a flowchart illustrating an operation of the motor control device according to the eleventh embodiment.

Next, an operation of the motor control device according to the eleventh embodiment will be described with reference to FIGS. 52 and 53. FIG. 53 is a flowchart illustrating the operation of the motor control device according to the eleventh embodiment. In FIG. 53, reference signs are omitted.

In the power regenerative converter 1, the bus current detection unit 25 detects the bus current IPN as described above (step S501). The bus current detection unit 25 notifies the host control device 100 of the bus current IPN through the communication path 37A (step S502). Steps S501 and S502 above are processes of the power regenerative converter 1, and the power regenerative converter 1 repeatedly executes the processes of steps S501 and S502.

The host control device 100 receives the bus current IPN which is an output signal of the bus current detection unit 25 (step S503). The host control device 100 determines whether the power regenerative converter 1 is in the overload condition based on the bus current IPN (step S504). When it is determined that the power regenerative converter 1 is in the overload condition (step S505, Yes), the host control device 100 determines to limit the output of at least one of the motor 5 and the motor 500 (S506), and outputs a motor operation command which limits motor output to the motor drive device which drives the motor as an object to be controlled (step S507). When the host control device 100 determines that the power regenerative converter 1 is not in the overload condition (step S505, No), the host control device 100 proceeds to step S507 without performing the process of step S506. That is, when the host control device 100 determines that the power regenerative converter 1 is not in the overload condition, the output limitation is not performed to the motor 5 and the motor 500 and a normal motor operation command is output (step S507). The processes of steps S503 to S507 above are processes of the host control device 100, and the host control device 100 repeatedly executes the processes of steps S503 to S507.

The motor control unit 4A of the motor drive device 4 and the motor control unit 400A of the motor drive device 400 each receive the motor operation command from the host control device 100 (step S508), and operate such that the alternating-current power is output to the motor 5 and the motor 500 correspondingly to the received motor operation commands, respectively (step S509). The processes of steps S508 and S509 above are processes of the motor control units 4A and 400A, and the motor control units 4A and 400A repeatedly execute the processes of steps S508 and S509.

According to the eleventh embodiment, even when an operation beyond assumptions is performed in an operation of each of the motor 5 and the motor 500 and the power regenerative converter 1 is in the overload condition, the host control device 100 outputs a motor operation command which limits the output of at least one of the motor 5 and the motor 500 to the corresponding motor drive device, and the motor drive device controls the alternating-current power so as to lower the motor output of the object to be controlled, and accordingly, it is possible to eliminate the overload condition of the power regenerative converter 1, and to eliminate adverse effects such as life degradation and damage of the power regenerative converter 1 without stopping the system. In addition, in an industrial machine using a plurality of motors such as a machine tool, by outputting a motor operation command so as to prevent a cycle time from being prolonged, the overload condition of the power regenerative converter 1 can be eliminated while maintaining the cycle time. Therefore, it is possible to select a power regenerative converter with small capacity, which contributes to cost reduction of industrial machines.

Twelfth Embodiment

Figure 54:
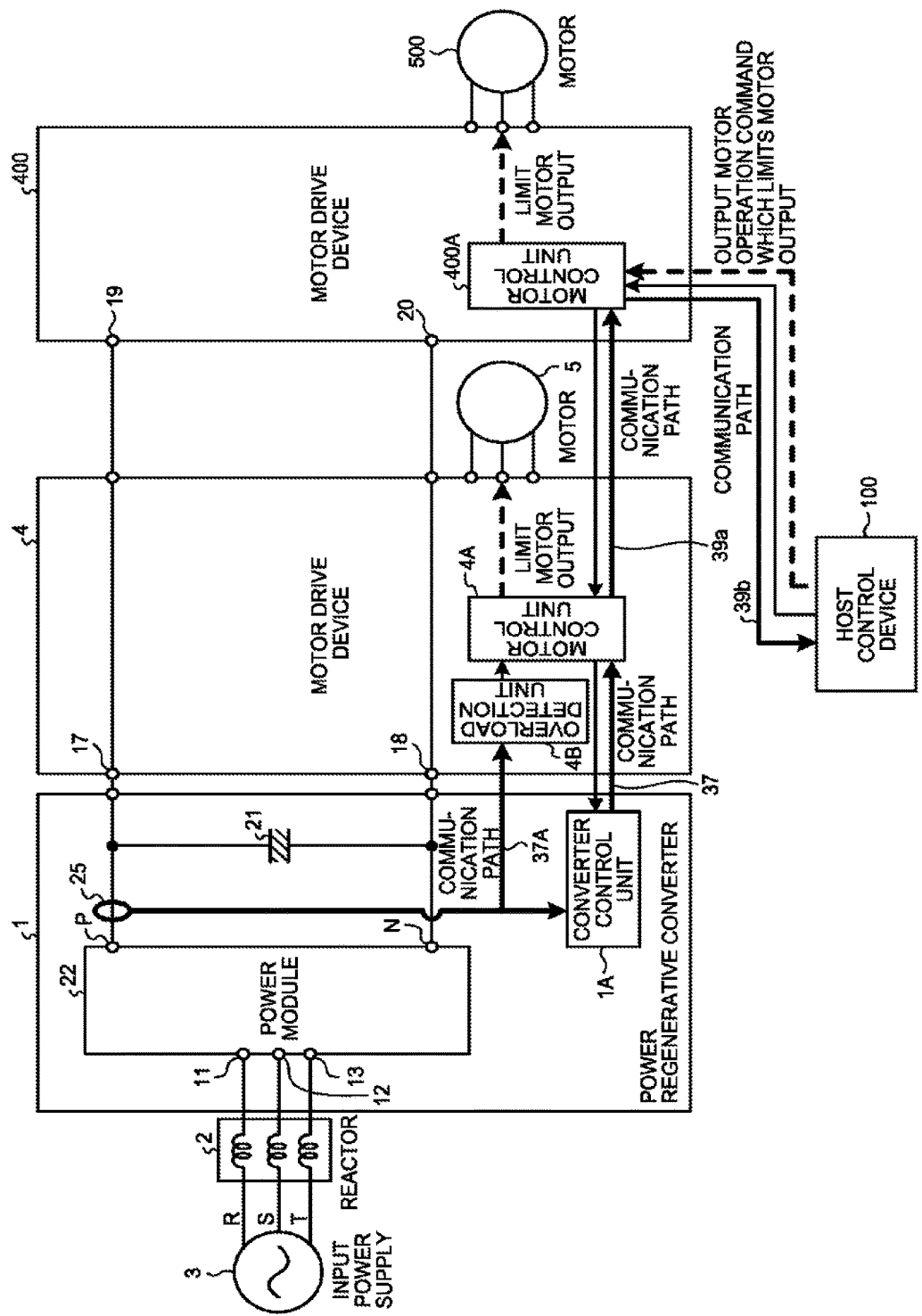
FIG. 54 is a block diagram illustrating a configuration of a motor control device according to a twelfth embodiment.

FIG. 54 is a block diagram illustrating a configuration of a motor control device according to a twelfth embodiment. In FIG. 54, although the configuration is the same as or equivalent to the configuration of the eleventh embodiment illustrated in FIG. 52, the converter control unit 1A is added to the power regenerative converter 1 and the overload detection unit 4B is added to the motor drive device 4. In the twelfth embodiment, the overload detection unit 4B is an overload detection unit having both functions of instantaneous overload detection and steady-state overload detection. The host control device 100, the motor drive device 400, the motor drive device 4, and the power regenerative converter 1 are daisy-chain connected through communication paths. Specifically, the converter control unit 1A of the power regenerative converter 1 and the motor control unit 4A of the motor drive device 4 are connected by the communication path 37, the motor control unit 4A of the motor drive device 4 and the motor control unit 400A of the motor drive device 400 are connected by the communication path 39a, and the motor control unit 400A of the motor drive device 400 and the host control device 100 are connected by the communication path 39b. In the motor control device configured as described above, for example, a motor operation command output from the host control device 100 to the motor drive device 4 is input to the motor control unit 4A of the motor drive device 4 via the motor control unit 400A of the motor drive device 400. An output signal of the bus current detection unit 25 is input to the converter control unit 1A of the power regenerative converter 1 and is also input to the overload detection unit 4B of the motor drive device 4 through the communication path 37A, and an output signal of the overload detection unit 4B is input to the motor control unit 4A.

Figure 55:
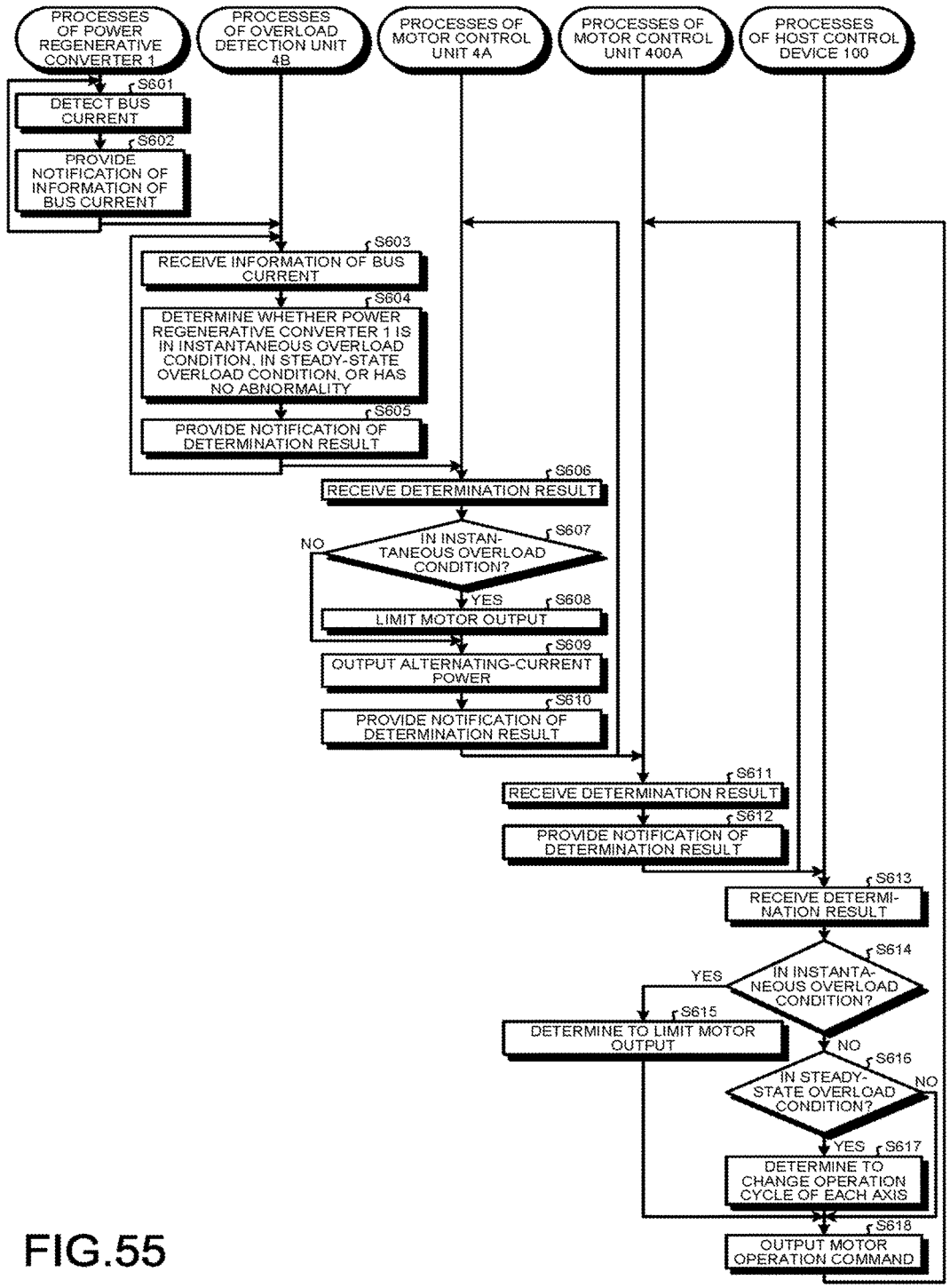
FIG. 55 is a flowchart illustrating an operation of the motor control device according to the twelfth embodiment.

Next, an operation of the motor control device according to the twelfth embodiment will be described with reference to FIGS. 54 and 55. FIG. 55 is a flowchart illustrating the operation of the motor control device according to the twelfth embodiment.

In the power regenerative converter 1, the bus current detection unit 25 detects the bus current IPN as described above (step S601). The bus current detection unit 25 notifies the overload detection unit 4B in the motor drive device 4 of information of the bus current IPN through the communication path 37A (step S602). Steps S601 and S602 above are processes of the power regenerative converter 1, and the power regenerative converter 1 repeatedly executes the processes of steps S601 and S602.

The overload detection unit 4B receives the information of the bus current IPN which is a detection value of the bus current detection unit 25 (step S603). Based on the bus current IPN, the overload detection unit 4B determines whether the power regenerative converter 1 is in the instantaneous overload condition, in the steady-state overload condition, or has no abnormality (step S604), and notifies the motor control unit 4A of a determination result (step S605). Steps S603 to S605 above are processes of the overload detection unit 4B in the motor drive device 4, and the overload detection unit 4B repeatedly executes the processes of steps S603 to S605.

The motor control unit 4A receives the determination result of the overload detection unit 4B (step S606). Based on the received determination result, the motor control unit 4A determines whether the power regenerative converter 1 is in the instantaneous overload condition (step S607). In a case where the received determination result is a signal indicating that the power regenerative converter 1 is in the instantaneous overload condition (step S607, Yes), motor output from the motor drive device 4 is limited so that the output of the motor 5 is limited (step S608), and alternating-current power with the limited motor output is output to the motor 5 (step S609). In a case where the received determination result is a signal indicating that the power regenerative converter 1 is not in the instantaneous overload condition (step S607, No), the motor control unit 4A proceeds to step S609 without performing the process of step S608. That is, when the received determination result does not indicate the instantaneous overload condition, the output of the motor 5 is not limited, and the alternating-current power in a normal control operation is output to the motor 5 (step S609). The motor control unit 4A notifies the motor control unit 400A of the determination result of the overload detection unit 4B (step S610). Steps S606 to S610 above are processes of the motor control unit 4A in the motor drive device 4, and the motor control unit 4A repeatedly executes the processes of steps S606 to S610.

The motor control unit 400A receives the determination result of the overload detection unit 4B from the motor control unit 4A through the communication path 39a (step S611), and notifies the host control device 100 of the determination result through the communication path 39b (step S612). The processes of steps S611 and S612 above are processes of the motor control unit 400A, and the motor control unit 400A repeatedly executes the processes of steps S611 and S612.

The host control device 100 receives the determination result of the overload detection unit 4B from the motor control unit 400A (step S613). Based on the received determination result, the host control device 100 determines whether the power regenerative converter 1 is in the instantaneous overload condition (step S614). In a case where the received determination result is a signal indicating that the power regenerative converter 1 is in the instantaneous overload condition (step S614, Yes), it is determined to limit the output of the motor 500 (step S615), and a motor operation command which limits the motor output is output to the motor control unit 400A which controls the motor 500 (step S618). On the other hand, in a case where the received determination result is a signal indicating that the power regenerative converter 1 is not in the instantaneous overload condition (step S614, No), it is further determined whether the power regenerative converter 1 is in the steady-state overload condition (step S616). In a case where the received determination result is a signal indicating that the power regenerative converter 1 is in the steady-state overload condition (step S616, Yes), it is determined to change an operation cycle of each axis (step S617), and a motor operation command which has been changed so as to suppress average output of the motor 500 is output to the motor control unit 400A which controls the motor 500 (step S618). In a case where the received determination result is a signal indicating that the power regenerative converter 1 is not in the steady-state overload condition (step S616, No), the host control device 100 proceeds to step S618 without performing the process of step S617. The processes of steps S613 to S618 above are processes of the host control device 100, and the host control device 100 repeatedly executes the processes of steps S613 to S618.

The above control can be summarized as follows. First, when it is determined that the power regenerative converter 1 is in the instantaneous overload condition, alternating-current power is output to the motor 5 so as to limit the motor output by the motor control unit 4A not via the host control device 100. Along with this control, the motor control unit 400A and the host control device 100 are notified that the power regenerative converter 1 is in the instantaneous overload condition. The host control device 100 generates a motor operation command for the motor 500 so as to limit the output of the motor operation of the motor 500 based on the determination result and outputs the motor operation command to the motor control unit 400A in the motor drive device 400. In the motor drive device 4, once the output of the motor 5 is limited to avoid the instantaneous overload condition, and thereafter, the motor operation command is reviewed in the host control device 100.

On the other hand, when it is determined that the power regenerative converter 1 is in the steady-state overload condition, the motor control unit 4A continues to issue an operation command based on the motor operation command output from the host control device 100, and along therewith, notifies the motor control unit 400A and the host control device 100 that the power regenerative converter 1 is in the steady-state overload condition. The host control device 100 generates a motor operation command so as to limit the average output in the motor operation of the motor 500 based on the determination result, and outputs the motor operation command to the motor control unit 400A in the motor drive device 400.

It has been described in the above that output limitation to the motor 5 is performed when the power regenerative converter 1 is determined to be in the instantaneous overload condition, and output limitation to the motor 500 is performed when the power regenerative converter 1 is determined to be in the steady-state overload condition. However, output limitation to both the motor 5 and the motor 500 may be performed when the power regenerative converter 1 is determined to be in the instantaneous overload condition. Alternatively, output limitation to both the motor 5 and the motor 500 may be performed when the power regenerative converter 1 is determined to be steady-state overloaded condition.

The overload detection unit 4B can detect each of the instantaneous overload condition and the steady-state overload condition. However, as for the notification method of the overload conditions, a communication line dedicated for overload detection may be established for each of the overload conditions, or notification of the overload conditions may be provided through serial communication or the like.

According to the twelfth embodiment, when the power regenerative converter 1 is in the instantaneous overload condition, the motor output can be quickly lowered. When the power regenerative converter 1 is in the steady-state overload condition, it is possible to improve the severe operation cycle by reviewing the motor operation command output from the host control device 100 to each motor drive device, and to reduce the case temperature rise $\Delta Tc$ of the power module 22. With the above control, it is possible to eliminate adverse effects such as life degradation and damage of the power regenerative converter 1 without stopping the system. In addition, in an industrial machine using a plurality of motors such as a machine tool, by outputting a motor operation command so as to prevent a cycle time from being prolonged, the overload condition of the power regenerative converter 1 can be eliminated while maintaining the cycle time. Therefore, it is possible to select a power regenerative converter with small capacity, which contributes to cost reduction of industrial machines.

It goes without saying that the configuration described in each of the first to twelfth embodiments above is one example of the configuration of the present invention and can be combined with other known technology, and can be modified, for example, by omitting a part thereof without departing from the gist of the present invention.

REFERENCE SIGNS LIST 1 power regenerative converter; LA converter control unit; 2 reactor; 3 input power supply; 4, 400 motor drive device; 4A, 400A motor control unit; 5, 500 motor; 11, 12, 13 alternating-current power supply terminal; 17, 18, 19, 20 direct-current power supply terminal; 21 smoothing capacitor; 22 power module; 23 PN bus voltage detection unit; 24 power supply phase detection unit; 25 bus current detection unit; 26 base drive signal generation unit; 27, 27A, 27B regeneration control unit; 4B, 28, 28A, 28B, 28C overload detection unit; 29, 30, 34, 65, 66, 68 comparator; 31, 62, 69 OR circuit; 32 absolute value calculation unit; 33, 43, 67 filter unit; 37, 37A, 38a, 38b, 39a, 39b communication path; 41 multiplication unit; 42 current extraction unit; 44 determination unit; 44A, 44B, 44C, 44D, 44E, 44F, 44G, 44H, 44I, 44J, 44K, 44L comparator; 45 OR circuit; 60 regeneration start determination unit; 61, 61B regeneration stop determination unit; 63 NPN transistor; 64 subtractor; 70P P bus line; 70N N bus line; 80P, 80N electrical connection point; 100 host control device; 200 heat sink; 201 power element; 202 power insulating substrate; 203 wire; 204 metal base plate; 205 power element power loss source; 206 case-to-junction thermal resistance Rj-c; 207 heat sink-to-case thermal resistance Rc-h; 208 heat sink-to-ambient temperature thermal resistance Rh-a; D1 to D6 rectifier element; S1 to S6 regenerative switching element; P P terminal (direct-current power supply terminal) of power module 22; N N terminal (direct-current power supply terminal) of power module 22.

The invention claimed is:

1. A power regenerative converter disposed between an input power supply and a motor drive device to perform variable speed control of a motor, the power regenerative converter comprising:
   a power module to include direct-current power supply terminals and to include a plurality of rectifier elements and a plurality of regenerative switching elements;
   a smoothing capacitor to be connected to the direct-current power supply terminals and to accumulate direct-current power during an alternating-current to direct-current conversion operation;
   a bus current detector to detect a bus current flowing between either of the direct-current power supply terminals and the smoothing capacitor;
   a power supply phase detector to detect a phase of the input power supply;
   a base drive signal generator to generate base drive signals that perform ON/OFF control of the regenerative switching elements based on a power supply phase detected by the power supply phase detector;
   a regeneration controller to perform a start process and a stop process of a power regenerative operation based on a detection result of the bus current detector and the base drive signals, wherein the regeneration controller controls whether to block an output signal of the base drive signal generator; and
   an overload detector to detect an instantaneous overload condition of the power regenerative converter during a power running operation and during a regenerative operation based on the detection result of the bus current detector alone, the overload detector outputting a result of the determination to the motor drive device or a host control device that outputs a motor operation command to the motor drive device, wherein
   the overload detector is configured to include:
   a bus current absolute value calculator to calculate, based on the detection result of the bus current detector, an absolute value of the detection result, and
   a filter to receive input of a calculation result of the bus current absolute value calculator and to perform averaging thereof, and
   when an output result of the filter is equal to or larger than a predetermined allowable bus current absolute value, the overload detector determines that the power regenerative converter is operating in the steady-state overload condition.

2. The power regenerative converter according to claim 1, wherein the overload detector determines whether the power regenerative converter is in a steady-state overload condition based on the detection result of the bus current detector, in addition to whether the power regenerative converter is in the instantaneous overload condition.

3. The power regenerative converter according to claim 1, wherein when the detection result of the bus current detector is larger than a predetermined allowable bus current lower limit value and less than an allowable bus current upper limit value, the overload detector determines that the power regenerative converter is not operating in the instantaneous overload condition, and when the detection result of the bus current detector is equal to or less than the allowable bus current lower limit value or equal to or larger than the allowable bus current upper limit value, the overload detector determines that the power regenerative converter is operating in the instantaneous overload condition.

4. A motor control device comprising the power regenerative converter according to claim 1 and the motor drive device to receive supply of direct-current power from the power regenerative converter and to perform variable speed control of a motor.

5. The motor control device according to claim 4, wherein when a determination result of the overload detector is determined to indicate overload, the motor drive device performs variable speed control of the motor so as to achieve a motor operation by which output of the motor is further limited than by a motor operation command output from a host control device.

6. The motor control device according to claim 4, wherein when a determination result of the overload detector is determined to indicate overload, the motor control device performs control such that a motor operation command is changed so as to achieve a motor operation that limits output of the motor and is output to the motor drive device via a host control device.

7. The motor control device according to claim 4, wherein a host control device, the motor drive device, and the power regenerative converter are daisy chain-connected in this order through communication paths, when the overload detector detects the instantaneous overload condition and notification of a determination result is provided from the overload detector to the motor drive device, the motor drive device performs variable speed control of the motor so as to achieve a motor operation by which output of the motor is further limited than by a motor operation command output from the host control device, and notifies the host control device of the determination result of the overload detector, and the host control device receives the determination result, and when the determination result indicates the instantaneous overload condition, performs control such that a motor operation command is changed so as to achieve a motor operation that limits the output of the motor and is output to the motor drive device.

8. The motor control device according to claim 4, wherein a host control device, the motor drive device, and the power regenerative converter are daisy chain-connected in this order through communication paths, when the overload detector detects the steady-state overload condition and notification of a determination result is provided from the overload detector to the motor drive device, the motor drive device performs variable speed control of a motor based on a motor operation command output from the host control device, and notifies the host control device of the determination result of the overload detector, and the host control device receives the determination result, and when the determination result indicates the steady-state overload condition, performs control such that an operation cycle is changed so as to suppress average output of the motor and is output to the motor drive device.

9. The motor control device according to claim 4, wherein the motor comprises a servo motor and a spindle motor included in a machine tool, and when a determination result of the overload detector is determined to indicate overload, the motor drive device performs variable speed control of the spindle motor so as to achieve a motor operation by which output is further limited than by a motor operation command output from a host control device.

10. The motor control device according to claim 4, wherein the motor comprises a servo motor and a spindle motor included in a machine tool, and when a determination result of the overload detector is determined to indicate overload, a host control device changes a motor operation command so as to limit output of the servo motor and outputs the motor operation command to a motor drive device that drives the servo motor.

\* \* \* \* \*